United States Patent
Li et al.

(10) Patent No.: US 11,553,521 B2
(45) Date of Patent: Jan. 10, 2023

(54) CHANNEL LISTENING TYPE INDICATION METHOD AND APPARATUS

(71) Applicant: HUAWEI TECHNOLOGIES CO., LTD., Shenzhen (CN)

(72) Inventors: Yuan Li, Bonn (DE); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 16/911,440

(22) Filed: Jun. 25, 2020

(65) Prior Publication Data
US 2020/0329496 A1 Oct. 15, 2020

Related U.S. Application Data

(63) Continuation of application No. PCT/CN2018/121594, filed on Dec. 17, 2018.

(30) Foreign Application Priority Data

Dec. 29, 2017 (CN) .......................... 201711486366.4

(51) Int. Cl.
*H04W 4/00* (2018.01)
*H04W 74/08* (2009.01)
(Continued)

(52) U.S. Cl.
CPC ..... *H04W 74/0808* (2013.01); *H04W 72/042* (2013.01); *H04W 72/0453* (2013.01); *H04W 72/1273* (2013.01)

(58) Field of Classification Search
None
See application file for complete search history.

(56) References Cited

U.S. PATENT DOCUMENTS

2017/0135128 A1 5/2017 Yerramalli et al.
2018/0255578 A1* 9/2018 Kim .................. H04W 72/1268
(Continued)

FOREIGN PATENT DOCUMENTS

CN 102811496 A 12/2012
CN 106658742 A 5/2017
(Continued)

OTHER PUBLICATIONS

Huawei, HiSilicon, Analysis on LBT with category 2 and 4 for eLAA. 3GPP TSG RAN WG1 Meeting #84, St. Julian s, Malta, Feb. 15 19, 2016, R1-160297, 5 pages.

*Primary Examiner* — Clemence S Han
(74) *Attorney, Agent, or Firm* — Rimon PC

(57) ABSTRACT

Embodiments provide a channel listening type indication method and apparatus. In those embodiments, the method includes: determining, by a network device based on a relationship between a first sub-band set and a second sub-band set, a corresponding channel listening type for performing channel listening by a terminal device for the first sub-band set, where the first sub-band set includes at least one sub-band occupied when the network device schedules the terminal device to send uplink information, the second sub-band set includes at least one sub-band occupied by the network device to send downlink information, and the channel listening type includes a long listening type or a short listening type; and sending, by the network device, first indication information to the terminal device, where the first indication information is used to indicate the channel listening type.

16 Claims, 23 Drawing Sheets

(51) Int. Cl.
*H04W 72/04* (2009.01)
*H04W 72/12* (2009.01)

(56) References Cited

U.S. PATENT DOCUMENTS

| 2018/0367282 | A1* | 12/2018 | Li | H04W 72/0446 |
| 2019/0116616 | A1* | 4/2019 | Si | H04L 5/0055 |
| 2019/0132882 | A1* | 5/2019 | Li | H04L 27/2607 |
| 2019/0200389 | A1* | 6/2019 | Li | H04W 72/1231 |
| 2019/0239145 | A1* | 8/2019 | Harada | H04W 72/12 |

FOREIGN PATENT DOCUMENTS

| CN | 107318171 | A | 11/2017 |
| WO | 2016195585 | A1 | 12/2016 |
| WO | 2017079057 | A1 | 5/2017 |
| WO | 2017160343 | A1 | 9/2017 |
| WO | 2017165723 | A1 | 9/2017 |
| WO | 2017185998 | A1 | 11/2017 |
| WO | 2017199205 | A1 | 11/2017 |
| WO | 2017214621 | A1 | 12/2017 |

* cited by examiner

CHANNEL LISTENING TYPE INDICATION METHOD AND APPARATUS

CROSS-REFERENCE TO RELATED APPLICATIONS

This application is a continuation of International Application No. PCT/CN2018/121594, filed on Dec. 17, 2018, which claims priority to Chinese Patent Application No. 201711486366.4, filed on Dec. 29, 2017. The disclosures of the aforementioned applications are hereby incorporated by reference in their entireties.

TECHNICAL FIELD

This disclosure relates to the field of wireless communications technologies, and in particular, to a channel listening type indication method and apparatus.

BACKGROUND

To resolve a problem of a relatively small quantity of available frequency domain resources on a licensed spectrum, a licensed-assisted access using long term evolution (licensed-assisted access using long term evolution, LAA-LTE) technology is introduced into the long term evolution (LTE) Release 13, and an enhanced license assisted access (eLAA) technology is introduced into the Release 14. Principles of the LAA technology and the eLAA technology are mainly as follows: An available spectrum is extended to an unlicensed frequency band by using a carrier aggregation technology, and downlink information and uplink information are transmitted on the unlicensed spectrum depending on a licensed spectrum. Further, on the basis of LAA and eLAA, the Multefire standard further proposes a standalone unlicensed LTE technology. The standalone unlicensed LTE technology means that uplink transmission and downlink transmission in an LTE system are completely implemented on an unlicensed spectrum without depending on a licensed spectrum.

In actual application, there are inter-RAT radio nodes such as a network device, user equipment, and wireless fidelity (Wi-Fi) of different operators on an unlicensed spectrum. In the LAA, eLAA, and Multefire technologies, to ensure friendly coexistence of different system nodes, a listen before talk (LBT) channel access mechanism is proposed. LBT For example means that a sending node needs to first perform channel listening before performing data transmission, and then performs data transmission after the channel listening succeeds.

In addition, in a 5G NR system, a wideband (WB) transmission technology is supported. A bandwidth occupied by one carrier is extended. One carrier includes a plurality of sub-bands (SBD). For example, in the wideband NR system, a bandwidth of one carrier is extended from 20 MHz in an LTE system to 40 MHz. One carrier may include two sub-bands, and each sub-band occupies 20 MHz. However, in a scenario of the 5G NR system, there is no related solution for indicating, by a network device, a channel listening type used by a terminal device to perform channel listening on a sub-band.

SUMMARY

Various embodiments provide a channel listening type indication method and apparatus, so as to indicate a channel listening type in a wideband transmission technology scenario.

According to a first aspect, a channel listening type indication method is provided, and the method includes: determining, by a network device based on a relationship between a first sub-band set and a second sub-band set, a corresponding channel listening type for performing channel listening by a terminal device for the first sub-band set, where the first sub-band set includes at least one sub-band occupied when the network device schedules the terminal device to send uplink information, the second sub-band set includes at least one sub-band occupied by the network device to send downlink information, and the channel listening type includes a long listening type or a short listening type; and sending, by the network device, first indication information to the terminal device, where the first indication information is used to indicate the channel listening type.

In one example implementation, the determining, by a network device based on a relationship between a first sub-band set and a second sub-band set, a corresponding channel listening type for performing channel listening by a terminal device for the first sub-band set includes: when each sub-band in the first sub-band set is included in the second sub-band set, determining, by the network device, that the channel listening type is the short listening type.

In one example implementation, the determining, by a network device based on a relationship between a first sub-band set and a second sub-band set, a corresponding channel listening type for performing channel listening by a terminal device for the first sub-band set includes: when each sub-band in the first sub-band set is included in the second sub-band set, and an uplink burst of the first sub-band set is within a maximum channel occupancy time corresponding to the first sub-band set, determining, by the network device, that the channel listening type is the short listening type. The uplink burst of the first sub-band set is at least one consecutive time unit that the network device schedules the terminal device to occupy in the first sub-band set, and the uplink burst of the first sub-band set includes a time unit occupied when the network device schedules the terminal device to send the uplink information.

The maximum channel occupancy time corresponding to the first sub-band set is a corresponding maximum channel occupancy time in which the network device performs channel listening for the first sub-band set before the network device sends the downlink information; or the maximum channel occupancy time corresponding to the first sub-band set is determined based on a maximum channel occupancy time corresponding to each sub-band in the first sub-band set, and a maximum channel occupancy time corresponding to any sub-band in the first sub-band set is a corresponding maximum channel occupancy time in which the network device performs channel listening on the any sub-band before the network device sends the downlink information.

In one example implementation, the determining, by a network device based on a relationship between a first sub-band set and a second sub-band set, a corresponding channel listening type for performing channel listening by a terminal device for the first sub-band set includes: when each sub-band in the first sub-band set is included in the second sub-band set, and an uplink burst on each sub-band in the first sub-band set is within a maximum channel occupancy time of each sub-band, determining, by the network device, that the channel listening type is the short listening type. For an $i^{th}$ sub-band in the first sub-band set, that an uplink burst on the $i^{th}$ sub-band is within a maximum channel occupancy time of the $i^{th}$ sub-band includes: the $i^{th}$ uplink burst on the $i^{th}$ sub-band is within the maximum channel occupancy time of the $i^{th}$ sub-band.

The $i^{th}$ uplink burst is at least one consecutive time unit that the network device schedules the terminal device to occupy on the $i^{th}$ sub-band, and the $i^{th}$ uplink burst includes a time unit occupied when the network device schedules the terminal device to send the uplink information.

The maximum channel occupancy time of the $i^{th}$ sub-band is a corresponding maximum channel occupancy time in which the network device performs channel listening on the $i^{th}$ sub-band before the network device sends the downlink information, where i is an integer greater than 0 and less than or equal to N, N is a quantity of sub-bands included in the first sub-band set, and N is a positive integer.

In one example implementation, the determining, by a network device based on a relationship between a first sub-band set and a second sub-band set, a corresponding channel listening type for performing channel listening by a terminal device for the first sub-band set includes: when at least one sub-band in the first sub-band set is not included in the second sub-band set, determining, by the network device, that the channel listening type is the long listening type.

Alternatively, when at least one sub-band in the first sub-band set is included in the second sub-band set, and at least one sub-band in the first sub-band set is not included in the second sub-band set, the network device determines that the channel listening type is the long listening type.

In one example implementation, the determining, by a network device based on a relationship between a first sub-band set and a second sub-band set, a corresponding channel listening type for performing channel listening by a terminal device for the first sub-band set includes: when each sub-band in the first sub-band set is included in the second sub-band set, and the uplink burst of the first sub-band set is not within the maximum channel occupancy time corresponding to the first sub-band set, determining, by the network device, that the channel listening type is the long listening type.

The uplink burst of the first sub-band set is the at least one consecutive time unit that the network device schedules the terminal device to occupy in the first sub-band set, and the uplink burst of the first sub-band set includes the time unit occupied when the network device schedules the terminal device to send the uplink information.

The maximum channel occupancy time corresponding to the first sub-band set is the corresponding maximum channel occupancy time in which the network device performs channel listening for the first sub-band set before the network device sends the downlink information; or the maximum channel occupancy time corresponding to the first sub-band set is determined based on the maximum channel occupancy time corresponding to each sub-band in the first sub-band set, and the maximum channel occupancy time corresponding to the any sub-band in the first sub-band set is the corresponding maximum channel occupancy time in which the network device performs channel listening on the any sub-band before the network device sends the downlink information.

In one example implementation, the determining, by a network device based on a relationship between a first sub-band set and a second sub-band set, a corresponding channel listening type for performing channel listening by a terminal device for the first sub-band set includes: when each sub-band in the first sub-band set is included in the second sub-band set, and the $i^{th}$ uplink burst on the $i^{th}$ sub-band in the first sub-band set is not within the maximum channel occupancy time of the $i^{th}$ sub-band, determining, by the network device, that the channel listening type is the long listening type. The uplink burst is the at least one consecutive time unit that the network device schedules the terminal device to occupy on the $i^{th}$ sub-band, and the uplink burst includes the time unit occupied when the network device schedules the terminal device to send the uplink information.

The maximum channel occupancy time of the $i^{th}$ sub-band is the corresponding maximum channel occupancy time in which the network device performs channel listening on the $i^{th}$ sub-band before the network device sends the downlink information, where i is an integer greater than 0 and less than or equal to N, N is the quantity of sub-bands included in the first sub-band set, and N is a positive integer.

In one example implementation, the sending, by the network device, first indication information to the terminal device includes: sending, by the network device, scheduling signaling to the terminal device, where the scheduling signaling carries the first indication information, and the scheduling signaling is used to schedule the terminal device to occupy the first sub-band set and a first time unit to send the uplink information.

In one example implementation, the first sub-band set includes at least two sub-bands.

In one example implementation, the long listening type is random backoff clear channel assessment, and the short listening type is single-slot clear channel assessment.

According to a second aspect, this application provides a channel listening type indication method, and the method includes: receiving, by a terminal device, first indication information sent by a network device, where the first indication information is used to indicate a corresponding channel listening type for performing channel listening by the terminal device for a first sub-band set, the channel listening type is determined based on a relationship between the first sub-band set and a second sub-band set, the first sub-band set includes at least one sub-band occupied when the network device schedules the terminal device to send uplink information, the second sub-band set includes at least one sub-band occupied by the network device to send downlink information, and the channel listening type includes a long listening type or a short listening type; and performing, by the terminal device, channel listening for the first sub-band set based on the channel listening type.

In one example implementation, when each sub-band in the first sub-band set is included in the second sub-band set, the channel listening type is the short listening type.

In one example implementation, when each sub-band in the first sub-band set is included in the second sub-band set, and an uplink burst of the first sub-band set is within a maximum channel occupancy time corresponding to the first sub-band set, the channel listening type is the short listening type. The uplink burst of the first sub-band set is at least one consecutive time unit that the network device schedules the terminal device to occupy in the first sub-band set, and the uplink burst of the first sub-band set includes a time unit occupied when the network device schedules the terminal device to send the uplink information. The maximum channel occupancy time corresponding to the first sub-band set is a corresponding maximum channel occupancy time in which the network device performs channel listening for the first sub-band set before the network device sends the downlink information.

In some embodiments, the maximum channel occupancy time corresponding to the first sub-band set is determined based on a maximum channel occupancy time corresponding to each sub-band in the first sub-band set, and a maximum channel occupancy time corresponding to any sub-band in the first sub-band set is a corresponding maximum channel occupancy time in which the network device performs channel listening on the any sub-band before the network device sends the downlink information.

In one example implementation, when each sub-band in the first sub-band set is included in the second sub-band set, and an uplink burst on each sub-band in the first sub-band set is within a maximum channel occupancy time of each sub-band, the channel listening type is the short listening type. For an $i^{th}$ sub-band in the first sub-band set, that an uplink burst on the $i^{th}$ sub-band is within a maximum channel occupancy time of the $i^{th}$ sub-band includes: the $i^{th}$ uplink burst on the $i^{th}$ sub-band is within the maximum channel occupancy time of the $i^{th}$ sub-band.

The $i^{th}$ uplink burst is at least one consecutive time unit that the network device schedules the terminal device to occupy on the $i^{th}$ sub-band, and the $i^{th}$ uplink burst includes a time unit occupied when the network device schedules the terminal device to send the uplink information.

The maximum channel occupancy time of the $i^{th}$ sub-band is a corresponding maximum channel occupancy time in which the network device performs channel listening on the $i^{th}$ sub-band before the network device sends the downlink information, where i is an integer greater than 0 and less than or equal to N, N is a quantity of sub-bands included in the first sub-band set, and N is a positive integer.

In one example implementation, when at least one sub-band in the first sub-band set is not included in the second sub-band set, the channel listening type is the long listening type.

In one example implementation, when each sub-band in the first sub-band set is included in the second sub-band set, and the uplink burst of the first sub-band set is not within the maximum channel occupancy time corresponding to the first sub-band set, the channel listening type is the long listening type. The uplink burst of the first sub-band set is the at least one consecutive time unit that the network device schedules the terminal device to occupy in the first sub-band set, and the uplink burst of the first sub-band set includes the time unit occupied when the network device schedules the terminal device to send the uplink information.

The maximum channel occupancy time corresponding to the first sub-band set is the corresponding maximum channel occupancy time in which the network device performs channel listening for the first sub-band set before the network device sends the downlink information.

In some embodiments, the maximum channel occupancy time corresponding to the first sub-band set is determined based on the maximum channel occupancy time corresponding to each sub-band in the first sub-band set, and the maximum channel occupancy time corresponding to the any sub-band in the first sub-band set is the corresponding maximum channel occupancy time in which the network device performs channel listening on the any sub-band before the network device sends the downlink information.

In one example implementation, when each sub-band in the first sub-band set is included in the second sub-band set, and the $i^{th}$ uplink burst on the $i^{th}$ sub-band in the first sub-band set is not within the maximum channel occupancy time of the $i^{th}$ sub-band, the channel listening type is the long listening type. The $i^{th}$ uplink burst is the at least one consecutive time unit that the network device schedules the terminal device to occupy on the $i^{th}$ sub-band, and the $i^{th}$ uplink burst includes the time unit occupied when the network device schedules the terminal device to send the uplink information.

The maximum channel occupancy time of the $i^{th}$ sub-band is the corresponding maximum channel occupancy time in which the network device performs channel listening on the $i^{th}$ sub-band before the network device sends the downlink information, where i is an integer greater than 0 and less than or equal to N, N is the quantity of sub-bands included in the first sub-band set, and N is a positive integer.

In one example implementation, the receiving, by a terminal device, first indication information sent by a network device includes:

receiving, by the terminal device, scheduling signaling sent by the network device, where the scheduling signaling carries the first indication information, and the scheduling signaling is used to schedule the terminal device to occupy the first sub-band set and a first time unit to send the uplink information.

In one example implementation, the first sub-band set includes at least two sub-bands.

In one example implementation, the long listening type is random backoff clear channel assessment, and the short listening type is single-slot clear channel assessment.

According to a third aspect, a channel listening type indication method is provided, and the method includes: generating, by a network device, first indication information, where the first indication information is used to indicate a second sub-band set occupied by the network device to send downlink information; and sending, by the network device, the first indication information to a terminal device.

In one example implementation, the first indication information is further used to indicate an uplink time domain resource of the second sub-band set. A sum of the uplink time domain resource of the second sub-band set and a time domain resource occupied for the downlink information in the second sub-band set does not exceed a maximum channel occupancy time corresponding to the second sub-band set. The uplink time domain resource of the second sub-band set is a corresponding time domain resource used by the terminal device to perform channel listening of a short listening type on at least one sub-band in the second sub-band set.

In one example implementation, the first indication information is further used to indicate an uplink time domain resource of the second sub-band set. A sum of the uplink time domain resource of the second sub-band set and a time domain resource occupied for the downlink information on any sub-band in the second sub-band set does not exceed a maximum channel occupancy time of the any sub-band. The uplink time domain resource of the second sub-band set is a corresponding time domain resource used by the terminal device to perform channel listening of a short listening type on at least one sub-band in the second sub-band set.

In one example implementation, the first indication information is further used to indicate an uplink time domain resource of each sub-band in the second sub-band set. An uplink time domain resource of any sub-band in the second sub-band set is determined based on a maximum channel occupancy time of the any sub-band, and the uplink time domain resource of the any sub-band is a corresponding time domain resource used by the terminal device to perform channel listening of a short listening type on the any sub-band.

In one example implementation, a sum of the uplink time domain resource of the any sub-band and a time domain resource occupied for the downlink information on the any sub-band does not exceed the maximum channel occupancy time of the any sub-band.

In one example implementation, when each sub-band in the first sub-band set is included in the second sub-band set, the first indication information is further used to indicate an uplink time domain resource of the first sub-band set. A sum of the uplink time domain resource of the first sub-band set and a time domain resource occupied for the downlink information in the first sub-band set does not exceed a maximum channel occupancy time corresponding to the first sub-band set. The first sub-band set includes at least one sub-band occupied when the network device schedules the terminal device to send uplink information. The uplink time domain resource of the first sub-band set is a corresponding time domain resource used by the terminal device to perform channel listening of a short listening type on the at least one sub-band in the first sub-band set.

In one example implementation, when each sub-band in the first sub-band set is included in the second sub-band set, the first indication information is further used to indicate an uplink time domain resource of the first sub-band set.

A sum of the uplink time domain resource of the first sub-band set and a time domain resource occupied for the downlink information on any sub-band in the first sub-band set does not exceed a maximum channel occupancy time of the any sub-band. The first sub-band set includes at least one sub-band occupied when the network device schedules the terminal device to send the uplink information. The uplink time domain resource of the first sub-band set is a corresponding time domain resource used by the terminal device to perform channel listening of a short listening type on the at least one sub-band in the first sub-band set.

In one example implementation, when each sub-band in the first sub-band set is included in the second sub-band set, the first indication information is further used to indicate an uplink time domain resource of each sub-band in the first sub-band set.

An uplink time domain resource of any sub-band in the first sub-band set is determined based on a maximum channel occupancy time of the any sub-band, and the uplink time domain resource of the any sub-band is a corresponding time domain resource used by the terminal device to perform channel listening of a short listening type on the any sub-band. The first sub-band set includes at least one sub-band occupied when the network device schedules the terminal device to send the uplink information.

In one example implementation, a sum of the uplink time domain resource of the any sub-band and a time domain resource occupied for the downlink information on the any sub-band does not exceed the maximum channel occupancy time of the any sub-band.

In one example implementation, the second sub-band set includes at least two sub-bands.

In one example implementation, the first sub-band set includes at least two sub-bands.

According to a fourth aspect, a channel listening type indication method is provided, and the method includes: receiving, by a terminal device, first indication information sent by a network device, where the first indication information is used to indicate a second sub-band set occupied by the network device to send downlink information; determining, by the terminal device based on the first indication information, a channel listening type for performing channel listening on a first sub-band, where the first sub-band is a sub-band occupied when the network device schedules the terminal device to send uplink information; and performing, by the terminal device, channel listening on the first sub-band based on the channel listening type.

In one example implementation, the first indication information is further used to indicate an uplink time domain resource of the second sub-band set. A sum of the uplink time domain resource of the second sub-band set and a time domain resource occupied for the downlink information in the second sub-band set does not exceed a maximum channel occupancy time corresponding to the second sub-band set. The uplink time domain resource of the second sub-band set is a corresponding time domain resource used by the terminal device to perform channel listening of a short listening type on at least one sub-band in the second sub-band set.

The determining, by the terminal device based on the first indication information, a channel listening type for performing channel listening on a first sub-band includes: when the first sub-band is included in the second sub-band set, and an uplink burst on the first sub-band is located in the uplink time domain resource of the second sub-band set, determining, by the terminal device, that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In one example implementation, the first indication information is further used to indicate an uplink time domain resource of the second sub-band set.

A sum of the uplink time domain resource of the second sub-band set and a time domain resource occupied for the downlink information on any sub-band in the second sub-band set does not exceed a maximum channel occupancy time of the any sub-band. The uplink time domain resource of the second sub-band set is a corresponding time domain resource used by the terminal device to perform channel listening of a short listening type on at least one sub-band in the second sub-band set.

The determining, by the terminal device based on the first indication information, a channel listening type for performing channel listening on a first sub-band includes: when the first sub-band is included in the second sub-band set, and an uplink burst on the first sub-band is located in the uplink time domain resource of the second sub-band set, determining, by the terminal device, that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In one example implementation, the first indication information is further used to indicate an uplink time domain resource of each sub-band in the second sub-band set.

An uplink time domain resource of any sub-band in the second sub-band set is determined based on the maximum channel occupancy time of the any sub-band, and the uplink time domain resource of the any sub-band is a corresponding time domain resource used by the terminal device to perform channel listening of a short listening type on the any sub-band. The determining, by the terminal device based on the first indication information, a channel listening type for performing channel listening on a first sub-band includes: when the first sub-band is included in the second sub-band set, and an uplink burst on the first sub-band is located in an uplink time domain resource of the first sub-band, determining, by the terminal device, that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In one example implementation, a sum of the uplink time domain resource of the any sub-band and a time domain resource occupied for the downlink information on the any sub-band does not exceed the maximum channel occupancy time of the any sub-band.

In one example implementation, when each sub-band in the first sub-band set is included in the second sub-band set, the first indication information is further used to indicate an uplink time domain resource of the first sub-band set.

A sum of the uplink time domain resource of the first sub-band set and a time domain resource occupied for the downlink information in the first sub-band set does not exceed a maximum channel occupancy time corresponding to the first sub-band set. The first sub-band set includes at least one sub-band occupied when the network device schedules the terminal device to send the uplink information. The uplink time domain resource of the first sub-band set is a corresponding time domain resource used by the terminal device to perform channel listening of a short listening type on at least one sub-band in the first sub-band set.

The determining, by the terminal device based on the first indication information, a channel listening type for performing channel listening on a first sub-band includes: when the first sub-band is included in the first sub-band set, and an uplink burst on the first sub-band is located in the uplink time domain resource of the first sub-band set, determining, by the terminal device, that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In one example implementation, when each sub-band in the first sub-band set is included in the second sub-band set, the first indication information is further used to indicate an uplink time domain resource of the first sub-band set.

A sum of the uplink time domain resource of the first sub-band set and a time domain resource occupied for the downlink information on any sub-band in the first sub-band set does not exceed a maximum channel occupancy time of the any sub-band. The first sub-band set includes at least one sub-band occupied when the network device schedules the terminal device to send the uplink information. The uplink time domain resource of the first sub-band set is a corresponding time domain resource used by the terminal device to perform channel listening of a short listening type on the at least one sub-band in the first sub-band set.

The determining, by the terminal device based on the first indication information, a channel listening type for performing channel listening on a first sub-band includes: when the first sub-band is included in the first sub-band set, and an uplink burst on the first sub-band is located in the uplink time domain resource of the first sub-band set, determining, by the terminal device, that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In one example implementation, when each sub-band in the first sub-band set is included in the second sub-band set, the first indication information is further used to indicate an uplink time domain resource of each sub-band in the first sub-band set.

An uplink time domain resource of any sub-band in the first sub-band set is determined based on a maximum channel occupancy time of the any sub-band, and the uplink time domain resource of the any sub-band is a corresponding time domain resource used by the terminal device to perform channel listening of a short listening type. The first sub-band set includes at least one sub-band occupied when the network device schedules the terminal device to send uplink information.

The determining, by the terminal device based on the first indication information, a channel listening type for performing channel listening on a first sub-band includes: when the first sub-band is included in the first sub-band set, and an uplink burst on the first sub-band is located in the uplink time domain resource of the first sub-band, determining, by the terminal device, that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In one example implementation, a sum of the uplink time domain resource of the any sub-band and a time domain resource occupied for the downlink information on the any sub-band does not exceed the maximum channel occupancy time of the any sub-band.

In one example implementation, the second sub-band set includes at least two sub-bands.

In one example implementation, the first sub-band set includes at least two sub-bands.

According to a fifth aspect, a channel listening type indication method is provided, and includes:

generating, by a terminal device, first indication information, where the first indication information is used to indicate a first sub-band set occupied by the terminal device to send uplink information; and sending, by the terminal device, the first indication information to a network device.

In one example implementation, the first indication information is further used to indicate a downlink time domain resource of the first sub-band set. A sum of the downlink time domain resource of the first sub-band set and a time domain resource occupied for the uplink information in the first sub-band set does not exceed a maximum channel occupancy time corresponding to the first sub-band set. The downlink time domain resource of the first sub-band set is a corresponding time domain resource used by the network device to perform channel listening of a short listening type on at least one sub-band in the first sub-band set.

In one example implementation, the first indication information is further used to indicate a downlink time domain resource of the first sub-band set. A sum of the downlink time domain resource of the first sub-band set and a time domain resource occupied for the uplink information on any sub-band in the first sub-band set does not exceed a maximum channel occupancy time of the any sub-band. The downlink time domain resource of the first sub-band set is a corresponding time domain resource used by the network device to perform channel listening of a short listening type on at least one sub-band in the first sub-band set.

In one example implementation, the first indication information is further used to indicate a downlink time domain resource of each sub-band in the first sub-band set. A downlink time domain resource of any sub-band in the first sub-band set is determined based on a maximum channel occupancy time of the any sub-band, and the downlink time domain resource of the any sub-band is a corresponding time domain resource used by the network device to perform channel listening of a short listening type on the any sub-band.

In one example implementation, a sum of the uplink time domain resource of the any sub-band and a time domain resource occupied for the uplink information on the any sub-band does not exceed the maximum channel occupancy time of the any sub-band.

In one example implementation, the first sub-band set includes at least two sub-bands.

According to a sixth aspect, a channel listening type indication method is provided, and the method includes: receiving, by a network device, first indication information sent by a terminal device, where the first indication information is used to indicate a first sub-band set occupied by the terminal device to send uplink information; determining, by the network device based on the first indication information, a channel listening type for performing channel listening on a second sub-band, where the second sub-band is a sub-band occupied by the network device to send downlink information; and performing, by the network device, channel listening on the second sub-band based on the channel listening type.

In one example implementation, the first indication information is further used to indicate a downlink time domain resource of the first sub-band set. A sum of the downlink time domain resource of the first sub-band set and a time domain resource occupied for the uplink information in the first sub-band set does not exceed a maximum channel occupancy time corresponding to the first sub-band set. The uplink time domain resource of the first sub-band set is a corresponding time domain resource used by the network device to perform channel listening of a short listening type on at least one sub-band in the first sub-band set.

The determining, by the network device based on the first indication information, a channel listening type for performing channel listening on a second sub-band includes: when the second sub-band is included in the first sub-band set, and an uplink burst on the second sub-band is located in the downlink time domain resource of the first sub-band set, determining, by the network device, that the channel listening type is a short channel listening type. The downlink burst on the second sub-band is at least one consecutive time unit occupied by the terminal device on the second sub-band, and the downlink burst on the second sub-band includes a time unit occupied by the network device to send the downlink information.

In one example implementation, the first indication information is further used to indicate a downlink time domain resource of the first sub-band set.

A sum of the downlink time domain resource of the first sub-band set and a time domain resource occupied for the uplink information on any sub-band in the first sub-band set does not exceed a maximum channel occupancy time of the any sub-band. The downlink time domain resource of the first sub-band set is a corresponding time domain resource used by the terminal device to perform channel listening of a short listening type on at least one sub-band in the first sub-band set.

The determining, by the network device based on the first indication information, a channel listening type for performing channel listening on a second sub-band includes: when the second sub-band is included in the first sub-band set, and a downlink burst on the second sub-band is located in the downlink time domain resource of the first sub-band set, determining, by the network device, that the channel listening type is a short channel listening type. The downlink burst on the second sub-band is at least one consecutive time unit occupied by the network device on the second sub-band, and the downlink burst on the second sub-band includes a time unit occupied by the network device to send the downlink information.

In one example implementation, the first indication information is further used to indicate a downlink time domain resource of each sub-band in the first sub-band set.

A downlink time domain resource of any sub-band in the first sub-band set is determined based on a maximum channel occupancy time of the any sub-band, and the downlink time domain resource of the any sub-band is a corresponding time domain resource used by the network device to perform channel listening of a short listening type on the any sub-band. The determining, by the network device based on the first indication information, a channel listening type for performing channel listening on a first sub-band includes: when the second sub-band is included in the first sub-band set, and a downlink burst on the second sub-band is located in a downlink time domain resource of the second sub-band, determining, by the network device, that the channel listening type is a short channel listening type. The downlink burst on the second sub-band is at least one consecutive time unit occupied by the network device on the second sub-band, and the downlink burst on the second sub-band includes a time unit occupied by the network device to send the downlink information.

In one example implementation, a sum of the downlink time domain resource of the any sub-band and a time domain resource occupied for the uplink information on the any sub-band does not exceed the maximum channel occupancy time of the any sub-band.

In one example implementation, the first sub-band set includes at least two sub-bands.

According to a seventh aspect, a channel listening type indication apparatus is provided and is applied to a network device. The apparatus includes units or means (means) configured to perform the steps in the first aspect, the third aspect, or the fifth aspect.

According to an eighth aspect, a channel listening type indication apparatus is provided and is applied to a terminal device. The apparatus includes units or means (means) configured to perform the steps in the second aspect, the fourth aspect, or the sixth aspect.

According to a ninth aspect, this application provides a communications apparatus, including a processor and a memory. The memory is configured to store a computer-executable instruction, and the processor is configured to execute the computer-executable instruction stored in the memory, so that the communications apparatus performs the method in any one of the first aspect to the sixth aspect.

According to a tenth aspect, this application provides a computer readable storage medium. The computer readable storage medium stores an instruction, and when the instruction is run on a computer, the computer is enabled to perform the method in any one of the first aspect to the sixth aspect.

According to an eleventh aspect, this application provides a chip. The chip is connected to a memory, and is configured to read and execute a software program stored in the memory, to implement the method in any one of the first aspect to the sixth aspect.

According to a twelfth aspect, this application provides a communications system, and the communications system includes the network device in the seventh aspect and the terminal device in the eighth aspect.

In embodiments of this application, the network device may determine, based on the relationship between the first sub-band set and the second sub-band set, the corresponding channel listening type for performing channel listening by the terminal device for the first sub-band set, and then the network device may send the first indication information to the terminal device, where the first indication information may indicate the channel listening type. It can be learned that, according to the method and the apparatus provided in various embodiments, the network device may indicate a channel listening type used by the terminal device to perform channel listening on a sub-band.

DESCRIPTION OF EMBODIMENTS

Various embodiments provide a channel listening type indication method and apparatus, so as to indicate a channel listening type in a wideband transmission technology scenario. The method and the apparatus are based on a same invention concept. The method and the apparatus have similar problem-resolving principles. Therefore, for implementation of the apparatus and the method, mutual reference may be made, and repeated content is not repeated.

The following clearly and completely describes the technical solutions in various embodiments with reference to the accompanying drawings in various embodiments.

Figure 1:
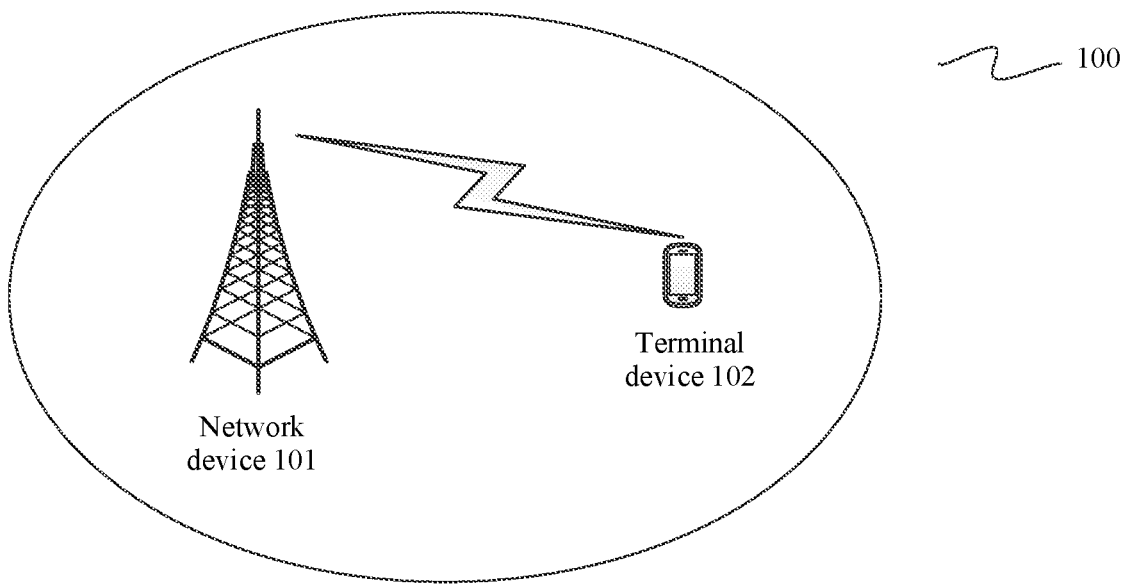
FIG. 1 shows a communications system according to an embodiment of this application.

FIG. 1 shows a communications system 100 according to an embodiment of this application. The communications system 100 includes a network device 101 and a terminal device 102.

The network device 101 is responsible for providing a wireless access related service for the terminal device 102, and implementing a wireless physical layer function, resource scheduling and radio resource management, quality of service (QoS) management, radio access control, and a mobility management function.

The terminal device 102 is a device that accesses a network by using the network device 101.

The network device 101 is connected to the terminal device 102 by using a Uu interface, to implement communication between the terminal device 102 and the network device 101.

Further, in various embodiments, the communications system 100 may support a wideband (WB) transmission technology, to extend a bandwidth occupied by a carrier. For example, in the communications system 100, a bandwidth of a carrier is extended from 20 MHz in an LTE system to 40 MHz, the carrier may include two sub-bands, and each sub-band occupies 20 MHz. In various embodiments, the network device 101 may occupy a sub-band set including at least one sub-band, to send downlink information, and the terminal device may occupy a sub-band set including at least one sub-band, to send uplink information. For ease of description, a sub-band set occupied for sending uplink information is referred to as a first sub-band set, and a sub-band set occupied for sending downlink information is referred to as a second sub-band set below.

In various embodiments, the network device 101 and the terminal device 102 may work on an unlicensed spectrum, and the network device 101 and the terminal device 102 use a listen before talk (listen before talk, LBT) channel access mechanism. LBT is also referred to as channel listening, and for example means that a sending node first needs to perform channel listening before performing data transmission, and then performs data transmission after the channel listening succeeds. For example, before the network device 101 occupies the second sub-band set to send downlink information, the network device 101 needs to listen to whether the second sub-band set (or each sub-band in the second sub-band set) is idle. After the listening performed for the second sub-band set succeeds, the network device 101 occupies the second sub-band set to send the downlink information. For another example, before the terminal device 102 occupies the first sub-band set to send uplink information, the terminal device 102 needs to listen to whether the first sub-band set (or each sub-band in the first sub-band set) is idle. After the listening performed for the first sub-band set succeeds, the terminal device 102 occupies the first sub-band set to send the uplink information.

In various embodiments, the communications system 100 may be various radio access technology (RAT) systems, for example, a code division multiple access (CDMA) system, a time division multiple access (TDMA) system, a frequency division multiple access (FDMA) system, an orthogonal frequency division multiple access (OFDMA)

system, a single carrier frequency division multiple access (SC-FDMA) system, and other systems. The terms "system" and "network" can be interchanged with each other. The CDMA system may implement wireless technologies such as universal terrestrial radio access (UTRA) and CDMA2000. UTRA may include a wideband CDMA (WCDMA) technology and another variation technology of CDMA. CDMA 2000 may cover the interim standard (IS) 2000 (IS-2000), the IS-95 standard, and the IS-856 standard. The TDMA system may implement wireless technologies such as global system for mobile communications (GSM). The OFDMA system may implement wireless technologies such as evolved universal terrestrial radio access (evolved UTRA, E-UTRA), ultra mobile broadband (ultra mobile broadband UMB), IEEE 802.11 (Wi-Fi), IEEE 802.16 (WiMAX), IEEE 802.20, and Flash OFDMA. UTRA is corresponding to UMTS, and E-UTRA is corresponding to an evolved version of UMTS. A new version of UMTS, namely, E-UTRA, is used in 3GPP long term evolution (long term evolution, LTE) and various versions evolved based on LTE. In addition, the communications system is further applicable to a future-oriented communications technology. Any communications system that uses a new communications technology and that includes bearer setup is applicable to the technical solutions provided in various embodiments. A system architecture and a service scenario described in various embodiments are intended to describe the technical solutions in various embodiments more clearly, and do not constitute a limitation to the technical solutions in accordance with the present disclosure. A person of ordinary skill in the art may know that, with evolution of a network architecture and emergence of new service scenarios, the technical solutions provided in various embodiments are also applicable to similar technical problems.

In various embodiments, the network device 101 is an apparatus that is deployed in a radio access network and that is configured to provide a wireless communication function for UE 102. The network device 101 may include various forms of macro base stations, micro base stations (also referred to as small cells), relay stations, access points, and the like. In systems that use different radio access technologies, a device having a base station function may be named differently. For example, the device is referred to as an evolved NodeB (eNB or eNodeB) in the LTE system, or the device is referred to as a NodeB (Node B) in a 3rd generation (3G) system, or the device is referred to as a gNB in an NR system. For ease of description, in all various embodiments, apparatuses that provide a wireless communication function for the terminal device 102 are collectively referred to as a base station.

In various embodiments, the terminal device 102 may include various handheld devices, vehicle-mounted devices, wearable devices, or computing devices that have a wireless communication function, or other processing devices connected to a wireless modem. The terminal device may also be referred to as a mobile station (MS for short), a terminal, or user equipment (UE). Alternatively, the terminal device 102 may include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or the like. For ease of description, in all various embodiments, the devices mentioned above are collectively referred to as the terminal device.

It should be noted that data and a type of the terminal device included in the communications system 100 shown in FIG. 1 are merely an example. Various embodiments are not limited thereto. For example, the communications system 100 may alternatively include more terminal devices 102 that communicate with the network device 101. For brevity, the terminal devices 102 are not described one by one in the accompanying drawings. In addition, although the network device 101 and the terminal device 102 are shown in the communications system 100 shown in FIG. 1, the communications system 100 may further include but is not limited to the network device 101 and the terminal device 102, for example, may further include a core network device. This is obvious for a person skilled in the art. Details are not described herein again.

For ease of understanding by a person skilled in the art, the following explains and describes some terms In accordance with the disclosure.

(1) First sub-band set: The first sub-band set includes at least one sub-band. The at least one sub-band is a sub-band occupied when a network device schedules a terminal device to send uplink information. The uplink information may be uplink data information, and the uplink information may further be an uplink data packet. Further, the first sub-band set includes at least two sub-bands.

(2) Second sub-band set: The second sub-band set includes at least one sub-band. The at least one sub-band is a sub-band occupied by the network device to send downlink information. The downlink information may include at least one of downlink data information, downlink control information, downlink broadcast information, downlink synchronization information, and a downlink reference signal. Further, the second sub-band set includes at least two sub-bands.

(3) Channel listening of a long listening type: The channel listening of a long listening type is generally channel listening that consumes a relatively long time from a moment at which the channel listening is started to a moment at which the channel listening succeeds. For example, the channel listening of a long listening type needs to be performed in at least one listening slot. If a sending node detects, through listening, that a channel is idle in the at least one listening slot, it indicates that the listening succeeds, and the sending node may occupy the channel to send information. Further, a quantity of the at least one listening slot is not fixed. For another example, the channel listening of a long listening type may be random backoff clear channel assessment (CCA), or may be referred to as type 1 channel access (type 1 channel access). A principle of the random backoff clear channel assessment is as follows: The sending node evenly and randomly generates one backoff counter N between 0 and an initial contention window (CW), and listens to a channel at a granularity of a listening slot (for example, duration is 9 us). If the sending node detects that the channel is idle in the listening slot, the backoff counter is decreased by 1. Alternatively, if the sending node detects that the channel is busy in the listening slot, the backoff counter is suspended. In other words, the backoff counter N remains unchanged in a busy time of the channel, and the backoff counter performs counting again until the sending node detects that the channel is idle. When the backoff counter is decreased to 0, it is considered that the channel listening succeeds, and the sending node may immediately occupy the channel to send information. Alternatively, after the backoff counter is decreased to 0, the sending node may voluntarily wait for a period of time instead of immediately sending information, and after the waiting ends, the sending node performs listening in an additional slot again before a moment at which the information needs to be sent. If the sending node detects, through listening, that the channel is idle in the additional slot, it is considered that the channel listening succeeds, and the sending node may immediately send the information. If the backoff counter is not decreased to 0 before a start moment of the information, or if the sending node detects, through listening, that the channel is busy in the additional listening slot, it indicates that the channel listening fails. The sending node includes the terminal device or the network device.

After the channel listening of a long listening type succeeds, the sending node (which may be the network device or the terminal device) may immediately occupy the foregoing channel to send the information, and maximum duration in which the sending node may continuously occupy the channel is referred to as a maximum channel occupancy time (MCOT). In addition, if the sending node does not run out the MCOT, the sending node may share a remaining MCOT with another sending node. If the another sending node sends information within the remaining MCOT, the another sending node performs channel listening of a short listening type instead of the channel listening of a long listening type, so as to access a channel to send information.

(4) Channel listening of a short listening type: The channel listening of a short listening type is generally channel listening that consumes a relatively short time from a moment at which the channel listening is started to a moment at which the channel listening succeeds. For example, the channel listening of a short listening type needs to be performed in one listening slot. If the sending node detects, through listening, that a channel is idle in the one listening slot, it indicates that the listening succeeds, and the sending node may occupy the channel to send information. For another example, the channel listening of a short listening type needs to be performed in a preset quantity of listening slots. If the sending node detects, through listening, that a channel is idle in all the preset quantity of listening slots, it indicates that the listening succeeds, and the sending node may occupy the channel to send information. For another example, the channel listening of a short listening type may be single-slot CCA, one shot (one shot) CCA, or 25 us CCA, or may be referred to as type 2 channel access (type 2 channel access). A principle of the single-slot clear channel assessment is as follows: The sending node listens to a channel in a single slot of a preset time length (for example, the preset time length is 25 us). If the sending node detects that the channel is idle in the single slot, it is considered that the channel listening succeeds, and the sending node may immediately access the channel to send information. If the sending node detects that the channel is busy, the sending node stops sending information, which is referred to as a channel listening failure. It can be understood that the channel listening of a short listening type is not limited to the foregoing clear channel assessment manner. The channel listening of a short listening type may alternatively be other channel listening during which carrier listening can be quickly performed. This is not limited herein. In addition, channel listening duration is not limited to 25 us, and may be longer or shorter. The channel listening may be performed once, twice, three times, or more. This is not For example limited herein. The sending node includes the terminal device or the network device.

It should be understood that, for the channel listening of a long listening type or the channel listening of a short listening type, there are two channel statuses: an idle state and a busy state. A criterion for determining a channel status is as follows: A wireless communications device compares energy or power on a channel received in a listening slot with an energy detection threshold (CCA-ED). If the energy or power is greater than the threshold, the channel is busy; or if the energy or power is less than the threshold, the channel is idle.

(5) "A plurality of" means two or more, and other quantifiers are similar to this.

(6) Sub-band: One sub-band may be a frequency domain resource used to carry downlink information or uplink information. The one sub-band may be a sub-band (for example, an sub-band) included in the first sub-band set or a sub-band included in the second sub-band set. In some embodiments, the one sub-band may include at least one subcarrier (subcarrier), or the one sub-band may include at least one physical resource block (physical resource block, PRB), or the one sub-band may be a frequency domain resource corresponding to a bandwidth of 5 MHz, 10 MHz, 15 MHz, or 20 MHz. For example, the frequency band may correspond to a frequency domain resource occupied by one carrier in an LTE system. Alternatively, the one sub-band may be one carrier, or the one sub-band may be referred to as a bandwidth part (BWP). In some embodiments, the one sub-band is a frequency domain unit in which the network device or the terminal device performs channel listening. For example, the network device or the terminal device performs the channel listening of a long listening type or the channel listening of a short listening type on the one sub-band (performs another independent channel listening procedure on another different sub-band), or maintains a contention window (CW) length for the one sub-band (maintains another independent CW for the another sub-band), or independently performs the channel listening of a long listening type or the channel listening of a short listening type on different sub-bands, or independently maintains contention window lengths for different sub-bands. For another example, during channel listening, when the network device or the terminal device compares energy or power detected in a listening slot on the one sub-band with a listening threshold CCA-ED corresponding to the one sub-band to determine whether a channel is busy or idle (to independently determine whether the channel is busy or idle on the another sub-band). For another example, the network device or the terminal device can occupy the one sub-band to send information only after LBT performed on the one sub-band succeeds (independently determine whether LBT performed on the another sub-band succeeds). It should be understood that the foregoing definition of the one sub-band is also applicable to a description of any sub-band included in the first sub-band set or the second sub-band set, and is also applicable to a description of a first sub-band, a second sub-band, the $i^{th}$ sub-band, and a $j^{th}$ sub-band, where i and j are positive integers.

In addition, it should be understood that, in descriptions of this application, terms such as "first" and "second" are merely used for differentiation and description, but should not be understood as an indication or an implication of relative importance or an indication or implication of an order.

In the prior art, a type for performing listening by the terminal device for the first sub-band set may include a short listening type and a long listening type. The network device may indicate the type for performing listening by the terminal device for the first sub-band set. If a design in LTE is still used, the network device needs to indicate a listening type for each sub-band in the first sub-band set. This causes relatively high notification signaling overheads.

In the solutions provided in various embodiments, the network device may send only one piece of indication information for the first sub-band set of the terminal device, to indicate the channel listening type of the terminal device for the first sub-band set. Compared with the design in LTE, the network device does not need to indicate the channel listening type for each sub-band in the first sub-band set. This can reduce signaling overheads.

Figure 2:
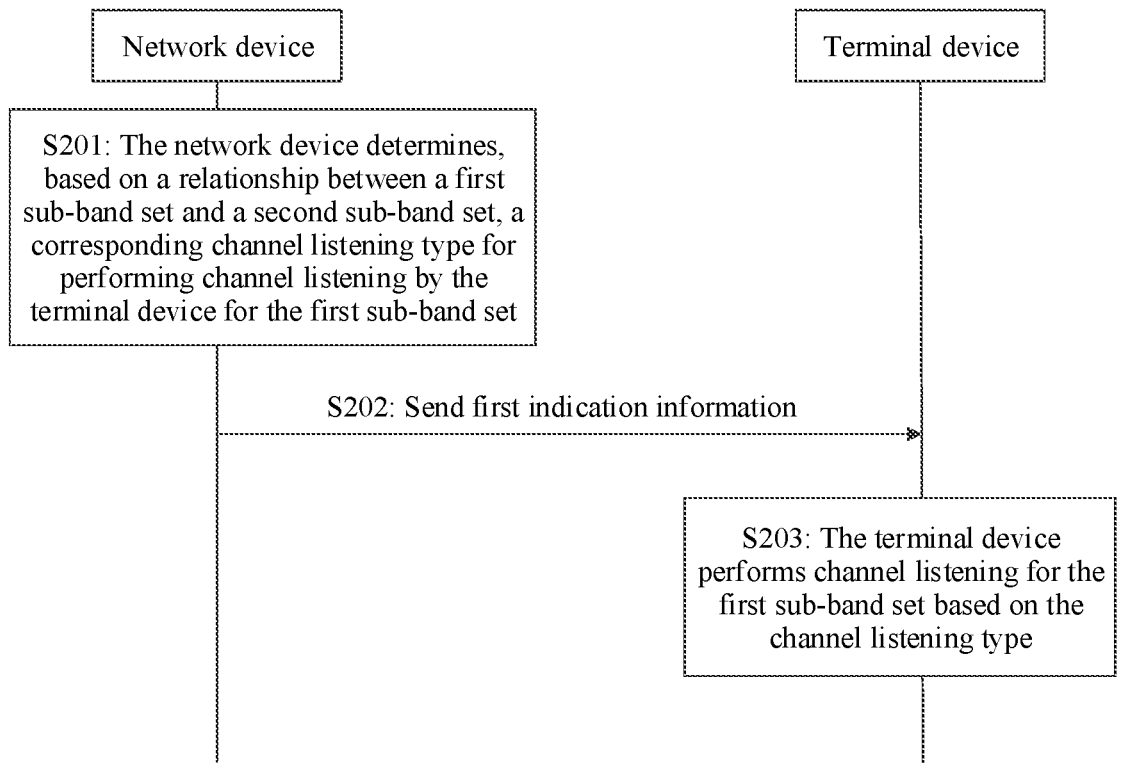
FIG. 2 is a flowchart of a channel listening type indication method according to an embodiment of this application.

Based on the communications system 100 shown in FIG. 1, as shown in FIG. 2, this application provides a channel listening type indication method. A network device in FIG. 2 may be For example the network device 101 in FIG. 1, and a terminal device may be For example the terminal device 102 in FIG. 1. The method includes the following steps.

Step S201: The network device determines, based on a relationship between a first sub-band set and a second sub-band set, a corresponding channel listening type for performing channel listening by the terminal device for the first sub-band set, where the channel listening type includes a long listening type or a short listening type.

To increase an opportunity of accessing a channel by the terminal device, when the network device occupies a specific sub-band to send downlink information after channel listening of a long listening type performed by the network device succeeds, if the network device schedules the terminal device to send uplink information on the sub-band set, the terminal device may not perform channel listening of a long listening type, but performs channel listening of a short listening type, so as to quickly access a channel.

It should be understood that the first sub-band set includes at least one sub-band occupied when the network device schedules the terminal device to send the uplink information.

For example, in this embodiment, the network device may schedule the terminal device to occupy all sub-bands in the first sub-band set to send the uplink information. In other words, each sub-band in the first sub-band set is a sub-band occupied when the network device schedules the terminal device to send the uplink information, and each sub-band is used to carry a part of the uplink information. It should be understood that the uplink information may include data information, control information, or pilot information. The uplink information may include one data packet, or may include at least two data packets, or may include a part of one data packet. This is not limited herein.

It should be understood that, for any sub-band that the network device schedules the terminal device to occupy in the first sub-band set, all frequency domain resources (for example, all PRBs) corresponding to the any sub-band may be occupied for the uplink information, or some frequency domain resources (for example, some PRBs) corresponding to the any sub-band may be occupied for the uplink information. The two cases are referred to as that the any sub-band is occupied for the uplink information.

It should be understood that the second sub-band set includes at least one sub-band occupied by the network device to send the downlink information.

For example, in this embodiment, that the network device occupies the second sub-band set to send the downlink information includes: The network device occupies all sub-bands in the second sub-band set to send the downlink information. In other words, each sub-band in the second sub-band set is a sub-band occupied by the network device to send the downlink information, and each sub-band is used to carry a part of the downlink information. It should be understood that, for any sub-band in the second sub-band set that is occupied by the network device, the network device may occupy all frequency domain resources (for example, all PRBs) corresponding to the any sub-band, or may occupy some frequency domain resources (some PRBs) corresponding to the any sub-band. The two cases are referred to as that the any sub-band is occupied for the downlink information.

It should be understood that the downlink information may include data information such as data information on a physical downlink shared channel (PDSCH), uplink control information, pilot information, user-specific information, broadcast information, or multicast information. When the downlink information includes data information, the downlink information may include one data packet, or may include at least two data packets, or may include a part of one data packet. This is not limited herein. When the downlink information includes at least two data packets, any one of the at least two data packets may be carried on all the sub-bands in the second sub-band set, or may be carried on some sub-bands in the second sub-band set. This is not limited herein.

It should be understood that, when the second sub-band set includes at least two sub-bands, for any sub-band that is included in the second sub-band set and that is used to carry a part of the downlink information (which is referred to as a first part of information) and any other sub-band that is included in the second sub-band set and that is used to carry the other part of the downlink information (which is referred to as a second part of information), a corresponding time domain resource used when the network device sends the first part of information on the any sub-band may be the same as or may be different from a corresponding time domain resource used when the network device sends the second part of information on the any other sub-band. For example, the network device may occupy a subframe #1 to a subframe #4 on a sub-band #n to send the first part of information, and occupy a subframe #1 to a subframe #3 on a sub-band #k to send the second part of information. In addition, a corresponding MCOT in which the network device sends the first part of information on the any sub-band may be the same as or different from a corresponding MCOT in which the network device sends the second part of information on the any other sub-band. For example, a corresponding MCOT in which the network device sends the first part of information on the sub-band #n may be 8 ms, and a corresponding MCOT in which the network device sends the second part of information on the sub-band #k may be 4 ms.

Step S202: The network device sends first indication information to the terminal device, where the first indication information is used to indicate the channel listening type.

It should be noted that the first indication information is carried in one piece of control signaling. For example, the first indication information may be carried in one piece of physical downlink control signaling, and the physical downlink control signaling may be one piece of downlink control information (DCI). For example, the DCI may be an uplink grant UL grant. For another example, the first indication information is at least one field in the UL grant.

It should be understood that, to reduce overheads, the first indication information may be carried in one piece of control signaling that is used to indicate the channel listening type corresponding to the first sub-band set, instead of being carried in at least two pieces of control signaling that each are used to indicate a listening type for performing channel listening by the terminal device on one sub-band in the first sub-band set.

In other words, in this embodiment of this application, the first indication information used to indicate the channel listening type is specific to the first sub-band set instead of a specific sub-band. In this embodiment of this application, only one piece of first indication information needs to be sent for the first sub-band set, and the channel listening type does not need to be indicated for each sub-band, so as to reduce signaling overheads. Further, the network device sends one piece of control signaling (for example, a UL grant), and indicates, by using the first indication information in the control signaling, the channel listening type corresponding to the first sub-band set that includes at least two sub-bands.

In another example of this application, the network device may send scheduling signaling to the terminal device. The scheduling signaling carries the first indication information, and the scheduling signaling is used to schedule the terminal device to occupy the first sub-band set and a first time unit to send the uplink information. It should be understood that the scheduling signaling may be one piece of scheduling signaling. For example, the scheduling signaling may be one piece of uplink grant (UL grant) signaling. In other words, the network device schedules, by using the UL grant, the terminal device to occupy the first sub-band set to send the uplink information in the first time unit, and indicates a type of channel listening performed by the terminal device on the uplink information. For example, the UL grant may include the channel listening type, and includes at least one piece of scheduling information such as a frequency domain resource occupied for the uplink information, a modulation and coding scheme (MCS), and demodulation reference signal (DMRS) sequence information corresponding to a physical channel that carries the uplink information.

Further, the control signaling that carries the first indication information may be transmitted on one sub-band included in the first sub-band set or the second sub-band set.

Step S203: The terminal device performs channel listening for the first sub-band set based on the channel listening type.

In this embodiment, the terminal device may perform channel listening for the first sub-band set based on the channel listening type, and after the channel listening succeeds, the terminal device occupies the first sub-band set to send the uplink information. Alternatively, the terminal device performs channel listening on at least one sub-band in the first sub-band set, and after the channel listening succeeds, the terminal device occupies the at least one sub-band in the first sub-band set to send the uplink information.

In an example, the channel listening type indicated by the first indication information may be specific to the first sub-band set, and the terminal device performs channel listening for the first sub-band set based on the channel listening type. In this case, the terminal device performs channel listening for the first sub-band set by using a listening method 1. The following For example describes the listening method 1 and a listening method 2.

Listening method 1: The terminal device performs wideband listening for the first sub-band set based on the channel listening type, or performs joint listening for the first sub-band set based on the channel listening type.

For example, when the terminal device determines a channel status (whether a channel is idle or busy), the terminal device compares power or energy detected on all the sub-bands in the first sub-band set in a listening slot with a CCA-ED corresponding to the first sub-band set, and the determined channel idle state or the determined channel busy state is specific to all the sub-bands in the first sub-band set. For example, when the channel listening type is single-slot CCA, the terminal device performs joint wideband single-slot CCA listening on all the sub-bands in the first sub-band set. After the terminal device detects, through listening, that the channel is idle, the terminal device occupies all the sub-bands in the first sub-band set to send the uplink information. When the channel listening type is random backoff CCA, the terminal device performs joint wideband random backoff CCA listening on all the sub-bands in the first sub-band set, and a backoff counter is suspended or decreased for the first sub-band set. After the backoff counter corresponding to the first sub-band set is decreased to 0, the terminal device occupies all the sub-bands in the first sub-band set to send the uplink information.

In another example, the channel listening type indicated by the first indication information may be specific to any sub-band in the first sub-band set, or may be specific to each sub-band in the first sub-band set.

Listening method 2: The terminal device independently performs listening on each sub-band in the first sub-band set based on the channel listening type, or independently performs listening on each of the at least one sub-band in the first sub-band set based on the channel listening type.

It should be understood that, that the terminal device independently performs listening on each sub-band in the first sub-band set based on the channel listening type includes: The terminal device performs listening on each sub-band in the first sub-band set based on the channel listening type indicated by the first indication information. That the terminal device independently performs listening on each of the at least one sub-band in the first sub-band set based on the channel listening type includes: The terminal device performs listening on each of the at least one sub-band in the first sub-band set based on the channel listening type indicated by the first indication information.

For example, for any sub-band (for example, a sub-band #x, where the sub-band #x represents an $x^{th}$ sub-band, and x is a positive integer) in the first sub-band set, when the terminal device determines a channel status (whether a channel is idle or busy), the terminal device compares power or energy received on the sub-band #x in a listening slot with a CCA-ED corresponding to the sub-band #x, so as to determine whether the sub-band #x is idle or busy. In other words, each sub-band in the first sub-band set corresponds to an independent idle or busy state. For example, when the terminal device detects, through listening, that a specific sub-band is idle in a specific listening slot, the terminal device detects, through listening, that another sub-band may be busy. When channel listening performed by the terminal device on a specific sub-band succeeds, channel listening performed by the terminal device on another sub-band may fail.

In some embodiments, in the listening method 2, after the channel listening performed by the terminal device on each of the at least one sub-band in the first sub-band set succeeds, the terminal device occupies the at least one sub-band to send the uplink data information. For example, when the terminal device detects, through listening, that LBT performed by the terminal device on all the sub-bands in the first sub-band set succeeds, the terminal device occupies all the sub-bands to send the uplink information. When the terminal device detects, through listening, that LBT performed by the terminal device on only some sub-bands in the first sub-band set succeeds and LBT performed by the terminal device on the other sub-bands fails, the terminal device occupies only the some sub-bands on which the listening succeeds instead of the other sub-bands on which the listening fails, to send the uplink information or a part of the uplink information. The part of the uplink information is information that is in the uplink information and that is carried on the some sub-bands on which the listening succeeds. For example, when only the listening performed by the terminal device on the some sub-bands succeeds and the terminal device occupies only the some sub-bands, because the first sub-band set is occupied for the uplink information scheduled by the network device and the terminal device does not occupy all the sub-bands in the first sub-band set, the terminal device sends only the part of the uplink information, that is, a part of information carried on the some sub-bands.

If the first indication information indicates the short listening type, the terminal device may perform channel listening of a short listening type on each sub-band in the first sub-band set. That the terminal device may perform channel listening for the first sub-band set based on the channel listening type, and after the channel listening succeeds, the terminal device occupies the first sub-band set to send the uplink information For example includes: Only when listening performed by the terminal device on all the sub-bands in the first sub-band set succeeds, the terminal device occupies all the sub-bands in the first sub-band set to send the uplink information (in other words, if listening performed by the terminal device on any sub-band fails, the terminal device does not occupy the sub-band set to send the uplink information). Alternatively, the terminal device occupies a sub-band that is in the first sub-band set and on which channel listening succeeds, to send the uplink information (or a part of the uplink information). To be specific, if listening performed by the terminal device on some sub-bands in the first sub-band set succeeds, but listening performed by the terminal device on the other sub-bands fails, the terminal device occupies only the some sub-bands that are in the first sub-band set and on which the channel listening succeeds, to send the uplink information or send a part of the uplink information that is carried on the some sub-bands on which the channel listening succeeds.

If the first indication information indicates the long listening type, the listening method 2 further includes a listening method 2-1 or a listening method 2-2. The terminal device may perform channel listening for the first sub-band set by using the listening method 2-1 or the listening method 2-2. The following describes the listening method 2-1 and the listening method 2-2 in detail.

Listening method 2-1: The terminal device may perform channel listening of a long listening type on each sub-band in the first sub-band set. In this case, the channel listening type is specific to each sub-band in the first sub-band set.

For example, the terminal device performs channel listening of a long listening type on each sub-band in the first sub-band set or each of the at least one sub-band in the first sub-band set. In this case, the channel listening type is a corresponding channel listening type for performing listening by the terminal device on each sub-band in the first sub-band set, or the channel listening type is a channel listening type used by the terminal device to perform channel listening on any sub-band in the first sub-band set.

Listening method 2-2: The terminal device performs multi-sub-band listening for the first sub-band set. In this case, the channel listening type is specific to the first sub-band set.

In some embodiments, the terminal device performs multi-sub-band listening on one sub-band in the first sub-band set, and independently performs channel listening of a long listening type on the other sub-bands.

In some embodiments, the terminal device performs multi-sub-band listening on at least one sub-band in the first sub-band set, and independently performs channel listening of a long listening type on the other sub-bands.

During multi-sub-band listening, the terminal device performs channel listening of a long listening type on one sub-band in one sub-band set, and performs channel listening of a short listening type on the other sub-bands in the sub-band set. For a sub-band on which channel listening of a long listening type is performed, if the channel listening performed on the sub-band succeeds, the sub-band may be occupied;

otherwise, the sub-band may not be occupied. For a sub-band on which channel listening of a short listening type is performed, if both the channel listening of a short listening type performed on the sub-band and the channel listening of a long listening type performed on the sub-band succeed, the sub-band on which the channel listening of a short listening type is performed may be occupied; otherwise, the sub-band may not be occupied.

For example, the terminal device may perform multi-sub-band channel listening for a subset of the first sub-band set (which may be a proper subset of the first sub-band set, or may be the first sub-band set). More For example, the terminal device may perform random backoff CCA on one sub-band (which is referred to as a level-1 sub-band) in the subset, and perform single-slot CCA on the other sub-bands (which are referred to as level-2 sub-bands) in the subset. For the level-1 sub-band, after the random backoff CCA succeeds, a channel may be accessed to send information. For any level-2 sub-band, only when single-slot CCA listening performed on the sub-band succeeds and the random backoff CCA listening performed on the level-1 sub-band succeeds, the terminal device can access a channel on the level-2 sub-band to send information. In other words, when the terminal device uses the listening method 2-2 and the channel listening type is the random backoff CCA, random backoff CCA is performed on at least one sub-band in the first sub-band set instead of all the sub-bands in the first sub-band set. This is also referred to as that the random backoff CCA is performed for the first sub-band set.

Figure 3A:
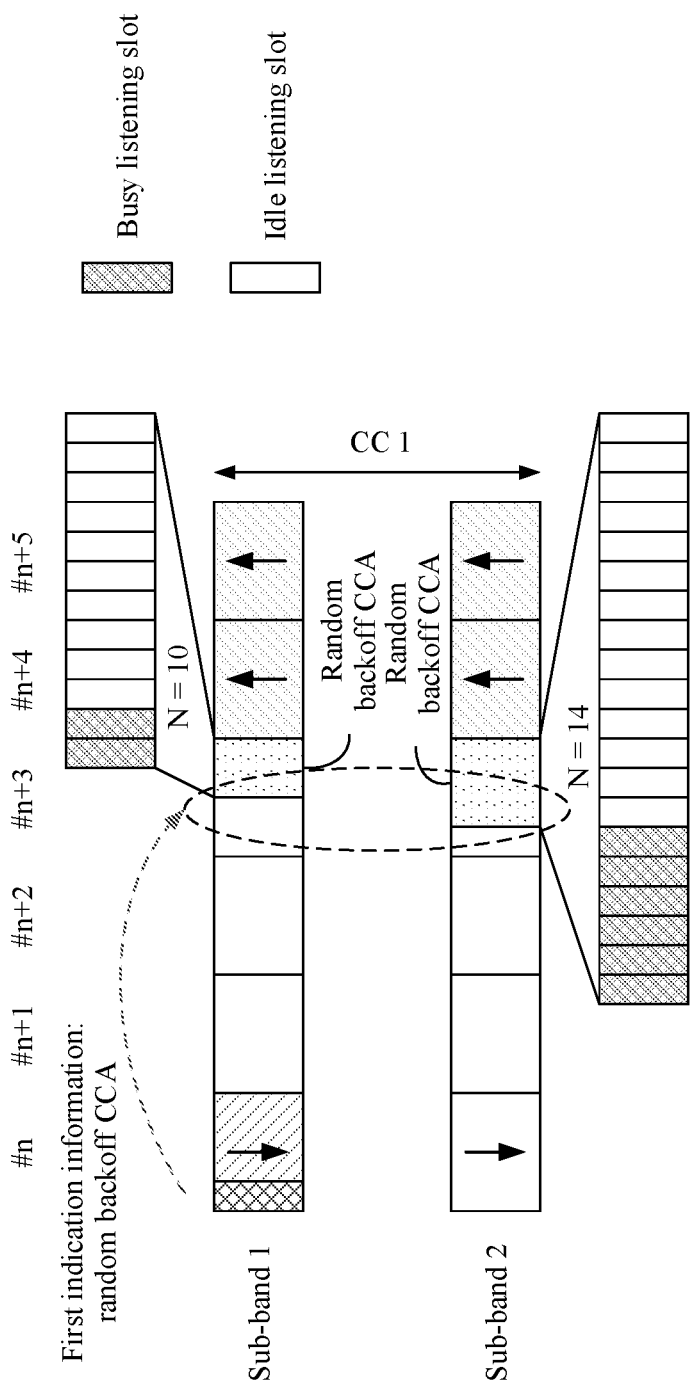
FIG. 3a and FIG. 3b are schematic diagrams of a channel listening type according to an embodiment of this application.
Figure 3B:
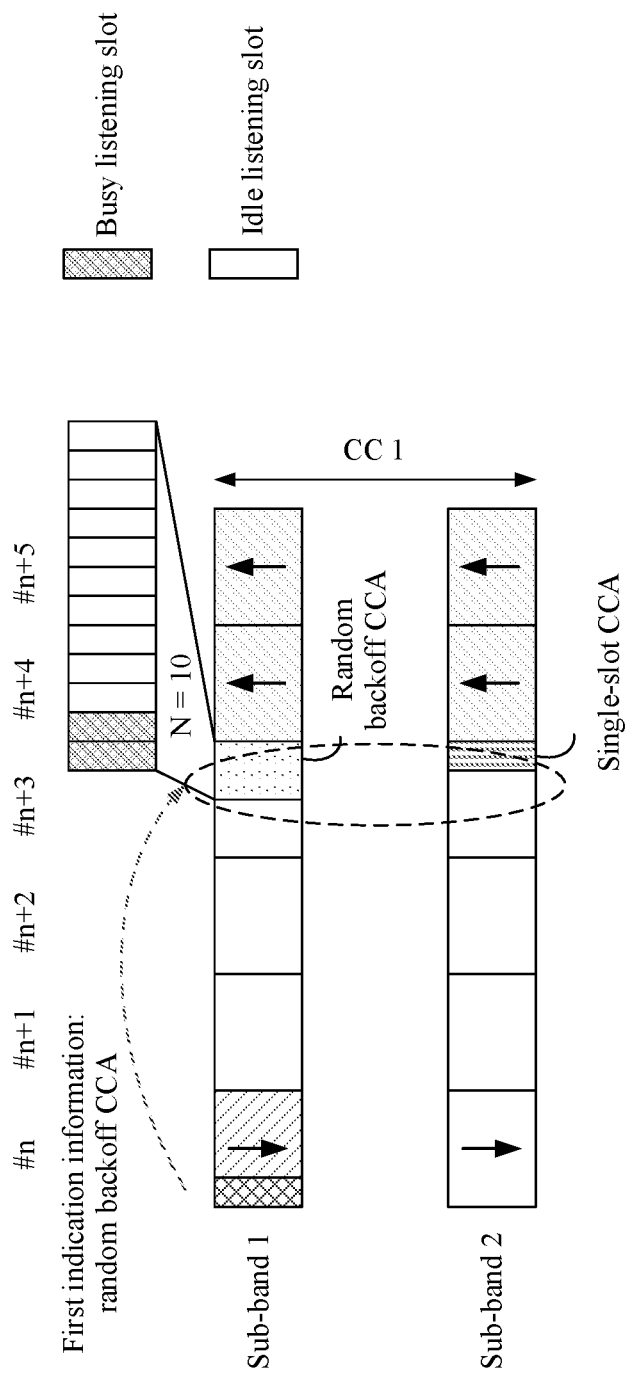

As shown in FIG. 3a and FIG. 3b, the first sub-band set includes a sub-band 1 and a sub-band 2, and the channel listening type indicated by the first indication information is the random backoff CCA. In FIG. 3a, the terminal device independently performs the random backoff CCA on the sub-band 1 and the sub-band 2. In FIG. 3b, the terminal device performs multi-sub-band channel listening for the first sub-band set. The terminal device performs the random backoff CCA on the sub-band 1, and performs the single-slot CCA on the sub-band 2. In FIG. 3b, an LBT type corresponding to each sub-band in the first sub-band set may be alternatively referred to as the random backoff CCA, or an LBT type corresponding to the sub-band 2 is alternatively referred to as the random backoff CCA.

It should be understood that the relationship between the first sub-band set and the second sub-band set is, for example, an inclusion relationship between the first sub-band set and the second sub-band set, in other words, a relationship indicating whether the second sub-band set includes the first sub-band set. In other words, the network device determines, based on an inclusion relationship between a frequency domain range occupied by the first sub-band set and a frequency domain range occupied by the second sub-band set, the corresponding channel listening type for performing channel listening by the terminal device for the first sub-band set. The relationship between the first sub-band set and the second sub-band set may For example include the following four cases.

Figure 4A:
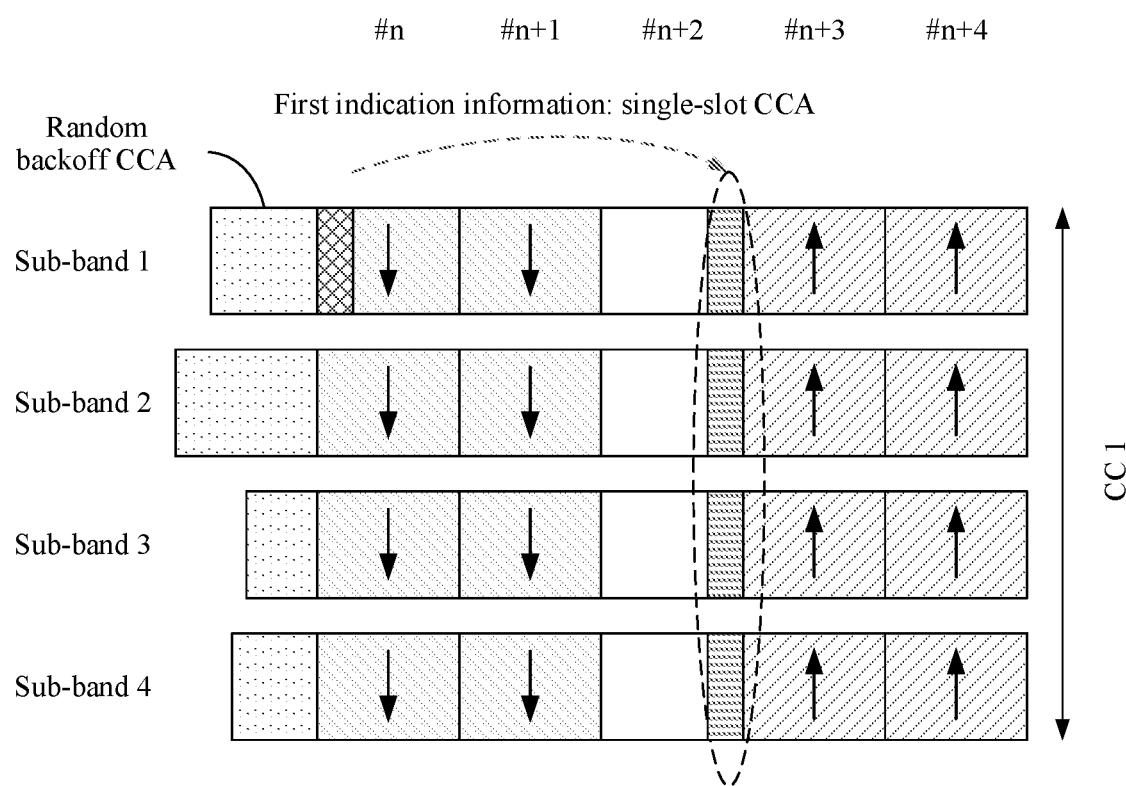
FIG. 4a and FIG. 4b are schematic diagrams of a channel listening type according to an embodiment of this application.
Figure 4B:
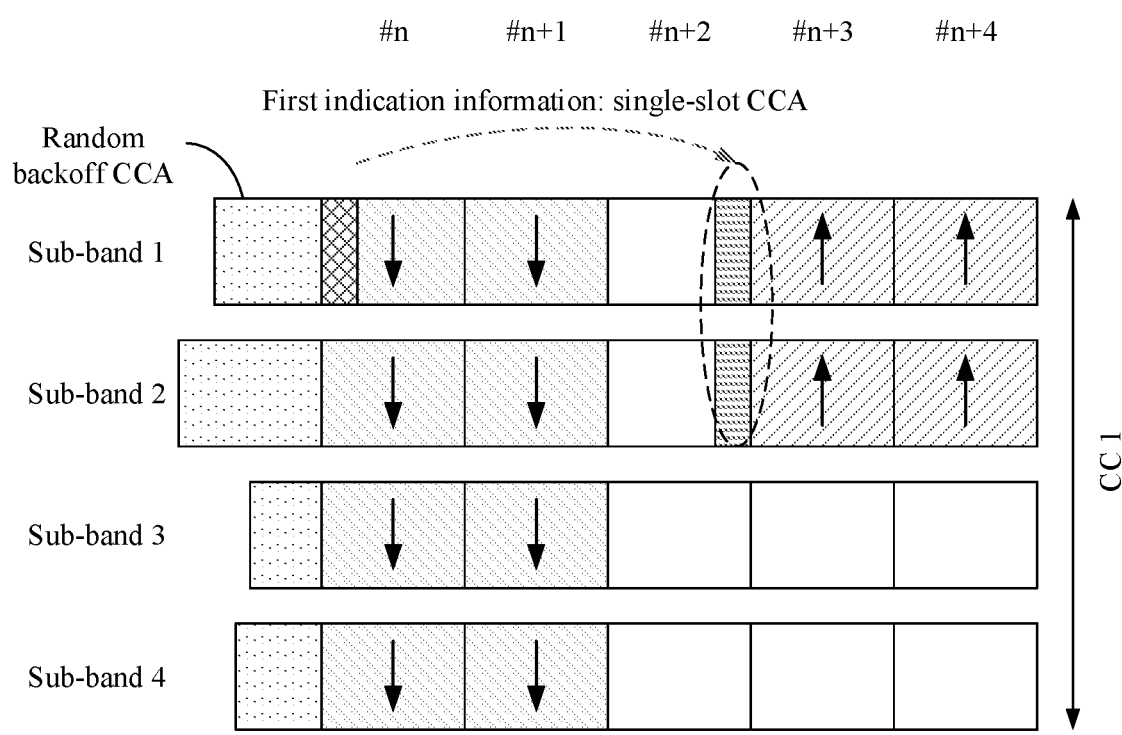

Case 1 (completely included): The first sub-band set is a subset of the second sub-band set, or all the sub-bands in the first sub-band set are included in the second sub-band set. The second sub-band set may be equal to the first sub-band set. In other words, the frequency domain range occupied by the second sub-band set is the same as the frequency domain range occupied by the first sub-band set. The first sub-band set is a proper subset of the second sub-band set, and the frequency domain range occupied by the second sub-band set includes and is greater than the frequency domain range occupied by the first sub-band set. For example, as shown in FIG. 4a, the second sub-band set is {sub-band 1, sub-band 2, sub-band 3, sub-band 4}, the first sub-band set is {sub-band 1, sub-band 2, sub-band 3, sub-band 4}, and the first sub-band set is equal to the second sub-band set. For another example, as shown in FIG. 4b, the second sub-band set is {sub-band 1, sub-band 2, sub-band 3, sub-band 4}, the first sub-band set is {sub-band 1, sub-band 2}, and the first sub-band set is a proper subset of the second sub-band set.

Case 2 (partially included): The second sub-band set is a proper subset of the first sub-band set, or all the sub-bands in the second sub-band set are included in the first sub-band set. In addition, the first sub-band set includes at least one sub-band that is not included in the second sub-band set. In other words, the frequency domain range occupied by the first sub-band set includes and is greater than the frequency domain range occupied by the second sub-band set. For example, in FIG. 5a, the second sub-band set is {sub-band 1, sub-band 2}, and the first sub-band set is {sub-band 1, sub-band 2, sub-band 3, sub-band 4}.

Case 3 (partially included): The first sub-band set includes at least one sub-band that is also included in the second sub-band set, the first sub-band set further includes at least one sub-band that is not included in the second sub-band set, and the second sub-band set also includes at least one sub-band that is not included in the first sub-band set. Alternatively, the first sub-band set and the second sub-band set partially overlap in frequency domain. For example, in FIG. 5b, the second sub-band set is {sub-band 1, sub-band 2}, and the first sub-band set is {sub-band 2, sub-band 3, sub-band 4}.

Case 4 (completely excluded): Any sub-band included in the second sub-band set does not belong to the first sub-band set, and any sub-band included in the first sub-band set does not belong to the second sub-band set. In other words, the frequency domain range occupied by the second sub-band set and the frequency domain range occupied by the first sub-band set do not overlap. For example, in FIG. 5c, the second sub-band set is {sub-band 1, sub-band 2}, and the first sub-band set is {sub-band 3, sub-band 4}.

Further, in this embodiment of this application, in the case 1, the case 2, the case 3, and the case 4, all the sub-bands included in the second sub-band set and all the sub-bands included in the first sub-band set belong to a same carrier or a same BWP. In other words, when the second sub-band set occupied by the network device to send the downlink information and the first sub-band set occupied when the network device schedules the terminal device to send the uplink information belong to a same carrier, the terminal device cannot be directly instructed to perform channel listening of a short listening type in the prior art, but a type of channel listening performed by the terminal device needs to be determined based on the inclusion relationship between the first sub-band set and the second sub-band set.

It should be understood that there may be the following manners (a manner 1, a manner 2, and a manner 3) in which the network device determines, based on the relationship between the first sub-band set and the second sub-band set, the corresponding channel listening type for performing channel listening by the terminal device for the first sub-band set.

Manner 1: Determine the listening type based on the inclusion relationship between the first sub-band set and the second sub-band set.

In an example of this application, when each sub-band in the first sub-band set is included in the second sub-band set, the network device may determine that the type for performing channel listening for the first sub-band set is the short listening type.

It should be understood that, for the case 1, when each sub-band in the first sub-band set is included in the second sub-band set, the type that is determined by the network device and that is of performing channel listening by the terminal device for the first sub-band set is the short listening type. In other words, when the frequency domain range of the second sub-band set covers the frequency domain range of the first sub-band set, or when the first sub-band set belongs to the second sub-band set, or when the first sub-band set is a subset of the second sub-band set, the channel listening type is the short listening type.

A sub-band (or a sub-band set) occupied by the network device may be used to share an MCOT corresponding to the downlink information on the sub-band (or the sub-band set) with the terminal device for sending the uplink information. Therefore, when sub-bands occupied by the network device can include all sub-bands that the network device schedules the terminal device to occupy, the terminal device may be allowed to perform listening of a short listening type for the first sub-band set. For example, in FIG. 4a and FIG. 4b, it may be indicated that the type for performing channel listening by the terminal device is the single-slot CCA.

In an example, when at least one sub-band in the first sub-band set is not included in the second sub-band set, the network device determines that the channel listening type is the long listening type. For example, in FIG. 5a, FIG. 5b, and FIG. 5c, it is indicated that the type for performing channel listening by the terminal device is the random backoff CCA.

It should be understood that, for the case 2, the case 3, and the case 4, when the first sub-band set includes at least one sub-band that is not included in the second sub-band set, the type that is determined by the network device and that is of performing channel listening by the terminal device for the first sub-band set is the long listening type. In other words, when the frequency domain range of the first sub-band set does not cover the frequency domain range of the second sub-band set, or when at least one sub-band in the first sub-band set does not belong to the second sub-band set, or when the first sub-band set is not a subset of the second sub-band set, the channel listening type is the long listening type.

Figure 5A:
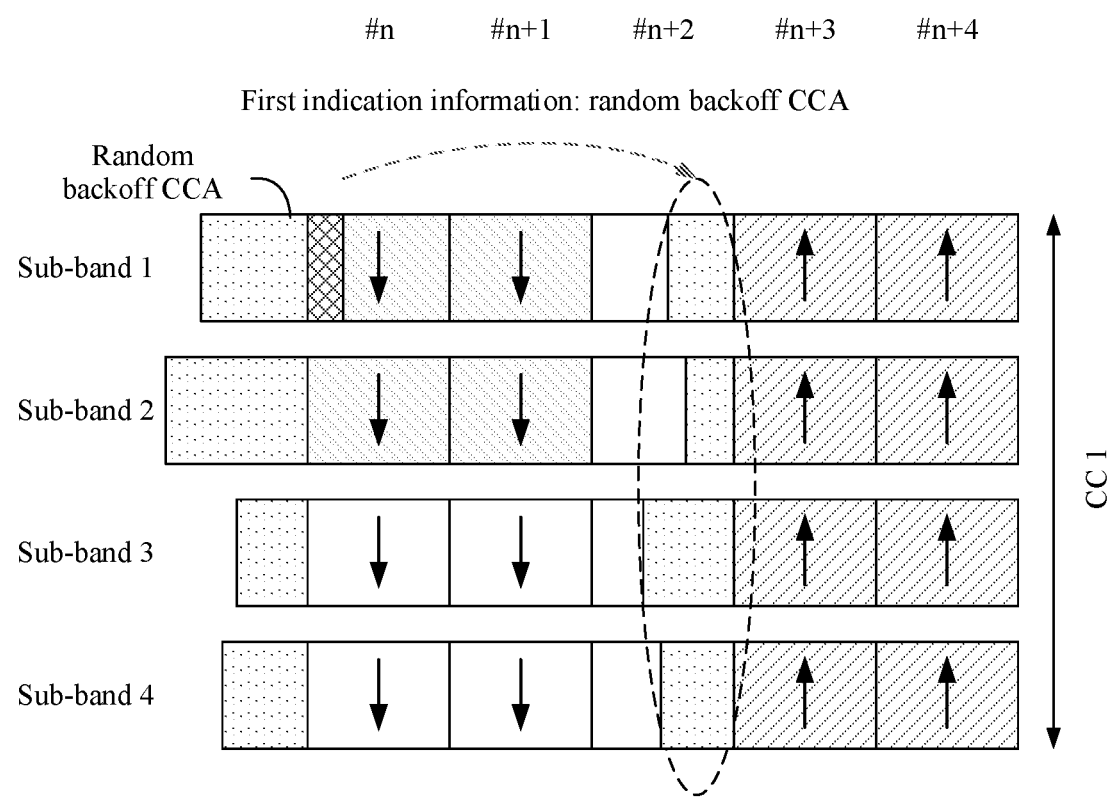
FIG. 5a, FIG. 5b, and FIG. 5c are schematic diagrams of a channel listening type according to an embodiment of this application.
Figure 5B:
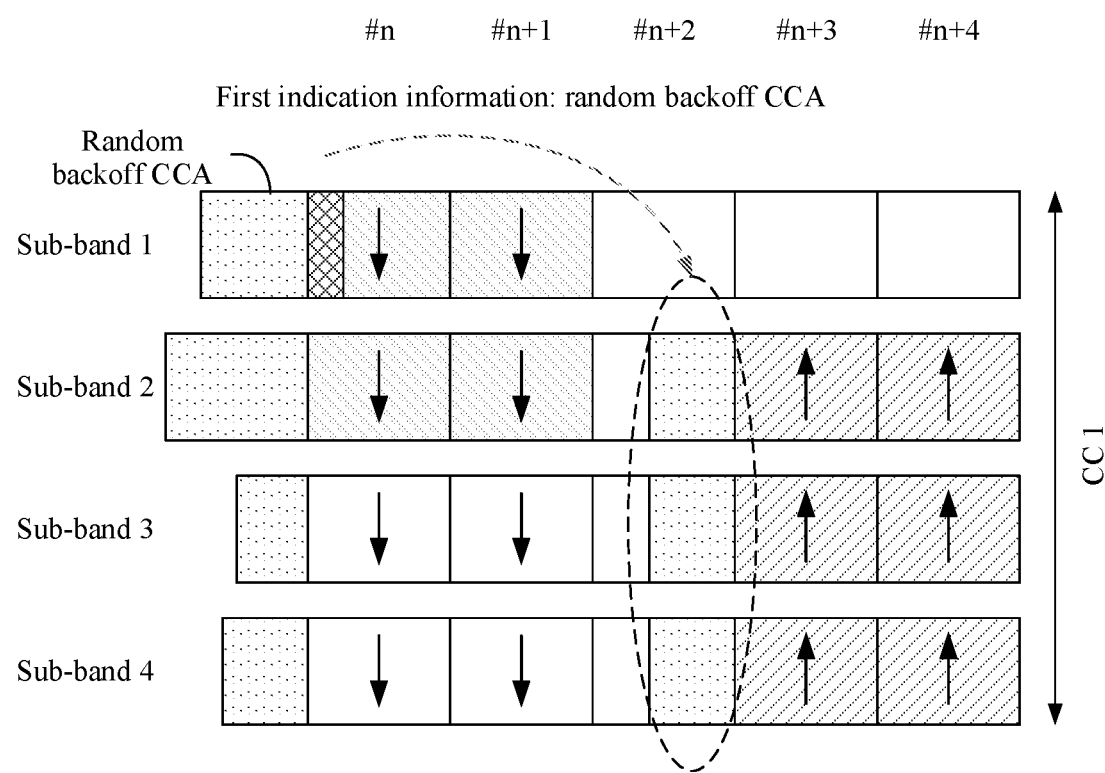
Figure 5C:
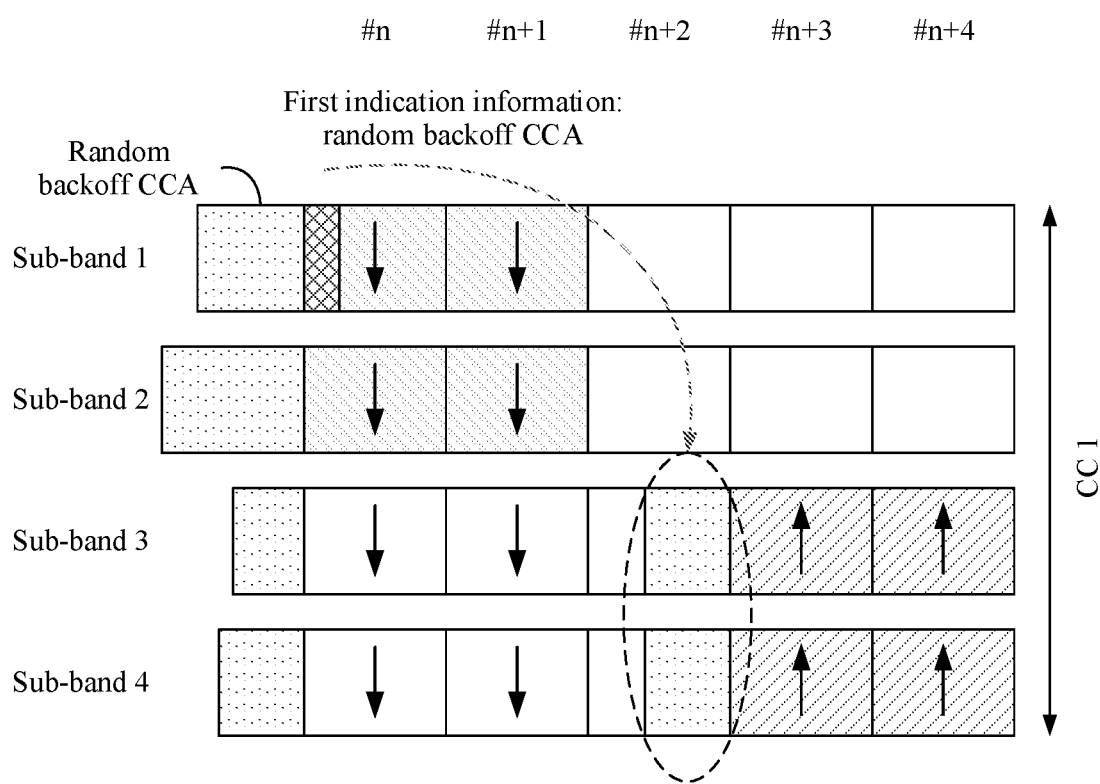

The network device sends only one piece of first indication information to the first sub-band set to indicate a specific channel listening type. Therefore, when any sub-band in the first sub-band set is not included in the second sub-band set, because the terminal device cannot perform channel listening of a short listening type on the sub-band, the channel listening type indicated for the first sub-band set is the long listening type due to a limitation of a channel listening type corresponding to the sub-band. For example, as shown in FIG. 5a, FIG. 5b, or FIG. 5c, because the first sub-band set is not included in the second sub-band set, it indicates that the channel listening type is the random backoff CCA.

Further, that at least one sub-band in the first sub-band set is not included in the second sub-band set, for example, means that at least one sub-band in the first sub-band set is included in the second sub-band set and at least one another sub-band in the first sub-band set is not included in the second sub-band set. For example, in the case 2 and the case 3, the first sub-band set includes at least one sub-band that is not included in the second sub-band set, and the first sub-band set further includes at least one sub-band that is included in the second sub-band set. In this case, the channel listening type determined by the network device is the long listening type.

It should be noted that, for the case 1, if the terminal device is expected to perform channel listening of a short listening type, in addition to that a frequency domain of the second sub-band set needs to include a frequency domain of the first sub-band set, for the first sub-band set or each sub-band in the first sub-band set, a corresponding MCOT in which the network device sends the downlink information needs to include a corresponding MCOT in which the network device schedules the terminal device to send the uplink information. It is considered that, after the network device performs channel listening of a long listening type on one sub-band to access a channel, a maximum length of the channel that may be occupied is an MCOT. For example, the MCOT is 2 ms, 3 ms, 4 ms, 6 ms, 8 ms, or 10 ms. If a time length of sending information by the network device does not exceed the MCOT, after the network device stops occupying the sub-band, the terminal device may perform channel listening of a short listening type to access the channel, and occupy the channel on the sub-band to send information. A length of the information does not exceed a remaining time length of the MCOT. This manner is referred to as that the network device shares the MCOT with the terminal device. If the time length of sending the information by the terminal device exceeds the remaining time length of the MCOT, the terminal device needs to perform channel listening of a long listening type to access the channel. Similarly, after performing channel listening of a long listening type on one sub-band set to access a channel, the network device may share an MCOT corresponding to the sub-band set with the terminal device, so that the terminal device performs channel listening of a short listening type on the sub-band set to access the channel.

It should be understood that channel listening of a long listening type performed by the network device or the terminal device on a specific sub-band or a specific sub-band set may correspond to one MCOT. For example, an MCOT corresponding to random backoff CCA may be determined based on an access priority (priority class) of downlink information or uplink information that needs to be sent. There may be four access priorities. Each access priority corresponds to one set of channel listening parameters, and the access priority is related to a service type carried in the downlink information or the uplink information. The channel listening parameter includes a contention window set, a maximum channel occupancy time, and the like. For example, a maximum channel occupancy time of an access priority 1 is 2 ms, a maximum channel occupancy time of an access priority 2 is 4 ms, and a maximum channel occupancy time of either of an access priority 3 and an access priority 4 is 6 ms or 10 ms. Channel listening of a short listening type performed by the terminal device corresponds to no MCOT.

It should be understood that, similar to the uplink listening method 2-1 and the listening method 2-2 described above, before sending the downlink information by occupying the second sub-band set, the network device may also perform channel listening by using one of the following three listening methods.

Listening method 3-1: Before sending the downlink information, the network device independently performs channel listening of a long listening type on each sub-band in the second downlink sub-band. This is similar to the listening method 2-1 of the terminal device.

For the listening method 3-1, for any sub-band in the first sub-band set, if the sub-band also belongs to the second sub-band set, an MCOT corresponding to the sub-band may be shared with the terminal device for sending the uplink information on the sub-band.

Listening method 3-2: The network device performs multi-sub-band listening for the second sub-band set. In other words, the network device performs channel listening of a long listening type only on at least one sub-band (the at least one sub-band is a proper subset of the second sub-band set) in the second sub-band, and performs channel listening of a short listening type on another sub-band in the second sub-band set. For example, the network device may perform multi-sub-band channel listening on a subset (which may be a proper subset or a universal set of the second sub-band set) of the second sub-band set, and independently perform channel listening of a long listening type on the other sub-bands.

During multi-sub-band channel listening, the network device may perform channel listening of a long listening type on one sub-band (level-1 sub-band) in the subset, and perform channel listening of a short listening type on the other sub-bands (level-2 sub-bands) in the subset. For the level-1 sub-band, after the channel listening of a long listening type succeeds, a channel may be accessed to send information. For any level-2 sub-band, only when the channel listening of a short listening type performed on the sub-band succeeds and the channel listening of a long listening type performed on the level-1 sub-band succeeds, the network device can access a channel to send information on the level-2 sub-band.

For the listening method 3-1 and the listening method 3-2, for any sub-band (for example, the sub-band #x) in the second sub-band set, when the network device determines a channel status (whether a channel is idle or busy), the network device compares power or energy received on the sub-band #x in a listening slot with a CCA-ED corresponding to the sub-band #x, so as to determine whether the sub-band #x is idle or busy.

It should be understood that, for sub-band (which is referred to as an $i^{th}$ sub-band or a sub-band #i) in the first sub-band set, the sub-band #i corresponds to the MCOT #i (an $i^{th}$ MCOT). For the listening method 3-1, because the network device independently performs channel listening of a long listening type on each sub-band in the second sub-band set or in the first sub-band set, the MCOT #i corresponding to the sub-band #i is a corresponding MCOT in which the network device performs channel listening of a long listening type on the sub-band #i before the network device sends the downlink information. For the listening method 3-2, if the sub-band #i is a level-1 sub-band, the MCOT #i is a corresponding MCOT in which the network device performs channel listening on the level-1 sub-band before the network device sends the downlink information. If the sub-band #i is a level-2 sub-band, although channel listening of a long listening type is not performed on the level-2 sub-band, a sub-band set that includes the sub-band #i and that is used to perform multi-sub-band channel listening includes a level-1 sub-band (which is referred to as a $j^{th}$ sub-band or a sub-band #j) on which channel listening of a long listening type is performed. Therefore, the MCOT corresponding to the sub-band #i may also be an MCOT #j corresponding to the sub-band #j, or the MCOT #i is the MCOT #j, or the MCOT corresponding to the sub-band #i is the MCOT #j. The MCOT #j is a corresponding MCOT in which the network device performs channel listening on the level-1 sub-band #j before the network device sends the downlink information. Herein, i is not equal to j. For example, the MCOT #i is an MCOT corresponding to another level-1 sub-band #j that is in the second sub-band set and on which random backoff CCA is performed. Another level-2 sub-band that is in the second sub-band set and that is used to perform multi-sub-band channel listening together with the level-1 sub-band may correspond to the MCOT #j.

In other words, the MCOT corresponding to the sub-band #i in the first sub-band set is a corresponding MCOT in which the network device performs channel listening of a long listening type or channel listening of a short listening type on the sub-band #i before the network device sends the downlink information, for example, may be a corresponding MCOT in which the network device performs channel listening of a long listening type on the sub-band #i, or may be a corresponding MCOT in which the network device performs channel listening of a long listening type on another sub-band #j that is in the first sub-band set and that is different from the sub-band #i (for example, an MCOT in which the network device performs channel listening of a short listening type on the sub-band #i).

It should be understood that an MCOT corresponding to a specific sub-band set (for example, the first sub-band set or the second sub-band set) is a corresponding MCOT in which the network device performs channel listening on the sub-band set before the network device sends the downlink information, or a corresponding MCOT of performing channel listening on one sub-band in the sub-band set. Further, channel listening performed by the network device on the sub-band is channel listening of a long listening type.

Listening method 4: The network device performs listening for the second sub-band set, or the network device performs joint listening (that is, wideband channel listening) on all sub-bands in the second sub-band set. The listening manner is similar to the listening method 1 used by the terminal device. When the network device determines a channel status (whether a channel is idle or busy), the network device compares power or energy detected on all sub-bands in the second sub-band set in a listening slot with a CCA-ED corresponding to the second sub-band set, and the determined channel idle state or the determined channel busy state is specific to all the sub-bands in the second sub-band set.

For the listening method 3-2 and the listening method 4, the downlink information (which is the downlink information or a part of the downlink information) carried in the first sub-band set corresponds to a common MCOT. The MCOT may be an MCOT corresponding to the downlink information, or may be an MCOT corresponding to the first sub-band set, or may be a corresponding MCOT in which the network device performs channel listening before the network device sends the downlink information. Further, when the second sub-band set includes all the sub-bands in the first sub-band set (case 1), the common MCOT may also be an MCOT corresponding to the second sub-band set.

Manner 2: Determine the listening type based on the inclusion relationship between the first sub-band set and the second sub-band set and an MCOT corresponding to the first sub-band set.

In accordance with the present disclosure, when each sub-band in the first sub-band set is included in the second sub-band set, and an uplink burst of the first sub-band set is within the MCOT corresponding to the first sub-band set, the network device may determine that the type of channel listening performed for the first sub-band set is the short listening type.

The uplink burst of the first sub-band set is at least one consecutive time unit that the network device schedules the terminal device to occupy in the first sub-band set. In some embodiments, the uplink burst of the first sub-band set includes a time unit occupied when the network device schedules the terminal device to send the uplink information. Further, the uplink burst of the first sub-band set is the time unit occupied when the network device schedules the terminal device to send the uplink information.

In one example, the network device first determines the maximum channel occupancy time (maximum channel occupancy time, MCOT) of the first sub-band set. It should be understood that the MCOT corresponding to the first sub-band set may also be a corresponding MCOT in which the network device sends the downlink information (that is, a part that is of the downlink information and that is carried in the first sub-band set) for the first sub-band set, or may be a corresponding MCOT in which the network device performs downlink channel listening for the first sub-band set before the network device sends the downlink information. Further, the downlink channel listening is channel listening of a long listening type. For example, when the network device performs channel listening by using the listening method 3-2 or the listening method 4, the first sub-band set corresponds to a common MCOT. The MCOT corresponding to the first sub-band set is the common MCOT, or the MCOT corresponding to the first sub-band set is an MCOT corresponding to a sub-band (sub-band #j) included in the second sub-band set or in the first sub-band set, or a corresponding MCOT in which the network device performs channel listening on the sub-band #j before the network device sends the downlink information. The sub-band #j is a sub-band on which the network device performs channel listening of a long listening type before sending the downlink information. For example, when the network device uses the listening method 3-2, the network device performs channel listening of a long listening type on the sub-band #j in the second sub-band set, and performs channel listening of a short listening type on the other sub-bands. In this case, the MCOT corresponding to the first sub-band set is a corresponding MCOT of performing channel listening of a long listening type on the sub-band #j, and #j may be included in the first sub-band set and not included in the second sub-band set.

In some embodiments, the maximum channel occupancy time corresponding to the first sub-band set is determined based on a maximum channel occupancy time corresponding to each sub-band in the first sub-band set, and a maximum channel occupancy time corresponding to any sub-band in the first sub-band set is a corresponding maximum channel occupancy time in which the network device performs channel listening on the any sub-band before the network device sends the downlink information. In some embodiments, the MCOT corresponding to the first sub-band set is an MCOT with the earliest end moment or an MCOT with a shortest time length in MCOTs corresponding to all the sub-bands in the first sub-band set. In some embodiments, the MCOT corresponding to the first sub-band set is an MCOT corresponding to a specific sub-band or any sub-band in the first sub-band set. Further, the specific sub-band or the any sub-band is a sub-band occupied for performing channel listening of a long listening type before the network device sends the downlink information.

It should be understood that, when the downlink information in the first sub-band set corresponds to a common MCOT, according to an MCOT sharing principle, only when the uplink burst of the first sub-band set is within the MCOT, the terminal device can be instructed to perform channel listening of a short listening type, to access a channel to send the uplink information. Otherwise, it needs to be indicated that the channel listening type is the long listening type. For example, the MCOT corresponding to the first sub-band set is a corresponding MCOT in which the network device occupies a specific sub-band in the first sub-band set to send the downlink information. For example, in the listening manner 3-2, if the network device occupies the sub-band to perform random backoff CCA, the MCOT is a corresponding MCOT in which the network device performs random backoff CCA on the sub-band. If the network device occupies the sub-band to perform single-slot CCA, the MCOT is a corresponding MCOT in which the network device performs random backoff CCA on another sub-band in the second sub-band set.

It should be understood that the MCOT corresponding to the first sub-band set may also be the MCOT corresponding to the second sub-band set. It is considered that, when each sub-band in the first sub-band set is included in the second sub-band set, the MCOT corresponding to the first sub-band set is also the MCOT corresponding to the second sub-band set. For example, when the network device performs channel listening by using the listening method 3-2 or the listening method 4, the second sub-band set corresponds to a common MCOT. If each sub-band in the first sub-band set is included in the second sub-band set, the MCOT corresponding to the first sub-band set is also the MCOT corresponding to the second sub-band set, in other words, the common MCOT. The MCOT corresponding to the second sub-band set may also be a corresponding MCOT in which the network device sends the downlink information by occupying the second sub-band set, or a corresponding MCOT in which the network device performs downlink channel listening before the network device sends the downlink information by occupying the second sub-band set. Further, the downlink channel listening is channel listening of a long listening type.

In one example, when each sub-band in the first sub-band set is included in the second sub-band set, and the uplink burst of the first sub-band set is not within the MCOT corresponding to the first sub-band set, the network device determines that the channel listening type is the long listening type. In addition, as described above, when at least one sub-band in the first sub-band set is not included in the second sub-band set, the network device determines that the channel listening type is the long listening type.

It is considered that, when the uplink burst of the first sub-band set is not within the MCOT corresponding to the first sub-band set, a sum of the uplink burst and a time domain length of the downlink information in the first sub-band set exceeds the MCOT. Therefore, the uplink burst cannot be shared with the MCOT corresponding to the first sub-band set, and instead, channel listening of a short listening type is performed to access a channel. In addition, as described above, for the case 2, the case 3, and the case 4, when at least one sub-band in the first sub-band set is not included in the second sub-band set, the network device also determines that the channel listening type is the long listening type.

Figure 6A:
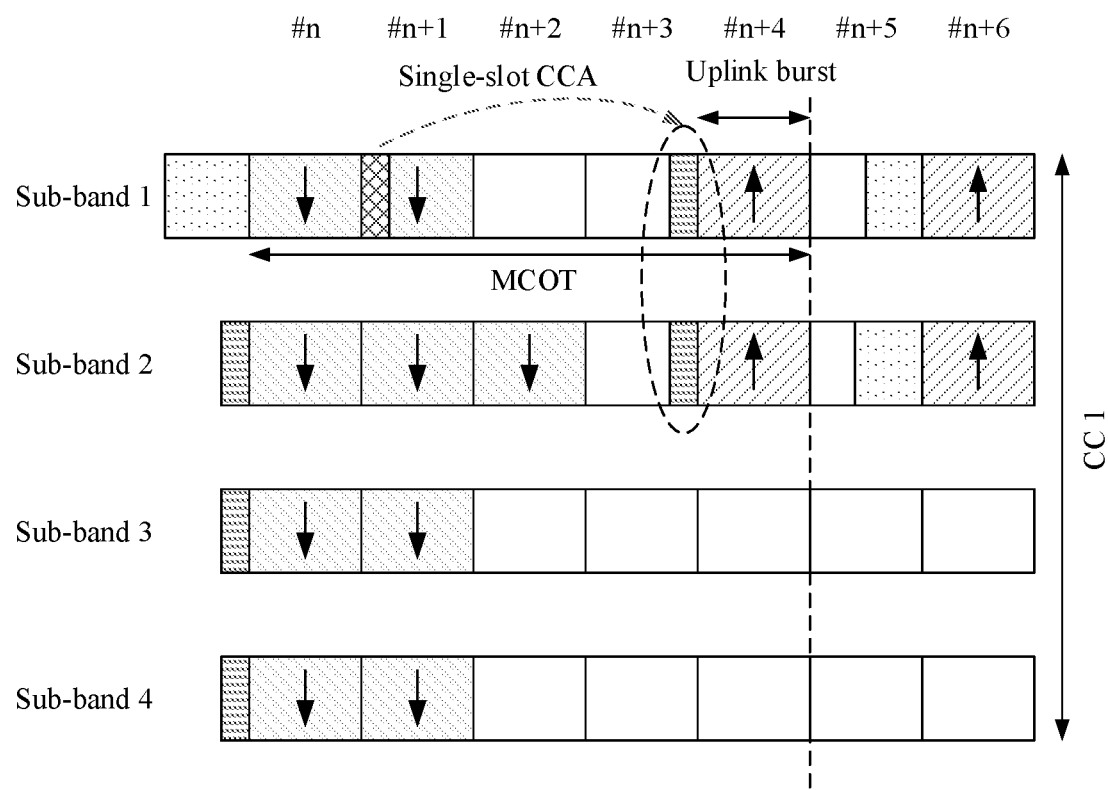
FIG. 6a, FIG. 6b, FIG. 6c, and FIG. 6d are schematic diagrams of a channel listening type according to an embodiment of this application.
Figure 6B:
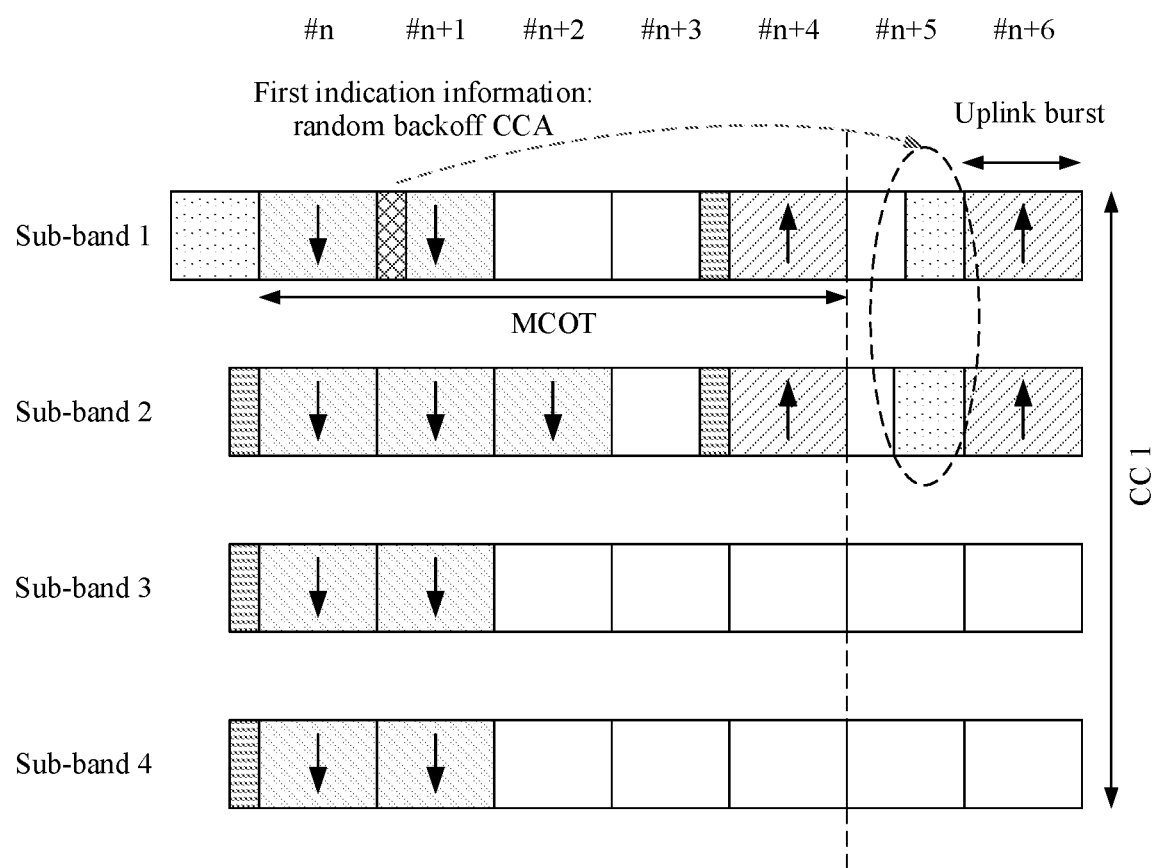
Figure 6C:
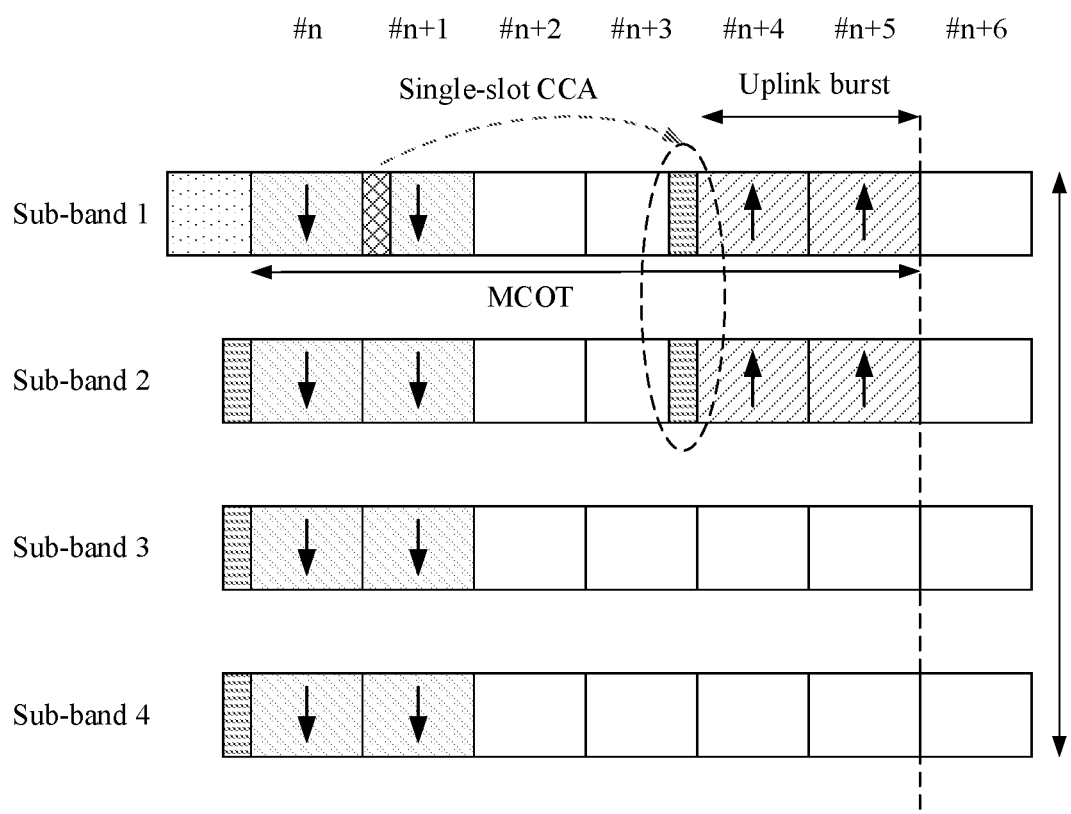
Figure 6D:
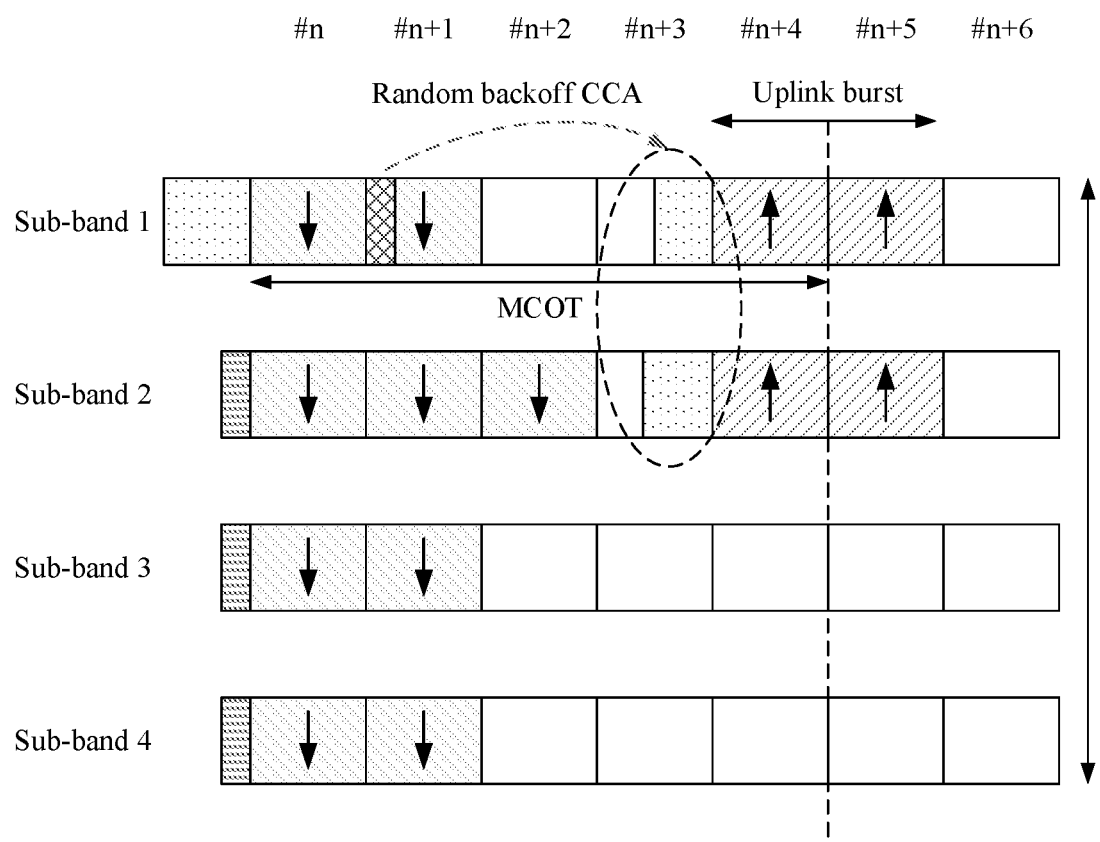

For example, as shown in FIG. 6a, FIG. 6b, FIG. 6c, or FIG. 6d, the second sub-band set is {sub-band 1, sub-band 2, sub-band 3, sub-band 4}, and the first sub-band set is {sub-band 1, sub-band 2}. When the network device accesses the second sub-band set, the network device performs random backoff CCA on the sub-band 1, and performs single-slot CCA on the other sub-bands. Therefore, the MCOT corresponding to the first sub-band set is a corresponding MCOT in which the network device performs random backoff CCA on the sub-band 1, and the MCOT is 4 ms. In FIG. 6a and FIG. 6b, an end moment of the MCOT is a subframe #n+4 (an $(n+4)^{th}$ subframe), an uplink burst #1 (a first uplink burst) in which uplink information #1 (first uplink information) is located is a subframe #n+4, and the subframe #n+4 is within the MCOT. Therefore, as shown in FIG. 6a, an LBT type of the uplink information #1 of the subframe #n+4 is single-slot CCA. An uplink burst #2 (a second uplink burst) in which uplink information #2 (second uplink information) is located is a subframe #n+6 (an $(n+6)^{th}$ subframe), and the subframe #n+6 is not within the MCOT. Therefore, as shown in FIG. 6b, an LBT type of the uplink information #2 of the subframe #n+6 is random backoff CCA. In FIG. 6c, an end moment of the MCOT is a subframe #n+5 (an $(n+5)^{th}$ subframe), and an uplink burst #3 (a third uplink information) in which uplink information #3 (third uplink information) is located includes subframes {#n+4, #n+5} (#n+5 represents the $(n+5)^{th}$ subframe), and the uplink burst #3 is within the MCOT. Therefore, an LBT type is single-slot CCA. In FIG. 6d, an end moment of the MCOT is a subframe #n+4, and an uplink burst #4 (a fourth uplink burst) in which uplink information #4 (fourth uplink information) is located includes subframe {#n+4, #n+5}, and the uplink burst #4 is not within the MCOT. Therefore, an LBT type is random backoff CCA.

In some embodiments, that the uplink burst of the first sub-band set is within the maximum channel occupancy time corresponding to the first sub-band set means that a sum of the uplink burst of the first sub-band set and a time domain resource used by the network device to send the downlink information by occupying the first sub-band set (or the second sub-band set) does not exceed the maximum channel occupancy time corresponding to the first sub-band set. For example, in FIG. 6a, the time domain resource occupied for the downlink information includes subframes {#n+1, #n+2}, the uplink burst of the first sub-band set includes the subframe {#n+4}, and the sum of the two does not exceed the MCOT (4 ms) corresponding to the first sub-band set.

Further, that the uplink burst of the first sub-band set is within the maximum channel occupancy time corresponding to the first sub-band set further includes: A sum of the uplink burst of the first sub-band set, a time domain resource used by the network device to send the downlink information by occupying the first sub-band set (or the second sub-band set), and a gap between the two does not exceed the maximum channel occupancy time corresponding to the first sub-band set. The foregoing gap may be an idle time in which neither the network device nor the terminal device sends any information on a channel. During specific implementation, the gap may be an idle time that does not exceed a predefined time length. For example, the predefined time length is 25 us.

In some embodiments, that the uplink burst of the first sub-band set is within the maximum channel occupancy time corresponding to the first sub-band set means that a sum of the uplink burst of the first sub-band set, a time domain resource used by the network device to send the downlink information by occupying the first sub-band set (or the second sub-band set), and a time domain resource occupied by other uplink transmission and/or downlink transmission performed between the two does not exceed the maximum channel occupancy time corresponding to the first sub-band set. It is considered that the network device may schedule another uplink burst or uplink transmission between the uplink burst and the downlink information, and another uplink burst may also be performed by sharing the MCOT corresponding to the first sub-band set, to perform channel listening of a short listening type. Therefore, the other uplink transmission and/or downlink transmission performed between the two also need to be performed within the MCOT corresponding to the first sub-band set.

Further, that the uplink burst of the first sub-band set is within the maximum channel occupancy time corresponding to the first sub-band set further includes: a sum of the uplink burst of the first sub-band set, a time domain resource used by the network device to send the downlink information by occupying the first sub-band set (or the second sub-band set), a time domain resource occupied by other uplink transmission and/or downlink transmission performed between the two, and a gap between the two does not exceed the maximum channel occupancy time corresponding to the first sub-band set. The gap is described above, and details are not described again.

It should be understood that, when a same time domain resource on all the sub-bands in the second sub-band set (or the first sub-band set) is occupied for the downlink information, the time domain resource occupied for the downlink information is a time domain resource occupied for the downlink information on any sub-band in the second sub-band set (or the first sub-band set). When time domain resources occupied for the downlink information on all the sub-bands in the second sub-band set (or the first sub-band set) are not completely the same, the time domain resource occupied for the downlink information is a time domain resource between the earliest start moment and the latest end moment. A corresponding time domain resource on each sub-band in the second sub-band set (or the first sub-band set) is occupied for the downlink information. The earliest start moment is a start moment of a time domain resource with the earliest start moment in time domain resources corresponding to all the sub-bands in the second sub-band set (or the first sub-band set), and the latest end moment is an end moment of a time domain resource with the latest end moment. For example, if K time domain resources in K sub-bands included in the second sub-band set (or the first sub-band set) are correspondingly occupied for the downlink information, the earliest start moment is a start moment corresponding to a time domain resource with the earliest start moment in the K time domain resources, and the latest end moment is an end moment corresponding to a time domain resource with the latest end moment in the K time domain resources, where K is a positive integer.

Similarly, when a same time domain resource on each sub-band in the first sub-band set is occupied for the uplink burst, the time domain resource occupied for the uplink burst is a time domain resource occupied for the uplink burst on any sub-band in the first sub-band set. When time domain resources occupied for the uplink burst on all sub-bands in the first sub-band set are not completely the same, the time domain resources occupied for the uplink burst are time domain resources between the earliest start moment and the latest end moment. The earliest start moment is a start moment of a sub-band with the earliest start moment in the time domain resources occupied for the uplink burst on all the sub-bands in the first sub-band set, and the latest end moment is an end moment of a sub-band with the latest end moment in the time domain resources occupied for the uplink burst on all the sub-bands in the first sub-band set.

Manner 3: Determine the listening type based on the inclusion relationship between the first sub-band set and the second sub-band set and an MCOT corresponding to each sub-band in the first sub-band set.

In an example of this application, when each sub-band in the first sub-band set is included in the second sub-band set, and an uplink burst on each sub-band in the first sub-band set is within the MCOT corresponding to the sub-band, the network device determines that the channel listening type is the short listening type.

For an $i^{th}$ sub-band in the first sub-band set, that an uplink burst on the $i^{th}$ sub-band is within an MCOT corresponding to the sub-band includes: the $i^{th}$ uplink burst on the $i^{th}$ sub-band is within the MCOT of the $i^{th}$ sub-band.

The $i^{th}$ uplink burst is at least one consecutive time unit that the network device schedules the terminal device to occupy on the $i^{th}$ sub-band. In some embodiments, the $i^{th}$ uplink burst includes a time unit occupied when the network device schedules the terminal device to send the uplink information. Further, the $i^{th}$ uplink burst is the time unit occupied when the network device schedules the terminal device to send the uplink information, or the $i^{th}$ uplink burst is a time unit occupied on the $i^{th}$ sub-band for the uplink information that the network device schedules the terminal device to send.

The MCOT of the $i^{th}$ sub-band is a corresponding MCOT in which the network device performs channel listening on the $i^{th}$ sub-band before the network device sends the downlink information, where i is an integer greater than 0 and less than or equal to N, N is a quantity of sub-bands included in the first sub-band set, and N is a positive integer. The downlink information is information sent by the network device after the channel listening succeeds. Further, the channel listening is channel listening of a long listening type.

In other words, the MCOT of the $i^{th}$ sub-band is a corresponding maximum channel occupancy time in which the network device sends $i^{th}$ downlink information on the $i^{th}$ sub-band, and the $i^{th}$ downlink information is a part that is of the downlink information and that is carried on the $i^{th}$ sub-band.

In other words, the MCOT of the $i^{th}$ sub-band is a corresponding maximum channel occupancy time in which the network device performs channel listening on the $i^{th}$ sub-band before the network device sends the $i^{th}$ downlink information on the $i^{th}$ sub-band. The $i^{th}$ downlink information is a part that is of the downlink information and that is carried on the $i^{th}$ sub-band. The $i^{th}$ downlink information is information sent by the network device after the network device successfully performs channel listening. Further, the channel listening is channel listening of a long listening type.

In other words, if each sub-band in the first sub-band set is included in the second sub-band set, and an uplink burst #i (the $i^{th}$ uplink burst) of any sub-band (#i=1, . . . , and N) in the first sub-band set is within an MCOT corresponding to the sub-band #i (the $i^{th}$ sub-band), the network device determines that the channel listening type is the short listening type.

In one example, when each sub-band in the first sub-band set is included in the second sub-band set, and the $i^{th}$ uplink burst on the $i^{th}$ sub-band in the first sub-band set is not within the MCOT of the $i^{th}$ sub-band, the network device determines that the channel listening type is the long listening type. In addition, as described above, when at least one sub-band in the first sub-band set is not included in the second sub-band set, the network device determines that the channel listening type is the long listening type.

In other words, if each sub-band in the first sub-band set is included in the second sub-band set, and the uplink burst #i of any sub-band (#i=1, ... , and N) in the first sub-band set is not within the MCOT corresponding to the sub-band #i, the network device determines that the channel listening type is the long listening type.

It is considered that, when there is any sub-band (which is referred to as the $i^{th}$ sub-band) in the first sub-band set, and the $i^{th}$ uplink burst on the $i^{th}$ sub-band is not within the MCOT corresponding to the $i^{th}$ sub-band, a sum of the $i^{th}$ uplink burst and a time domain length of the downlink information on the $i^{th}$ sub-band exceeds the MCOT corresponding to the $i^{th}$ sub-band. Therefore, the MCOT corresponding to the $i^{th}$ sub-band cannot be shared for the $i^{th}$ uplink burst, and instead, channel listening of a short listening type is performed to access a channel. Because the first indication information is specific to the first sub-band set, when any sub-band in the first sub-band set cannot share an MCOT of the sub-band, even if another sub-band (sub-band #j) in the first sub-band set can share an MCOT corresponding to the sub-band #j, it also needs to be indicated that the channel listening type of the first sub-band set is the long listening type. In addition, as described above, for the case 2, the case 3, and the case 4, when at least one sub-band in the first sub-band set is not included in the second sub-band set, the network device also determines that the channel listening type is the long listening type.

In some embodiments, when each sub-band in the first sub-band set is included in the second sub-band set (that is, in the case 1), for each sub-band in the first sub-band set, uplink information on the sub-band is carried in a first time unit and belongs to a part of a first data packet. If the first time unit on each sub-band or an uplink burst in which the uplink information (or the first time unit) on each sub-band is located is included in a corresponding MCOT (or a corresponding MCOT in which the network device performs channel listening before the network device sends the downlink information on the sub-band) in which the network device occupies the sub-band to send the downlink information, the channel listening type of the first sub-band set is single-slot CCA. Otherwise, if the first sub-band set includes any $i^{th}$ sub-band, for uplink information (carried in an $i^{th}$ time unit) on the $i^{th}$ sub-band, if the $i^{th}$ time unit or an $i^{th}$ uplink burst in which uplink information (or the $i^{th}$ time unit) on the $i^{th}$ sub-band is located is not included in a corresponding MCOT in which the network device occupies the $i^{th}$ sub-band to send the downlink information, the channel listening type of the first sub-band set is random backoff CCA.

In some embodiments, when the first time unit or the uplink burst in which the first time unit is located is included in a corresponding MCOT in which the network device occupies the first sub-band set to send the downlink information, the channel listening type of the first sub-band set is single-slot CCA. Alternatively, when the first time unit is included in an MCOT with the earliest end moment in MCOTs corresponding to all the sub-bands in the first sub-band set, the channel listening type of the first sub-band set is single-slot CCA. It should be understood that, when each sub-band in the second sub-band set corresponds to one MCOT, because MCOTs corresponding to all the sub-bands may have different end moments, according to an MCOT sharing principle, when the first time unit is within an MCOT corresponding to downlink information carried on a specific sub-band, the terminal device may perform single-slot CCA on the sub-band. However, it is considered that the network device sends only one piece of first indication information for the first sub-band set. Therefore, only when the first time unit is within an MCOT corresponding to downlink information carried on each sub-band in the first sub-band set, or when the first time unit is included in an MCOT with the earliest end moment in MCOTs corresponding to all the sub-bands in the first sub-band set, the channel listening type of the first sub-band set is single-slot CCA. Otherwise, when the first time unit is not included in an MCOT corresponding to any sub-band in the first sub-band set, the channel listening type of the first sub-band set is random backoff CCA. This ensures that the MCOT sharing principle is met on any sub-band.

In some embodiments, that the uplink burst on the $i^{th}$ sub-band is within the maximum channel occupancy time corresponding to the $i^{th}$ sub-band means that a sum of the uplink burst on the $i^{th}$ sub-band and a time domain resource occupied by the network device to send the downlink information on the $i^{th}$ sub-band does not exceed the maximum channel occupancy time corresponding to the $i^{th}$ sub-band. For example, in FIG. 7c, on a sub-band 2, a time domain resource occupied for the downlink information includes subframes {#n+1, #n+2}, and an uplink burst on the sub-band 2 includes a subframe {#n+4}. Therefore, a sum of the two is 4 ms and does not exceed a length 4 ms of an MCOT of a sub-band 1. On the sub-band 1, a time domain resource occupied for the downlink information includes subframes #n+11, and an uplink burst on the sub-band 1 includes subframes {#n+4, #n+5, #n+6}. Therefore, a sum of the two is 5 ms and exceeds the length 4 ms of the MCOT of the sub-band 1.

Further, that the uplink burst on the $i^{th}$ sub-band is within the maximum channel occupancy time corresponding to the $i^{th}$ sub-band further includes: A sum of the uplink burst on the $i^{th}$ sub-band, a time domain resource occupied for the downlink information sent by the network device on the $i^{th}$ sub-band, and a gap between the two does not exceed the maximum channel occupancy time corresponding to the $i^{th}$ sub-band. The foregoing gap may be an idle time in which neither the network device nor the terminal device sends any information on the $i^{th}$ sub-band. During specific implementation, the gap may be an idle time that does not exceed a predefined time length. For example, the predefined time length is 25 us.

In some embodiments, that the uplink burst on the $i^{th}$ sub-band is within the maximum channel occupancy time corresponding to the $i^{th}$ sub-band means that a sum of the uplink burst on the $i^{th}$ sub-band, a time domain resource occupied for the downlink information sent by the network device on the $i^{th}$ sub-band, and a time domain resource occupied by other uplink transmission and/or downlink transmission performed between the two does not exceed the maximum channel occupancy time corresponding to the $i^{th}$ sub-band. It is considered that the network device may schedule another uplink burst or uplink transmission between the uplink burst and the downlink information, the another uplink burst may also share the MCOT of the $i^{th}$ sub-band to perform single-slot CCA. Therefore, other uplink transmission and/or downlink transmission between the two also need to be performed within the MCOT of the $i^{th}$ sub-band.

Further, that the uplink burst on the $i^{th}$ sub-band is within the maximum channel occupancy time corresponding to the $i^{th}$ sub-band further includes: A sum of the uplink burst on the $i^{th}$ sub-band, a time domain resource occupied for the downlink information sent by the network device on the $i^{th}$ sub-band, a time domain resource occupied by other uplink transmission and/or downlink transmission performed between the two, and a gap between the two does not exceed the maximum channel occupancy time corresponding to the $i^{th}$ sub-band. The gap is described above, and details are not described again.

Figure 7A:
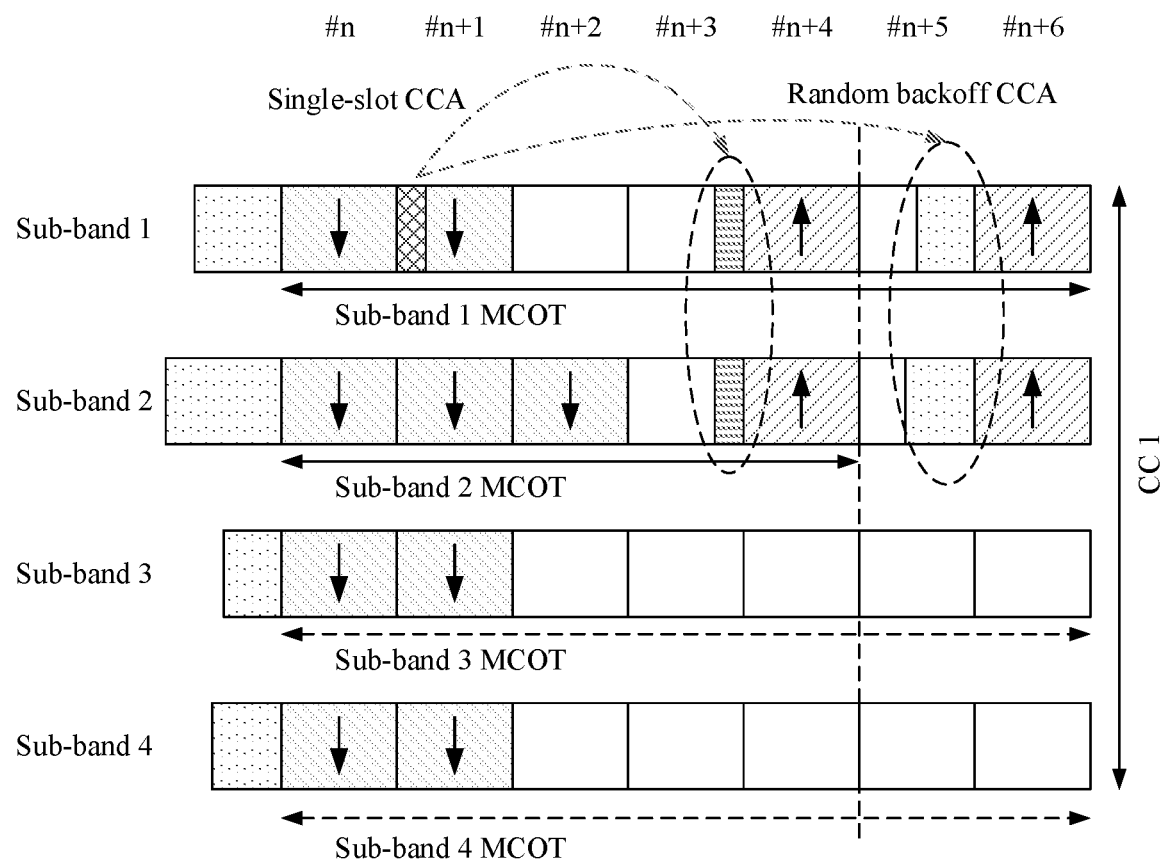
FIG. 7a, FIG. 7b, and FIG. 7c are schematic diagrams of a channel listening type according to an embodiment of this application.
Figure 7B:
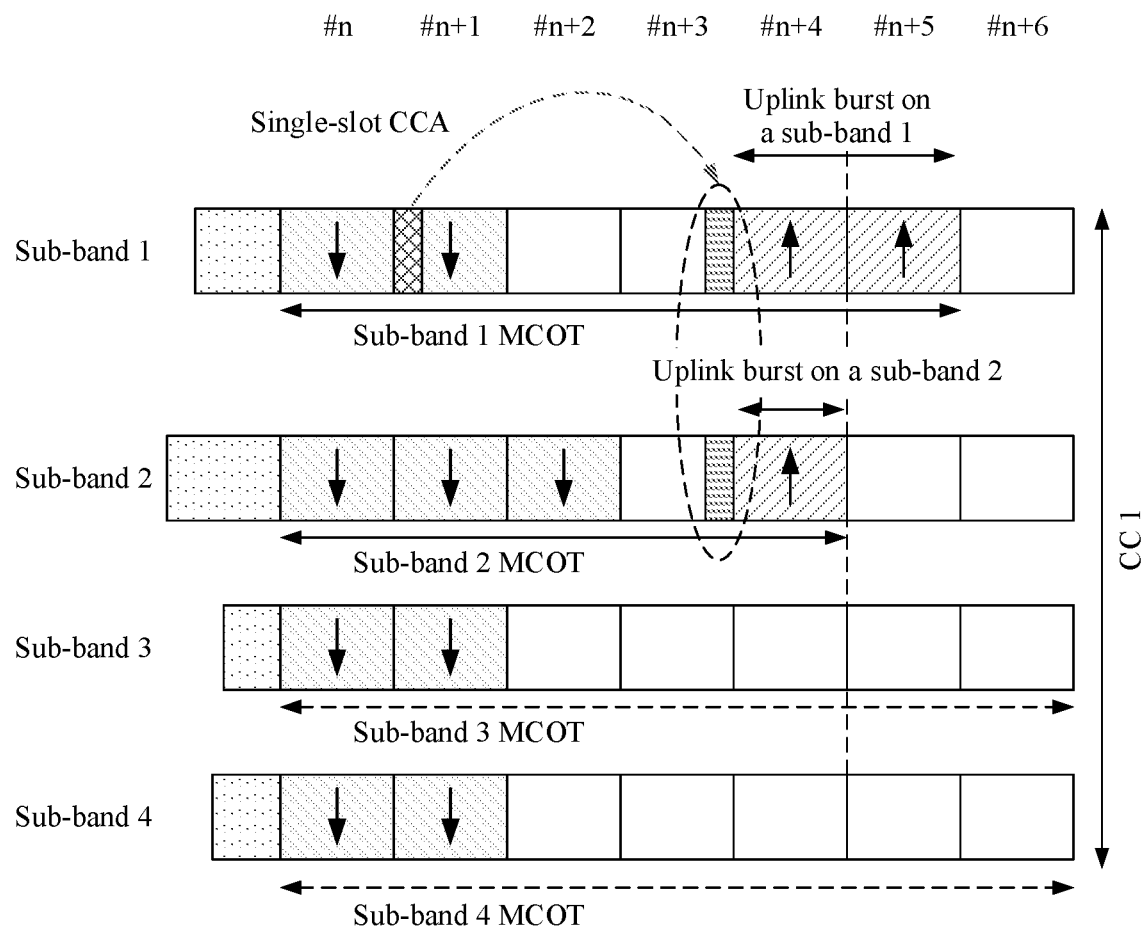
Figure 7C:
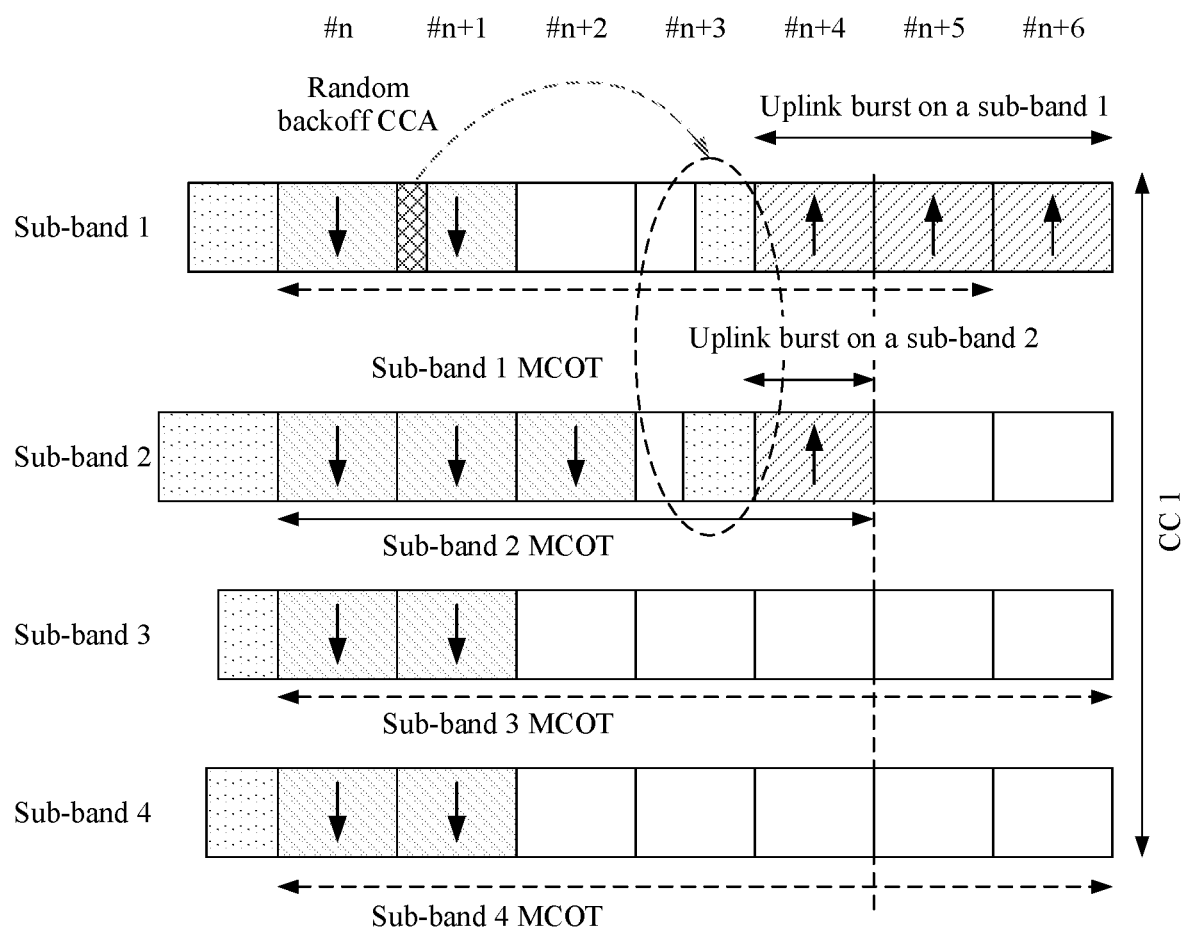

For example, as shown in FIG. 7a, FIG. 7b, or FIG. 7c, the second sub-band set is {sub-band 1, sub-band 2, sub-band 3, sub-band 4}, and the first sub-band set is {sub-band 1, sub-band 2}. When the network device accesses the second sub-band set, the network device independently performs random backoff CCA on the sub-band 1 to the sub-band 4, and MCOTs of the sub-band 1, the sub-band 2, the sub-band 3, and the sub-band 4 each are 4 ms. In FIG. 7a, an MCOT end moment of the sub-band 1 is #n+6 (ab $(n+6)^{th}$ subframe), and an MCOT end moment of the sub-band 2 is #n+4 (an $(n+4)^{th}$ subframe). Uplink information #1 (first uplink information) is carried on the sub-band 1 and the sub-band 2, and an occupied time unit is the subframe #n+4. Uplink information #2 (second uplink information) is carried on the sub-band 1 and the sub-band 2, and an occupied time unit is the subframe #n+6. An uplink burst #1 (first uplink burst) on the sub-band 1 is a time unit occupied for the uplink information #1, that is, the subframe #n+4. An uplink burst #2 (second uplink burst) on the sub-band 2 is a time unit occupied for the uplink information #1, that is, the subframe #n+4. An uplink burst #3 (third uplink burst) on the sub-band 1 is a time unit occupied for the uplink information #2, that is, the subframe #n+6. An uplink burst #4 (fourth uplink burst) on the sub-band 2 is a time unit occupied for the uplink information #2, that is, the subframe #n+6. The uplink burst #1 of the sub-band 1 is within the MCOT of the sub-band 1, and the uplink burst #2 of the sub-band 2 is within the MCOT of the sub-band 2. Therefore, an LBT type of the uplink information #1 is single-slot CCA. The uplink burst #3 of the sub-band 1 is within the MCOT of the sub-band 1, but the uplink burst #4 of the sub-band 2 is not within the MCOT of the sub-band 2. Therefore, an LBT type of the uplink information #2 is random backoff CCA. In FIG. 7b, an MCOT end moment of the sub-band 1 is #n+5, and an MCOT end moment of the sub-band 2 is #n+4. Therefore, uplink bursts {#n+4, #n+5} in which the uplink information on the sub-band 1 is located are included in the MCOT of the sub-band 1, and an uplink burst {#n+4} in which the uplink information on the sub-band 2 is located is included in the MCOT of the sub-band 2. Therefore, an LBT type of the first sub-band set is single-slot CCA. In FIG. 7c, an MCOT end moment of the sub-band 1 is #n+5 (an $(n+5)^{th}$ subframe), and an MCOT end moment of the sub-band 2 is #n+4. Therefore, uplink bursts {#n+4, #n+5, #n+6} in which the uplink information on the sub-band 1 is located are not included in the MCOT of the sub-band 1, and an uplink burst {#n+4} in which the uplink information on the sub-band 2 is located is included in the MCOT of the sub-band 2. Therefore, an LBT type of the first sub-band set is random backoff CCA.

It should be understood that the uplink burst may include at least one time consecutive time unit occupied when the network device schedules the terminal device to send information. When the uplink burst may include at least two consecutive time units, "consecutive" herein may mean that channel occupancy is continuous. In other words, the network device schedules the terminal device to continuously occupy the at least two time units to send information. Alternatively, "consecutive" may mean that sequence numbers of time units (for example, TTIs, subframes, or slot(s)) are consecutive. In other words, in the at least two consecutive time units, there may be no gap or a gap between any two adjacent time units. For example, the network device schedules the terminal device to continuously occupy the two adjacent time units to send the uplink information; or the network device schedules the terminal device not to occupy a time domain resource at an end location of a previous time unit to send information, and schedules the terminal device to reserve the time domain resource as a gap; or the network device schedules the terminal device not to occupy a time domain resource at a start location of a next time unit to send information, and schedules the terminal device to reserve the time domain resource as a gap. This is not limited in this embodiment of this application. In other words, any one of the plurality of time units may be a complete time unit, or may be a part of a time unit. Further, the uplink burst is temporally discontinuous with another adjacent time unit used by the network device to schedule the terminal device to send information, or the uplink burst is temporally discontinuous with another time unit that is used by the terminal device to send information and that is not included in the uplink burst. In other words, there is a gap before and after the uplink burst. For example, the network device schedules the terminal device to send the uplink information in the first sub-band set or on the $i^{th}$ sub-band in the first sub-band set by occupying the subframe #2 (the second subframe). A sequence of subframes used when the network device schedules the terminal device to send the uplink information by occupying the first sub-band set or the $i^{th}$ sub-band in the first sub-band set is {#1, #2, #3, #4}, and there is no other time unit that is before the subframe #1 (the first subframe) and that the network device occupies to send information. There is no other time unit scheduled by the network device to send information after the subframe #4 (the fourth subframe). In this case, the uplink burst is the subframe sequence {#1, #2, #3, #4}, and the uplink burst includes a time unit in which the uplink information is located, that is, the subframe #2.

In some embodiments, the uplink burst is an uplink burst of the first sub-band set. The network device may schedule the terminal device to occupy a same time domain resource on different sub-bands in the first sub-band set. In this case, the time domain resource is referred to as an uplink burst of the first sub-band set. For example, the first sub-band set includes the sub-band #1 (the first sub-band) and the sub-band #2 (the second sub-band), and uplink transmission on the sub-band #1 corresponds to subframes {#1, #2, #3, #4}. The uplink transmission on the sub-band #1 corresponds to the subframes {#1, #2, #3, #4}. In this case, the uplink burst of the first sub-band set corresponds to the subframe {#1, #2, #3, #4}.

In some embodiments, the uplink burst is an uplink burst on a specific sub-band (for example, the $i^{th}$ uplink burst on the $i^{th}$ sub-band) in the first sub-band set. The network device may schedule the terminal device to send uplink bursts of different lengths on different sub-bands in the first sub-band set. For example, uplink bursts on different sub-bands in the first sub-band set may correspond to different time domain ranges. For example, the first sub-band set includes the sub-band #1 and the sub-band #2, an uplink burst on the sub-band #1 corresponds to subframes {#1, #2}, and an uplink burst on the sub-band #1 corresponds to subframes {#1, #2, #3, #4}.

In this embodiment of this application, one time unit is at least one consecutive transmission time interval (TTI) or at least one time domain symbol. For example, the time unit is a time unit included in the uplink burst, or the time unit is a corresponding time unit in which the network device schedules the terminal device to send the uplink information. The uplink burst may be an uplink burst of the first sub-band set, or may be an uplink burst on a sub-band in the first sub-band set, for example, the $i^{th}$ uplink burst on the $i^{th}$ sub-band. Each TTI included in the time unit may be a complete TTI (in other words, all time domain resources corresponding to the TTI are occupied to send information), or may be a part of the TTI (in other words, some time domain resources corresponding to the TTI are occupied to send information, and the other time domain resources are reserved as idle). In some embodiments, the time unit may be a TTI. The TTI may be a 1 ms TTI, a 1 ms subframe, a short transmission time interval (sTTI) that is less than 1 ms, a mini-slot, or anon-slot. A length of a time domain resource occupied by the sTTI is less than 1 ms TTI. In other words, the sTTI is a TTI in which a time domain resource whose length is less than 1 ms is occupied. For uplink transmission, the TTI is a time domain granularity for uplink resource allocation or uplink transmission, or the TTI is a minimum time domain unit for performing uplink transmission by the terminal device. An optional length that may be supported by the sTTI includes seven uplink symbols, one uplink symbol, two uplink symbols, three uplink symbols, four uplink symbols, or the like. The uplink symbol may be a single carrier frequency division multiple access symbol (SC-FDMA symbol), or may be an orthogonal frequency division multiple access symbol (OFDMA symbol). For downlink transmission, the TTI is a time domain granularity for downlink resource allocation or downlink transmission, or the TTI is a minimum time domain unit for performing downlink transmission by the network device. An optional length that may be supported by the sTTI includes seven downlink symbols, one downlink symbol, two downlink symbols, three downlink symbols, four downlink symbols, or the like. The downlink symbol may be an OFDMA symbol. The sTTI also supports another TTI shorter than 1 ms. In some embodiments, the time unit may alternatively be at least two consecutive TTIs, for example, on an unlicensed spectrum. The time unit may be a burst (burst) including a plurality of consecutive TTIs. For example, the time unit may be an uplink burst of the first sub-band set, such as the uplink burst.

In one implementation, the first sub-band set may include at least two sub-bands.

According to the channel listening method provided In accordance with the disclosure, after occupying at least one sub-band of one carrier, the network device notifies the terminal device of a type of LBT performed on the carrier. When the sub-band occupied by the network device to send the downlink information on the carrier includes, in frequency domain, a sub-band occupied when the terminal device is scheduled to send the uplink information, the network device instructs the terminal device to access the carrier through single-slot CCA. If the sub-band occupied for the downlink information does not include, in frequency domain, the sub-band occupied by the scheduled uplink information, the network device instructs the terminal device to perform random backoff CCA. This can implement friendly coexistence with a surrounding contention node while efficient channel access is implemented, and can reduce notification signaling overheads.

Figure 8:
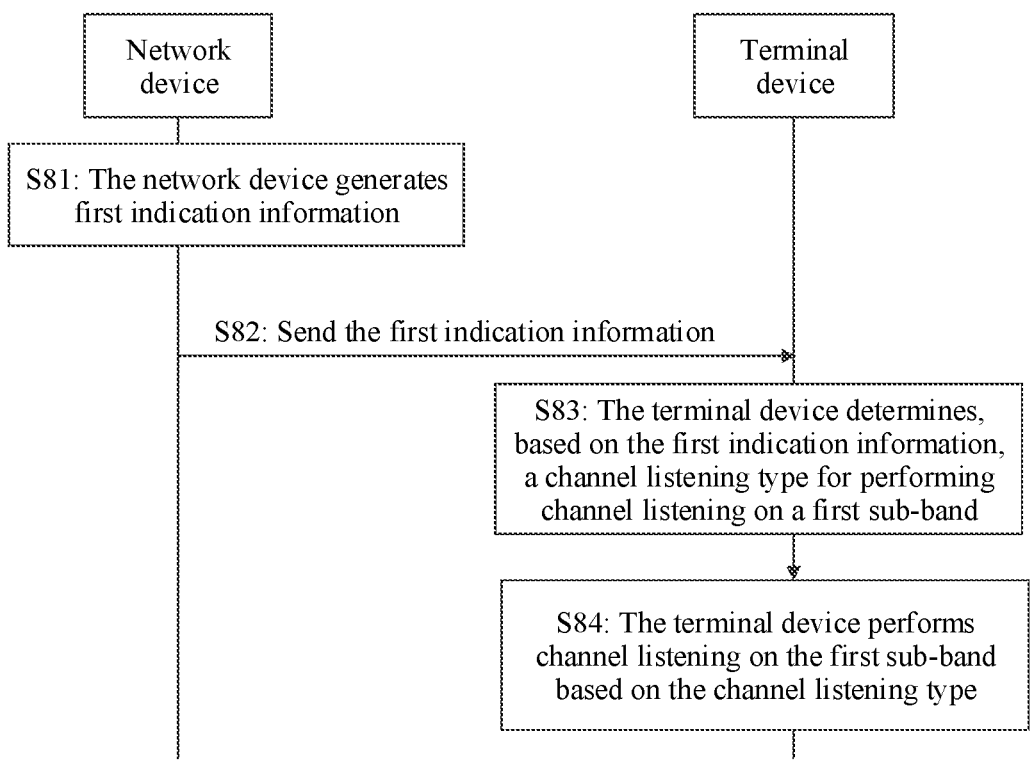
FIG. 8 is a flowchart of a channel listening type indication method according to an embodiment of this application.

Based on the communications system 100 shown in FIG. 1, as shown in FIG. 8, this application provides a channel listening type indication method. A network device in FIG. 8 may be For example the network device 101 in FIG. 1, and a terminal device may be For example the terminal device 102 in FIG. 1. The method includes the following steps.

Step S81: The network device generates first indication information.

In accordance with the present disclosure, the first indication information is used to indicate a second sub-band set occupied by the network device to send downlink information, or the first indication information is used to indicate a first sub-band set. The first sub-band set includes at least one sub-band occupied when the network device schedules the terminal device to send uplink information. The first sub-band set may include one sub-band or at least two sub-bands, and the second sub-band set may include one sub-band or at least two sub-bands.

In this embodiment, the first indication information may be cell common control information, or the first indication information may be group (group) control information. This is specific to at least one terminal device including the terminal device.

To enable the terminal device to determine a specific sub-band that is occupied by the network device and enable the network device to share an MCOT with the terminal device to perform single-slot CCA to access a channel to send the uplink information, the network device needs to send the first indication information, and notify the terminal device of the second sub-band set or an occupancy status of the second sub-band set.

In this embodiment, the first indication information may explicitly indicate the second sub-band set, or may implicitly indicate the second sub-band set. In an implementation, the explicit indication may be: A bit field in the first indication information is used to indicate an occupancy status of the first sub-band set by the network device. For example, the first indication information may explicitly indicate a sequence number of a sub-band included in the second sub-band set, or may indicate, in a form of a bitmap, whether each sub-band in the second sub-band set is occupied. For example, "0" indicates that a sub-band is not occupied, and "1" indicates that a sub-band is occupied. The implicit indication may be: The terminal device performs determining through blind detection on the first indication information. For example, if the terminal device detects the first indication information on a specific sub-band, the terminal device determines that the network device occupies the sub-band.

In this embodiment, the first indication information is used to indicate the first sub-band set, and the first sub-band set includes the at least one sub-band occupied when the network device schedules the terminal device to send the uplink information.

For example, the first indication information may explicitly indicate a sequence number of a sub-band included in the first sub-band set, or may indicate, in a form of a bitmap, whether each sub-band in the first sub-band set is occupied. For example, "0" indicates that a sub-band is not occupied, and "1" indicates that a sub-band is occupied. Alternatively, the first indication information may implicitly indicate the first sub-band set, and the implicit indication may be: The terminal device performs determining through blind detection on the first indication information. For example, if the terminal device detects the first indication information on a specific sub-band, the terminal device determines that the network device occupies the sub-band. In addition, the network device may notify the occupancy status of the second sub-band set in another manner in addition to the foregoing two manners.

Step S82: The network device sends the first indication information to the terminal device.

In an example, the first indication information may be carried in one piece of control signaling. For example, the first indication information may be carried in one piece of physical downlink control signaling. More For example, the physical downlink control signaling may be one piece of DCI. For example, the DCI may be control information in a common physical downlink control channel (CPDCCH). For another example, the physical downlink control signaling may be at least one field in one piece of DCI.

It should be understood that, to reduce overheads, the first indication information is carried in one piece of control signaling instead of at least two pieces of control signaling, and each control signaling is used to indicate an occupancy status of one sub-band in the second sub-band set or in the first sub-band set. Further, the physical downlink control signaling including the first indication information is on one sub-band included in the second sub-band set or in the first sub-band set.

Step S83: The terminal device determines, based on the first indication information, a channel listening type for performing channel listening on a first sub-band, where the first sub-band is a sub-band occupied when the network device schedules the terminal device to send the uplink information.

Step S84: The terminal device performs channel listening on the first sub-band based on the channel listening type.

In this embodiment, when the listening performed by the terminal device on the first sub-band succeeds, the terminal device may occupy the first sub-band to send the uplink information.

For example, the terminal device may perform channel listening of a long listening type on the first sub-band, or may perform channel listening of a short listening type on the first sub-band. When the terminal device may perform channel listening of a long listening type on the first sub-band, the terminal device may independently perform channel listening of a long listening type on the first sub-band, for example, by using the listening method 3-1. Alternatively, the terminal device may perform channel listening of a short listening type, and determine, based on whether the channel listening of a long listening type performed on another sub-band succeeds and whether the channel listening of a short listening type performed on the first sub-band succeeds, whether to occupy the sub-band to send the uplink information, for example, by using the listening method 3-2. The first sub-band may be a level-1 sub-band or a level-2 sub-band.

It should be understood that, for any sub-band in the first sub-band set, the network device may occupy the sub-band to send the downlink information. In this case, the terminal device may share the sub-band or an MCOT corresponding to a sub-band set (the second sub-band set or a third sub-band set) including the sub-band, perform channel listening through single-slot CCA to access a channel. Alternatively, the network device may not occupy the sub-band to send the downlink information, or the network device may occupy the sub-band but an uplink burst of the uplink information to be sent by the terminal device exceeds the MCOT. In this case, the terminal device cannot share the MCOT.

It should be understood that, for a sub-band that has been occupied by the network device, to enable the terminal device to determine a specific time domain resource on the sub-band that can be shared with the terminal device to access a channel through single-slot CCA to send the uplink information, the network device further needs to indicate an uplink time domain resource that can be used for accessing a channel through single-slot CCA.

In an example, the first indication information is further used to indicate an uplink time domain resource of the second sub-band set.

A sum of the uplink time domain resource of the second sub-band set and a time domain resource occupied for the downlink information in the second sub-band set does not exceed an MCOT of the second sub-band set. The uplink time domain resource of the second sub-band set is a corresponding time domain resource used by the terminal device to perform channel listening of a short listening type on at least one sub-band in the second sub-band set.

Correspondingly, that the terminal device determines, based on the first indication information, a channel listening type for performing channel listening on a first sub-band includes: When the first sub-band is included in the second sub-band set, and an uplink burst on the first sub-band is located in the uplink time domain resource of the second sub-band set, the terminal device determines that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

For example, the network device may indicate at least two of a start moment (or a start time unit), an end moment (or an end time unit), and duration of the uplink time domain resource of the second sub-band set, or may For example indicate a specific TTI, a specific subframe, or a specific slot for the uplink time domain resource of the second sub-band set, or may use another indication method. This is not limited herein. A start moment (or a start time unit) of the uplink information may be a time offset (or a time interval) of the uplink time domain resource relative to an end moment of the downlink information.

It should be understood that the uplink burst on the first sub-band is an uplink burst carried on the first sub-band. A definition of the uplink burst is described above, and details are not described again. Further, the uplink burst on the first sub-band is temporally discontinuous with another adjacent time unit in which the network device schedules the terminal device to send information.

In some embodiments, that the uplink burst on the first sub-band is located in the uplink time domain resource of the second sub-band set includes: An end moment of the uplink burst on the first sub-band is not later than the end moment of the uplink time domain resource of the second sub-band set.

In some embodiments, that the uplink burst on the first sub-band is located in the uplink time domain resource of the second sub-band set includes: A start moment of the uplink burst on the first sub-band is not earlier than the start moment of the uplink time domain resource of the second sub-band set, and the end moment of the uplink burst on the first sub-band is not later than the end moment of the uplink time domain resource of the second sub-band set.

In accordance with the disclosure, when the first sub-band is not included in the second sub-band set, or when the first sub-band is included in the second sub-band set and the uplink burst on the first sub-band is not located in the uplink time domain resource of the second sub-band set, the terminal device determines that the channel listening type is the long listening type.

It should be understood that, when a same time domain resource on all sub-bands in a specific sub-band set (for example, the second sub-band set or the first sub-band set) is occupied for the downlink information, the time domain resource occupied for the downlink information is a time domain resource occupied for the downlink information on any sub-band in the sub-band set. When time domain resources occupied for the downlink information on all the sub-bands in the sub-band set are not completely the same, the time domain resources occupied for the downlink information are time domain resources between the earliest start moment and the latest end moment. A corresponding time domain resource on each sub-band in the sub-band set is occupied for the downlink information. The earliest start moment is a start moment of a time domain resource with the earliest start moment in time domain resources corresponding to all the sub-bands in the sub-band set, and the latest end moment is an end moment of a time domain resource with the latest end moment. For example, if K time domain resources in K sub-bands included in the sub-band set are correspondingly occupied for the downlink information, the earliest start moment is a start moment corresponding to a time domain resource with the earliest start moment in the K time domain resources, and the latest end moment is an end moment corresponding to a time domain resource with the latest end moment in the K time domain resources, where K is a positive integer.

It should be understood that the MCOT of the second sub-band set is a corresponding MCOT in which the network device performs channel listening for the second sub-band set before the network device sends the downlink information. Further, channel listening performed by the network device before the network device sends the downlink information is channel listening of a long listening type.

It should be understood that channel listening performed by the network device for the second sub-band set before the network device sends the downlink information is described in the listening method 3-1, the listening method 3-2, or the listening method 4. Details are not described again.

In an example of this application, the first indication information is further used to indicate the uplink time domain resource of the second sub-band set.

A sum of the uplink time domain resource of the second sub-band set and a time domain resource occupied for the downlink information on any sub-band in the second sub-band set does not exceed an MCOT of the any sub-band, and the uplink time domain resource of the second sub-band set is a corresponding time domain resource used by the terminal device to perform channel listening of a short listening type on at least one sub-band in the second sub-band set.

Correspondingly, that the terminal device determines, based on the first indication information, a channel listening type for performing channel listening on a first sub-band includes: When the first sub-band is included in the second sub-band set, and an uplink burst on the first sub-band is located in the uplink time domain resource of the second sub-band set, the terminal device determines that the channel listening type is a short channel listening type.

It should be understood that the uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In accordance with the disclosure, when the first sub-band is not included in the second sub-band set, or when the first sub-band is included in the second sub-band set and the uplink burst on the first sub-band is not located in the uplink time domain resource of the second sub-band set, the terminal device determines that the channel listening type is the long listening type.

It should be understood that the MCOT of any sub-band in the second sub-band set is a corresponding MCOT in which the network device performs channel listening on the any sub-band before the network device sends the downlink information. Descriptions of an MCOT corresponding to a sub-band #i are described above, and details are not described again. For example, if the any sub-band is the sub-band #i, a sum of an uplink time domain resource of the sub-band #i and a corresponding time domain resource used by the network device to send the downlink information on the sub-band #i does not exceed a maximum channel occupancy time of the sub-band #i. Further, channel listening performed by the network device before the network device sends the downlink information is channel listening of a long listening type.

Figure 9A:
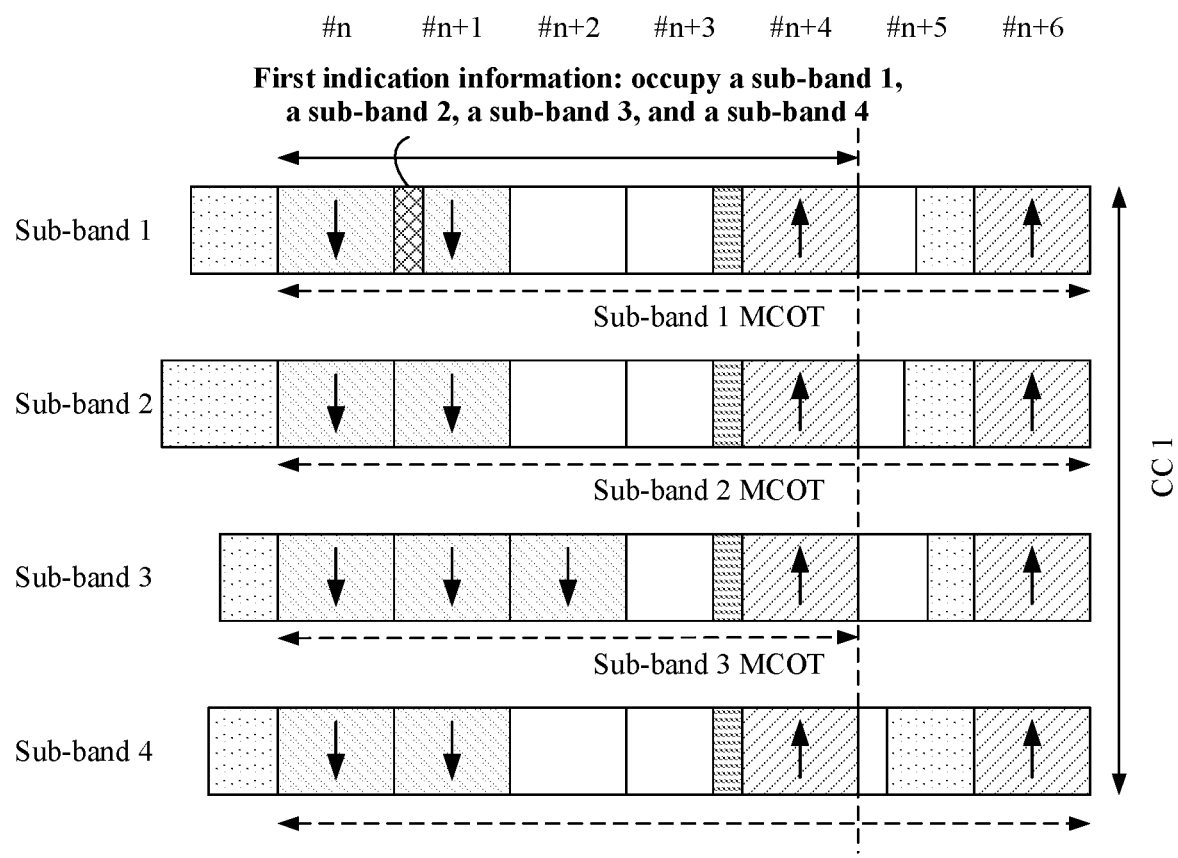
FIG. 9a, FIG. 9b, FIG. 9c, and FIG. 9d are schematic diagrams of a channel listening type according to an embodiment of this application.

For example, in FIG. 9a, the network device notifies the terminal device that the second sub-band set occupied to send the downlink information is {sub-band 1, sub-band 2, sub-band 3, sub-band 4}. In addition, because a sum of a subframe #4 (the fourth subframe) and a time domain length of the downlink information on any sub-band in the second sub-band set does not exceed an MCOT of the any sub-band, the network device notifies the terminal device that the uplink time domain resource of the second sub-band set is the subframe #4. The terminal device may perform single-slot CCA on the sub-band 1, the sub-band 2, the sub-band 3, and the sub-band 4 for an uplink burst {subframe #4}. In addition, a subframe #6 (the sixth subframe) of each of the sub-band 1, the sub-band 2, and the sub-band 4 is also within an MCOT of a corresponding sub-band. However, because the network device notifies only an uplink time domain resource corresponding to one common second sub-band set, namely, the subframe #4, the terminal device performs random backoff CCA on the uplink burst {subframe #6} on each of the four sub-bands.

In an example, the first indication information is further used to indicate an uplink time domain resource of each sub-band in the second sub-band set. The uplink time domain resource of any sub-band in the second sub-band set is determined based on the MCOT of the any sub-band, and the uplink time domain resource of the any sub-band is a corresponding time domain resource used by the terminal device to perform channel listening of a short listening type on the any sub-band.

Further, that the uplink time domain resource of any sub-band in the second sub-band set is determined based on the MCOT of the any sub-band includes: A sum of the uplink time domain resource of the any sub-band and the time domain resource occupied for the downlink information on the any sub-band does not exceed a maximum channel occupancy time of the any sub-band.

Correspondingly, that the terminal device determines, based on the first indication information, a channel listening type for performing channel listening on a first sub-band includes: When the first sub-band is included in the second sub-band set, and an uplink burst on the first sub-band is located in the uplink time domain resource of the first sub-band, the terminal device determines that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

For example, the network device may indicate at least two of a start moment (or a start time unit), an end moment (or an end time unit), and duration of the uplink time domain resource of each sub-band in the second sub-band set, or may For example indicate a specific TTI, a specific subframe, or a specific slot for the uplink time domain resource of each sub-band in the second sub-band set, or may use another indication method. This is not limited herein. A start moment (or a start time unit) of the uplink information may be a time offset (or a time interval) of the uplink time domain resource relative to an end moment of the downlink information.

In accordance with the disclosure, when the first sub-band is not included in the second sub-band set, or when the first sub-band is included in the second sub-band set and the uplink burst on the first sub-band is not located in the uplink time domain resource of the first sub-band, the terminal device determines that the channel listening type is a long channel listening type.

In some embodiments, that an uplink burst on the first sub-band is located in the uplink time domain resource of the first sub-band includes: An end moment of the uplink burst on the first sub-band is not later than an end moment of the uplink time domain resource of the first sub-band.

In some embodiments, that an uplink burst on the first sub-band is located in the uplink time domain resource of the first sub-band includes: A start moment of the uplink burst on the first sub-band is not earlier than a start moment of the uplink time domain resource of the first sub-band, and an end moment of the uplink burst on the first sub-band is not later than an end moment of the uplink time domain resource of the first sub-band.

It should be noted that the MCOT of any sub-band in the second sub-band set is a corresponding MCOT in which the network device performs channel listening on the any sub-band before the network device sends the downlink information. Descriptions of an MCOT corresponding to a sub-band #i are described above, and details are not described again. For example, if the any sub-band is the sub-band #i, a sum of an uplink time domain resource of the sub-band #i and a corresponding time domain resource used by the network device to send the downlink information on the sub-band #i does not exceed a maximum channel occupancy time of the sub-band #i.

Figure 9B:
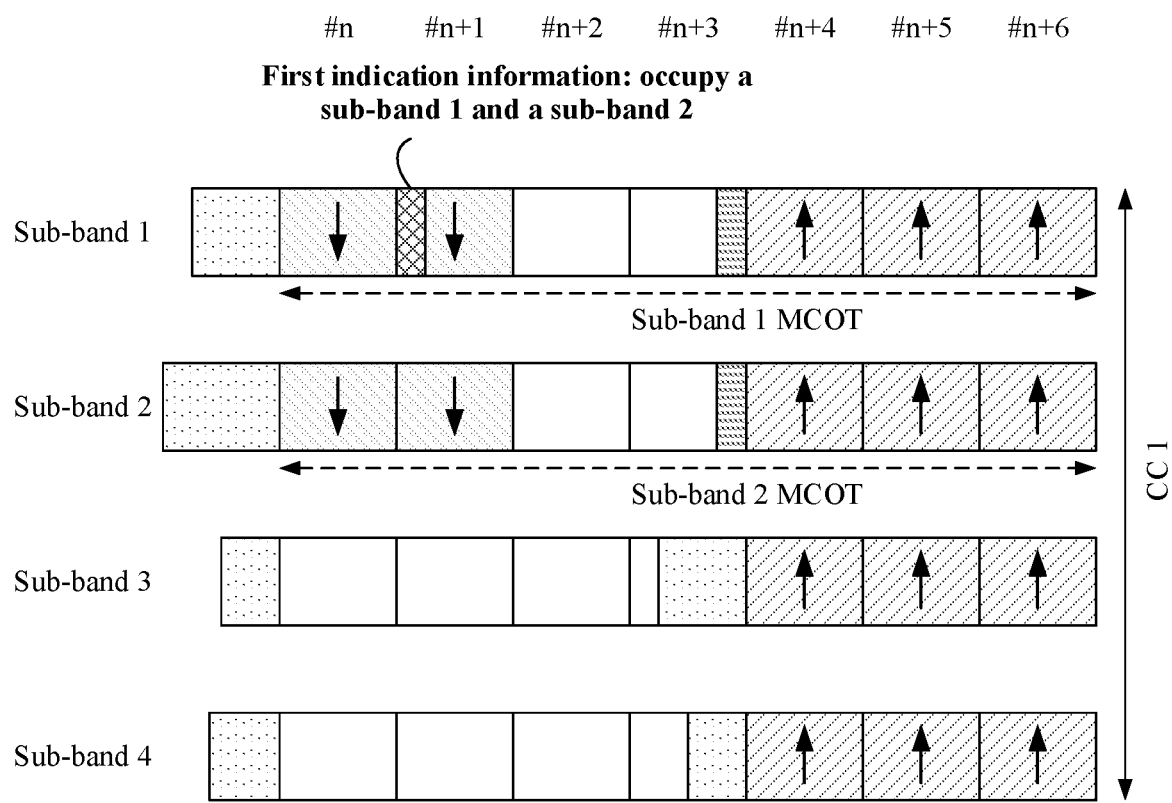
Figure 9C:
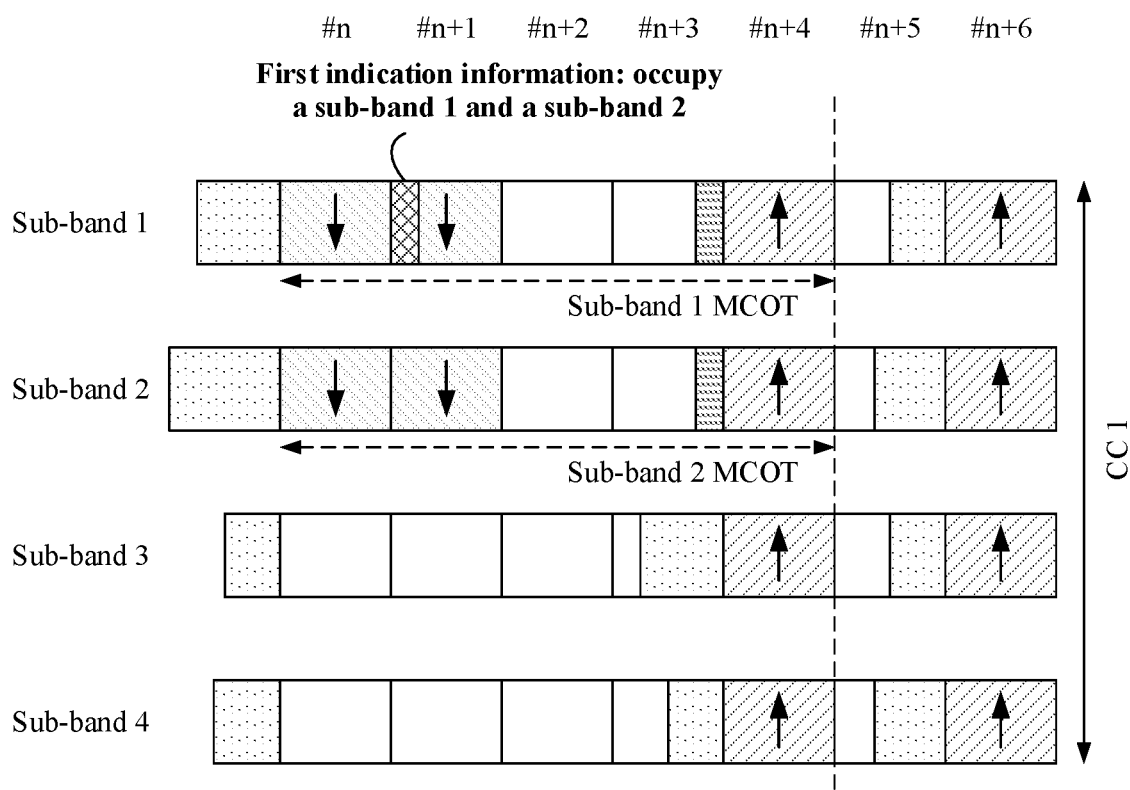

For example, in FIG. 9b and FIG. 9c, in one carrier including all sub-bands {sub-band 1, sub-band 2, sub-band 3, sub-band 4}, the network device may occupy only some of the sub-bands and use the sub-bands as the second sub-band set to send the downlink information. In FIG. 9b, the network device notifies the terminal device that the second sub-band set occupied for sending the downlink information is {sub-band 1, sub-band 2}. In addition, the network device notifies the terminal device of an uplink time domain resource of each sub-band: An uplink time domain resource of the sub-band 1 is a subframe #4 to a subframe #6, and an uplink time domain resource of the sub-band 2 is a subframe #4 to a subframe #6. In this case, the terminal device may perform single-slot CCA on the sub-band 1 and the sub-band 2 for the uplink burst {subframe #4, subframe #5, and subframe #6}. For a sub-band 3 and a sub-band 4 that are not occupied by the network device, the terminal device performs random backoff CCA. In FIG. 9c, the network device notifies the terminal device that the second sub-band set occupied for sending the downlink information is {sub-band 1, sub-band 2}, and an uplink time domain resource of the sub-band 1 and an uplink time domain resource of the sub-band 2 each are {subframe #4}. In this case, the terminal device may separately perform single-slot CCA on the sub-band 1 and the sub-band 2 for the uplink burst {subframe #4}. For the uplink burst {subframe #6}, because the uplink burst exceeds the uplink time domain resource of each of the sub-band 1 and the sub-band 2, the terminal device separately performs random backoff CCA. For a sub-band 3 and a sub-band 4 that are not occupied by the network device, the terminal device performs random backoff CCA.

Figure 9D:
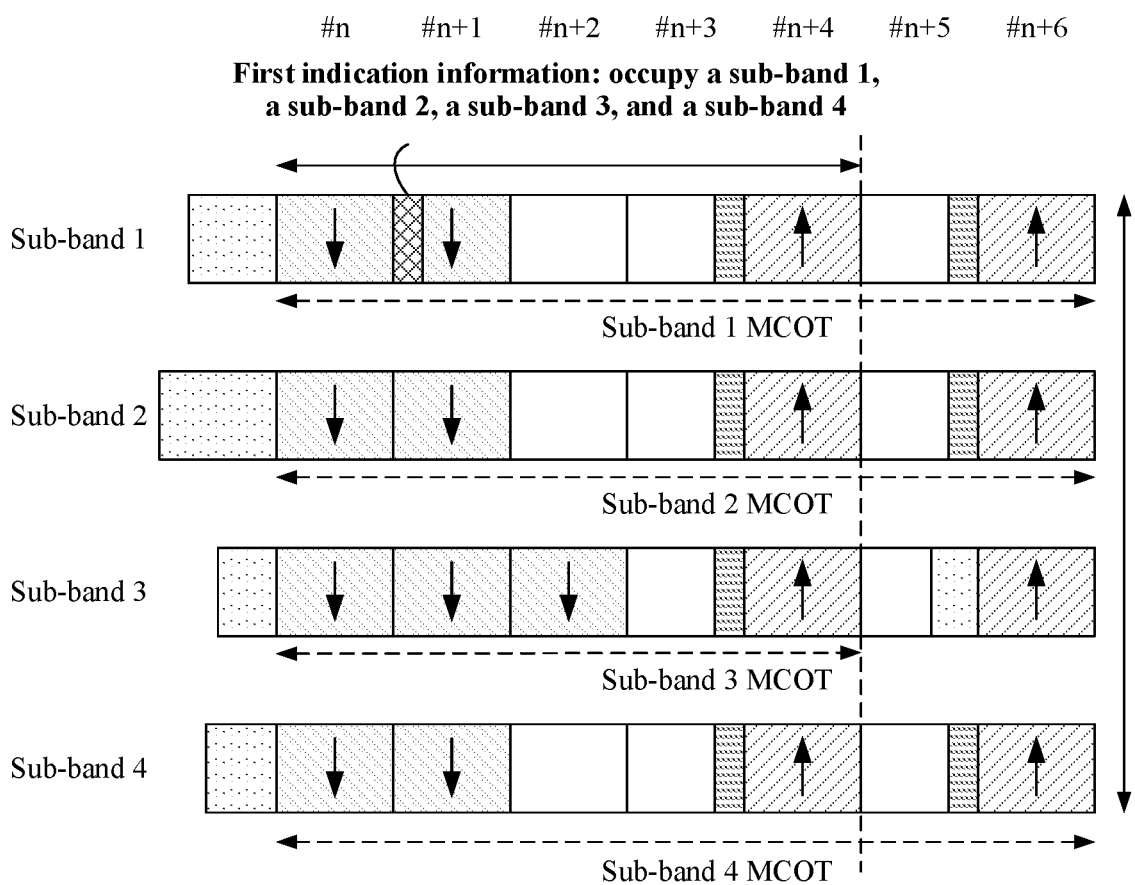

For example, in FIG. 9d, the network device notifies the terminal device that the second sub-band set occupied for sending the downlink information is {sub-band 1, sub-band 2, sub-band 3, sub-band 4}. In addition, the network device notifies the terminal device of an uplink time domain resource of each sub-band: Uplink time domain resources of the sub-band 1, the sub-band 2, and the sub-band 4 are a subframe #4 to a subframe #6, and an uplink time domain resource of the sub-band 3 is a {subframe #4}. In this case, the terminal device may perform single-slot CCA on the sub-band 1, the sub-band 2, and the sub-band 4 for the uplink burst {subframe #4} and the uplink burst {subframe #6}, perform single-slot CCA on the sub-band 3 for the uplink burst {subframe #4}, and perform random backoff CCA for the uplink burst {subframe #6}.

In an example, when each sub-band in the first sub-band set is included in the second sub-band set, the first indication information is further used to indicate an uplink time domain resource of the first sub-band set. A sum of the uplink time domain resource of the first sub-band set and a time domain resource occupied for the downlink information in the first sub-band set does not exceed an MCOT of the first sub-band set, and the first sub-band set includes at least one sub-band occupied when the network device schedules the terminal device to send the uplink information. The uplink time domain resource of the first sub-band set is a corresponding time domain resource used by the terminal device to perform channel listening of a short listening type on at least one sub-band in the first sub-band set.

Correspondingly, that the terminal device determines, based on the first indication information, a channel listening type for performing channel listening on a first sub-band includes: When the first sub-band is included in the first sub-band set, and an uplink burst on the first sub-band is located in the uplink time domain resource of the first sub-band set, the terminal device determines that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

For example, the network device may indicate at least two of a start moment (or a start time unit), an end moment (or an end time unit), and duration of the uplink time domain resource of the first sub-band set, or may For example indicate a specific TTI, a specific subframe, or a specific slot for the uplink time domain resource of the second sub-band set, or may use another indication method. This is not limited herein. A start moment (or a start time unit) of the uplink time domain resource may be a time offset (or a time interval) of the uplink time domain resource relative to an end moment of the downlink information.

In accordance with the disclosure, when the first sub-band is not included in the first sub-band set, or when the first sub-band is included in the first sub-band set and an uplink burst on the first sub-band is not located in the uplink time domain resource of the first sub-band set, the terminal device determines that the channel listening type is a long channel listening type.

In some embodiments, that an uplink burst on the first sub-band is located in the uplink time domain resource of the first sub-band set includes: An end moment of the uplink burst on the first sub-band is not later than an end moment of the uplink time domain resource of the first sub-band set.

In some embodiments, that an uplink burst on the first sub-band is located in the uplink time domain resource of the first sub-band set includes: A start moment of the uplink burst on the first sub-band is not earlier than a start moment of the uplink time domain resource of the first sub-band set, and an end moment of the uplink burst on the first sub-band is not later than an end moment of the uplink time domain resource of the first sub-band set.

It should be understood that the MCOT of the first sub-band set is a corresponding MCOT in which the network device performs channel listening for the first sub-band set before the network device sends the downlink information. Further, channel listening performed by the network device before the network device sends the downlink information is channel listening of a long listening type.

It should be understood that channel listening performed by the network device for the first sub-band set before the network device sends the downlink information is described in the listening method 3-1, the listening method 3-2, or the listening method 4. Details are not described again.

In an example, when each sub-band in the first sub-band set is included in the second sub-band set, the first indication information is further used to indicate an uplink time domain resource of the first sub-band set. A sum of the uplink time domain resource of the first sub-band set and a time domain resource occupied for the downlink information on any sub-band in the first sub-band set does not exceed an MCOT of the any sub-band, and the first sub-band set includes at least one sub-band occupied when the network device schedules the terminal device to send the uplink information. The uplink time domain resource of the first sub-band set is a corresponding time domain resource used by the terminal device to perform channel listening of a short listening type on at least one sub-band in the first sub-band set.

Correspondingly, that the terminal device determines, based on the first indication information, a channel listening type for performing channel listening on a first sub-band includes: When the first sub-band is included in the first sub-band set, and an uplink burst on the first sub-band is located in the uplink time domain resource of the first sub-band set, the terminal device determines that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

In accordance with the disclosure, when the first sub-band is not included in the first sub-band set, or when the first sub-band is included in the first sub-band set and the uplink burst on the first sub-band is not located in the uplink time domain resource of the first sub-band set, the terminal device determines that the channel listening type is a long channel listening type.

It should be noted that the MCOT of any sub-band in the first sub-band set is a corresponding MCOT in which the network device performs channel listening on the any sub-band before the network device sends the downlink information.

Descriptions of an MCOT corresponding to a sub-band #i are described above, and details are not described again. For example, if the any sub-band is the sub-band #i, a sum of an uplink time domain resource of the sub-band #i and a corresponding time domain resource used by the network device to send the downlink information on the sub-band #i does not exceed a maximum channel occupancy time of the sub-band #i.

For example, in FIG. 9a, the network device notifies the terminal device that the second sub-band set occupied for sending the downlink information is {sub-band 1, sub-band 2, sub-band 3, sub-band 4}. In addition, because a sum of a subframe #4 and a time domain length of the downlink information of any sub-band in the first sub-band set does not exceed the MCOT of the any sub-band, the network device notifies the terminal device that the uplink time domain resource of the first sub-band set is the subframe #4. The terminal device may perform single-slot CCA on the sub-band 1, the sub-band 2, the sub-band 3, and the sub-band 4 for the uplink burst {subframe #4}. In addition, a subframe #6 on the sub-band 1, the sub-band 2, and the sub-band 4 is also within an MCOT of a corresponding sub-band. However, because the network device notifies only an uplink time domain resource corresponding to one common first sub-band set, namely, the subframe #4, the terminal device performs random backoff CCA on the uplink burst {subframe #6} of the four sub-bands.

In an example, when each sub-band in the first sub-band set is included in the second sub-band set, the first indication information is further used to indicate an uplink time domain resource of each sub-band in the first sub-band set. The uplink time domain resource of any sub-band in the first sub-band set is determined based on an MCOT of the any sub-band, and the uplink time domain resource of the any sub-band is a corresponding time domain resource used by the terminal device to perform channel listening of a short listening type on the any sub-band. The first sub-band set includes at least one sub-band occupied when the network device schedules the terminal device to send the uplink information.

Further, that the uplink time domain resource of any sub-band in the first sub-band set is determined based on the MCOT of the any sub-band includes: A sum of the uplink time domain resource of the any sub-band and the time domain resource occupied for the downlink information on the any sub-band does not exceed a maximum channel occupancy time of the any sub-band.

Correspondingly, that the terminal device determines, based on the first indication information, a channel listening type for performing channel listening on a first sub-band includes: When the first sub-band is included in the first sub-band set, and an uplink burst on the first sub-band is located in the uplink time domain resource of the first sub-band, the terminal device determines that the channel listening type is a short channel listening type. The uplink burst on the first sub-band is at least one consecutive time unit that the network device schedules the terminal device to occupy on the first sub-band, and the uplink burst on the first sub-band includes a time unit occupied when the network device schedules the terminal device to send the uplink information.

For example, the network device may indicate at least two of a start moment (or a start time unit), an end moment (or an end time unit), and duration of the uplink time domain resource of each sub-band in the first sub-band set, or may For example indicate a specific TTI, a specific subframe, or a specific slot for the uplink time domain resource of each sub-band in the first sub-band set, or may use another indication method. This is not limited herein. A start moment (or a start time unit) of the uplink time domain resource may be a time offset (or a time interval) of the uplink time domain resource relative to an end moment of the downlink information.

In accordance with the disclosure, when the first sub-band is not included in the first sub-band set, or when the first sub-band is included in the first sub-band set and the uplink burst on the first sub-band is not located in the uplink time domain resource of the first sub-band, the terminal device determines that the channel listening type is a long channel listening type.

It should be noted that a sum of the uplink time domain resource of the any sub-band and the time domain resource occupied for the downlink information on the any sub-band does not exceed an MCOT of the any sub-band.

For example, in FIG. 9d, the network device notifies the terminal device that the second sub-band set occupied for sending the downlink information is {sub-band 1, sub-band 2, sub-band 3, sub-band 4}, and indicates an uplink time domain resource of each sub-band in the first sub-band set: Uplink time domain resources of the sub-band 1, the sub-band 2, and the sub-band 4 are a subframe #4 to a subframe #6, and an uplink time domain resource of the sub-band 3 is a {subframe #4}. In this case, the terminal device may perform single-slot CCA on the sub-band 1, the sub-band 2, and the sub-band 4 for the uplink burst {subframe #4} and the uplink burst {subframe #6}, perform single-slot CCA on the sub-band 3 for the uplink burst {subframe #4}, and perform random backoff CCA for the uplink burst {subframe #6}.

According to the channel listening method provided In accordance with the disclosure, after occupying at least one sub-band of one carrier, the network device notifies an uplink time domain resource that may be used by the terminal device to perform single-slot CCA. Only when a sub-band occupied by the network device to send the downlink information on the carrier includes, in frequency domain, a sub-band occupied by the terminal device to send the uplink information, and an uplink time domain resource of the sub-band does not exceed an MCOT of the sub-band, the terminal device accesses the carrier through single-slot CCA. Otherwise, the terminal device performs random backoff CCA. This can implement friendly coexistence with a surrounding contention node while efficient channel access is implemented, and can reduce notification signaling overheads.

In accordance with the disclosure, the network device may notify the terminal device of the second sub-band set occupied for sending the downlink information, so that the terminal device accesses a channel by using the short listening type. In addition, after the channel listening of a long listening type performed by the terminal device succeeds and therefore the terminal device sends the uplink information by occupying an uplink sub-band, the terminal device may further notify the network device of the first sub-band set occupied for sending the uplink information, so that the network device accesses a channel by using the short listening type, in other words, shares the MCOT with the network device.

In an example, the terminal device generates first indication information. The first indication information is used to indicate the first sub-band set occupied by the terminal device for sending the uplink information. The terminal device sends the first indication information to the network device.

Correspondingly, the network device determines, based on the first indication information, a channel listening type for performing channel listening on a second sub-band. The second sub-band is a sub-band occupied by the network device for sending the uplink information. The network device performs channel listening on the second sub-band based on the channel listening type.

For example, in this embodiment, that the terminal device occupies the first sub-band set to send the uplink information includes: The terminal device occupies all sub-bands in the first sub-band set to send the uplink information. In other words, each sub-band in the first sub-band set is a sub-band occupied by the terminal device for sending the uplink information. Each sub-band is used to carry a part of the uplink information. It should be understood that, for any sub-band in the first sub-band set that is occupied by the terminal device, the terminal device may occupy all frequency domain resources (for example, all PRBs) corresponding to the any sub-band, or may occupy some frequency domain resources (for example, some PRBs) corresponding to the any sub-band. The two cases are referred to as that the any sub-band is occupied for the uplink information.

In an example of this application, the first indication information may be carried in one piece of control signaling. The control signaling may be carried on an uplink service channel, or may be carried on an uplink control channel. For example, the control signaling is carried in uplink transmission, for example, included in the uplink information.

In an example, the first indication information is further used to indicate a downlink time domain resource of the first sub-band set. A sum of the downlink time domain resource of the first sub-band set and a time domain resource occupied for the uplink information in the first sub-band set does not exceed a maximum channel occupancy time corresponding to the first sub-band set. The downlink time domain resource of the first sub-band set is a corresponding time domain resource used by the network device to perform channel listening of a short listening type on at least one sub-band in the first sub-band set. This is similar to a case in which the network device indicates the downlink time domain resource of the second sub-band set to the terminal device by using the first indication information. Details are not described again.

Correspondingly, that the network device determines, based on the first indication information, a channel listening type for performing channel listening on a second sub-band includes: When the second sub-band is included in the first sub-band set, and a downlink burst on the second sub-band is located in a downlink time domain resource of the first sub-band set, the network device determines that the channel listening type is a short channel listening type. The downlink burst on the second sub-band is at least one consecutive time unit occupied by the network device on the second sub-band.

For example, the terminal device may indicate at least two of a start moment (or a start time unit), an end moment (or an end time unit), and duration of the downlink time domain resource of the first sub-band set, or may For example indicate a specific TTI, a specific subframe, or a specific slot for the downlink time domain resource of the first sub-band set, or may use another indication method. This is not limited herein. A start moment (or a start time unit) of the uplink information may be a time offset (or a time interval) of the downlink time domain resource relative to an end moment of the uplink information.

It should be understood that the downlink burst on the second sub-band is a downlink burst carried on the second sub-band. A definition of the downlink burst is described above, and details are not described again. Further, the downlink burst on the second sub-band is temporally discontinuous with another adjacent time unit in which the network device sends information.

In some embodiments, that a downlink burst on the second sub-band is located in a downlink time domain resource of the first sub-band set includes: An end moment of the downlink burst on the second sub-band is not later than an end moment of the downlink time domain resource of the first sub-band set.

In some embodiments, that a downlink burst on the second sub-band is located in a downlink time domain resource of the first sub-band set includes: A start moment of the downlink burst on the second sub-band is not earlier than a start moment of the downlink time domain resource of the first sub-band set, and an end moment of the downlink burst on the second sub-band is not later than an end moment of the downlink time domain resource of the first sub-band set.

In accordance with the disclosure, when the second sub-band is not included in the first sub-band set, or when the second sub-band is included in the first sub-band set and the downlink burst on the second sub-band is not located in the downlink time domain resource of the first sub-band set, the network device determines that the channel listening type is the long listening type.

It should be understood that channel listening performed by the terminal device for the first sub-band set before the terminal device sends the uplink information is described in the listening method 1, the listening method 2-1, or the listening method 2-2. Details are not described again. Further, the channel listening is channel listening of a long listening type.

In an example, the first indication information is further used to indicate a downlink time domain resource of the first sub-band set. A sum of the downlink time domain resource of the first sub-band set and a time domain resource occupied for the uplink information on any sub-band in the first sub-band set does not exceed a maximum channel occupancy time of the any sub-band, and the downlink time domain resource of the first sub-band set is a corresponding time domain resource used by the network device to perform channel listening of a short listening type on at least one sub-band in the first sub-band set. This is similar to a case in which the network device indicates the downlink time domain resource of the second sub-band set to the terminal device by using the first indication information. Details are not described again.

Correspondingly, that the network device determines, based on the first indication information, a channel listening type for performing channel listening on a second sub-band includes: When the second sub-band is included in the first sub-band set, and a downlink burst on the second sub-band is located in a downlink time domain resource of the first sub-band set, the network device determines that the channel listening type is a short channel listening type.

In accordance with the disclosure, when the second sub-band is not included in the first sub-band set, or when the second sub-band is included in the first sub-band set and the downlink burst on the second sub-band is not located in the downlink time domain resource of the first sub-band set, the network device determines that the channel listening type is the long listening type.

It should be understood that the MCOT of any sub-band in the first sub-band set is a corresponding MCOT in which the terminal device performs channel listening on the any sub-band before the terminal device sends the uplink information. For example, if the any sub-band is a sub-band #i, a sum of a downlink time domain resource of the sub-band #i and a corresponding time domain resource used by the terminal device to send the uplink information on the sub-band #i does not exceed a maximum channel occupancy time of the sub-band #i. Further, channel listening performed by the terminal device before the terminal device sends the uplink information is channel listening of a long listening type.

In an example, the first indication information is further used to indicate a downlink time domain resource of each sub-band in the first sub-band set. The downlink time domain resource of any sub-band in the first sub-band set is determined based on a maximum channel occupancy time of the any sub-band, and the downlink time domain resource of the any sub-band is a corresponding time domain resource used by the network device to perform channel listening of a short listening type on the any sub-band. This is similar to a case in which the network device indicates a downlink time domain resource of each sub-band in the second sub-band set to the terminal device by using the first indication information. Details are not described again.

Further, that the downlink time domain resource of any sub-band in the first sub-band set is determined based on an MCOT of the any sub-band includes: A sum of the downlink time domain resource of the any sub-band and the time domain resource occupied for the uplink information on the any sub-band does not exceed the maximum channel occupancy time of the any sub-band.

Correspondingly, that the network device determines, based on the first indication information, a channel listening type for performing channel listening on a second sub-band includes: When the second sub-band is included in the first sub-band set, and a downlink burst on the second sub-band is located in a downlink time domain resource of the second sub-band, the network device determines that the channel listening type is a short channel listening type.

For example, the terminal device may indicate at least two of a start moment (or a start time unit), an end moment (or an end time unit), and duration of the downlink time domain resource of each sub-band in the first sub-band set, or may For example indicate a specific TTI, a specific subframe, or a specific slot for each sub-band in the downlink time domain resource of the first sub-band set, or may use another indication method. This is not limited herein. A start moment (or a start time unit) of the downlink time domain resource may be a time offset (or a time interval) of the downlink time domain resource relative to an end moment of the uplink information.

In accordance with the disclosure, when the second sub-band is not included in the first sub-band set, or when the second sub-band is included in the first sub-band set and the downlink burst on the second sub-band is not located in the downlink time domain resource of the first sub-band set, the network device determines that the channel listening type is the long listening type.

In some embodiments, that a downlink burst on the second sub-band is located in a downlink time domain resource of the second sub-band includes: An end moment of the downlink burst on the second sub-band is not later than an end moment of the downlink time domain resource of the second sub-band.

In some embodiments, that a downlink burst on the second sub-band is located in a downlink time domain resource of the second sub-band includes: A start moment of the downlink burst on the second sub-band is not earlier than a start moment of the downlink time domain resource of the second sub-band, and an end moment of the downlink burst on the second sub-band is not later than an end moment of the downlink time domain resource of the second sub-band.

It should be understood that the downlink burst (burst) may include at least one consecutive time unit occupied by the network device to send information. Further, the downlink burst is temporally discontinuous with another adjacent time unit used by the network device to send information, or the downlink burst is temporally discontinuous with another time unit that is used by the network device to send information and that is not included in the downlink burst. In other words, there is a gap before and after the downlink burst. The description is similar to that of the uplink burst, and details are not described again.

Figure 10:
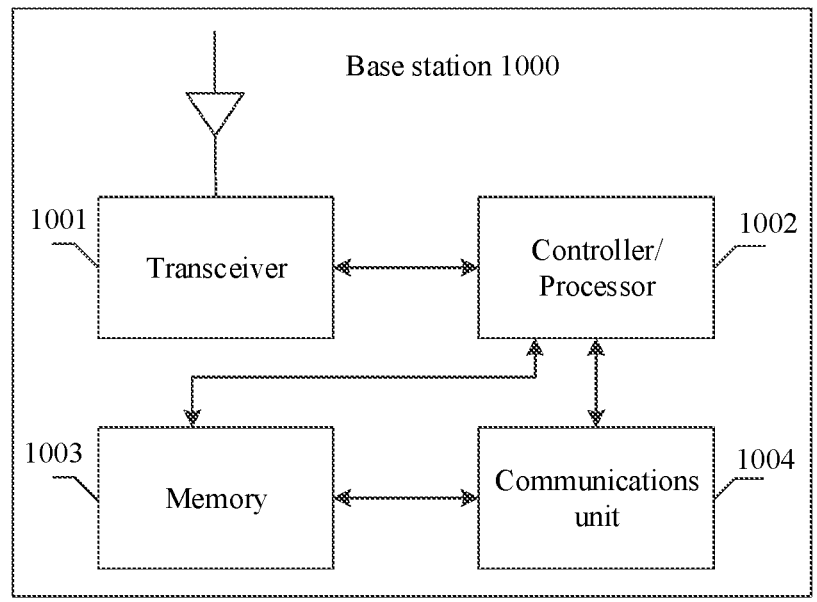
FIG. 10 is a schematic structural diagram of a base station according to an embodiment of this application.

FIG. 10 is one example schematic structural diagram of a base station involved in the foregoing embodiments. The base station 1000 may be the network device 101 shown in FIG. 1, or the base station may be the network device in FIG. 2 or FIG. 8.

The base station includes a transceiver 1001 and a controller/processor 1002. The transceiver 1001 may be configured to support information receiving and sending between the base station and the UE in the foregoing embodiments, and support wireless communication between the UE and another UE. The controller/processor 1002 may be configured to perform various functions for communicating with the UE or another network device. On an uplink, an uplink signal from the UE is received by an antenna, demodulated by the transceiver 1001, and further processed by the controller/processor 1002, to restore service data and signaling information that are sent by the UE. On a downlink, the service data and the signaling message are processed by the controller/processor 1002, and are demodulated by the transceiver 1001 to generate a downlink signal, and the downlink signal is transmitted to the UE by using the antenna.

The controller/processor 1002 is further configured to determine, based on a relationship between a first sub-band set and a second sub-band set, a corresponding channel listening type for performing channel listening by a terminal device for the first sub-band set. The transceiver 1001 is further configured to send first indication information to the UE. The controller/processor 1002 may be further configured to perform a processing process of the base station in FIG. 2 or FIG. 8 and/or another process of the technology described In accordance with the disclosure. For example, the controller/processor 1002 may be further configured to generate first indication information, and the first indication information is used to indicate the second sub-band set occupied by the network device to send downlink information. The base station may further include a memory 1003 that may be configured to store program code and data of the base station. The base station may further include a communications unit 1004, configured to support the base station in communicating with another network entity. For example, the communications unit 1004 is configured to support the base station in communicating with another communications network entity shown in FIG. 1, for example, the UE.

It can be understood that FIG. 10 shows only a simplified design of the base station. During actual application, the base station may include any quantity of transmitters, receivers, processors, controllers, memories, communications units, and the like, and all base stations that can implement the present invention shall fall within the protection scope of the present invention.

Figure 11:
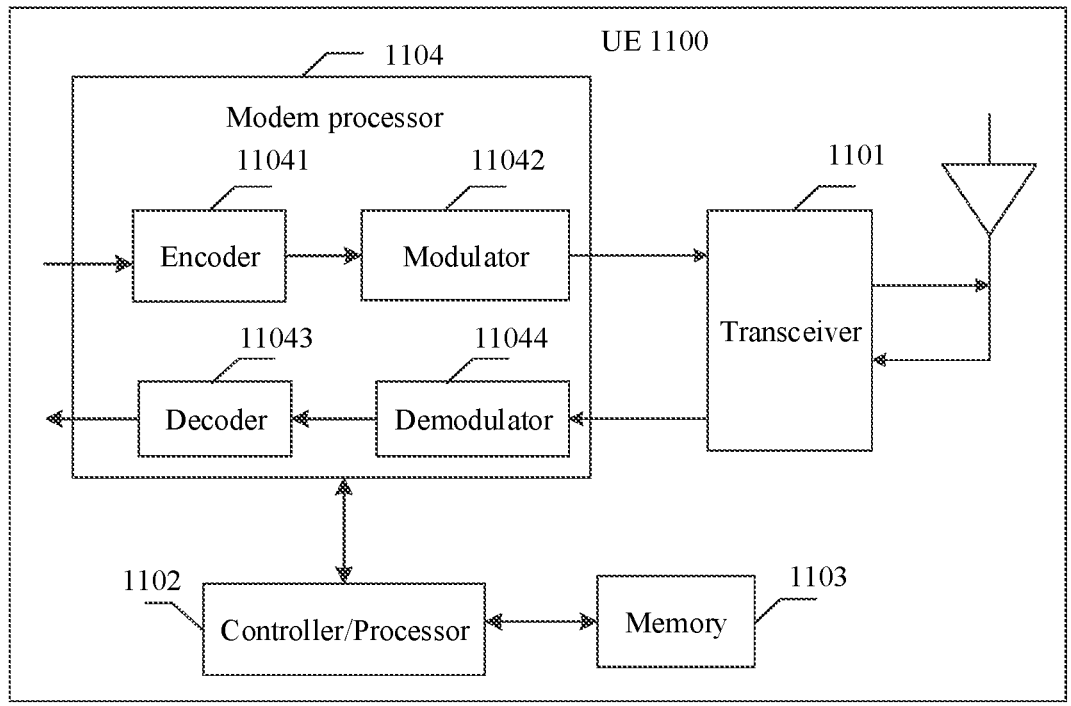
FIG. 11 is a schematic structural diagram of UE according to an embodiment of this application.

FIG. 11 is a simplified schematic diagram of one example design structure of UE involved in the foregoing embodiments. The UE 1100 may be the UE in FIG. 1, or may be the terminal device shown in FIG. 2 or FIG. 8. The UE includes a transceiver 1101 and a controller/processor 1102, and may further include a memory 1103 and a modem processor 1104.

The transceiver 1101 adjusts (for example, through analog conversion, filtering, amplification, and up-conversion) the output sample and generates an uplink signal. The uplink signal is transmitted to the base station in the foregoing embodiments by using an antenna. On a downlink, the antenna receives a downlink signal transmitted by the base station in the foregoing embodiments. The transceiver 1101 adjusts (for example, through filtering, amplification, down-conversion, and digitization) the signal received from the antenna and provides an input sample. In the modem processor 1104, an encoder 11041 receives service data and a signaling message that are to be sent on an uplink, and processes (for example, formats, encodes, and interleaves) the service data and the signaling message. A modulator 11042 performs further processing (for example, symbol mapping and modulation) on encoded service data and an encoded signaling message, and provides an output sample. A demodulator 11044 processes (for example, demodulates) the input sample and provides symbol estimation. A decoder 11043 processes (for example, de-interleaves and decodes) the symbol estimation and provides decoded data and a decoded signaling message that are to be sent to the UE. The encoder 11041, the modulator 11042, the demodulator 11044, and the decoder 11043 may be implemented by the combined modem processor 1104. These units perform processing based on a radio access technology (for example, an access technology in LTE and another evolved system) used in a radio access network.

The controller/processor 1102 controls and manages an action of the UE, and is configured to perform processing performed by the UE in the foregoing embodiments, for example, perform channel listening based on first indication information. For example, the controller/processor 802 is configured to support the UE in performing content of the UE in FIG. 2 or FIG. 8. The memory 1103 is configured to store program code and data of the UE.

Figure 12:
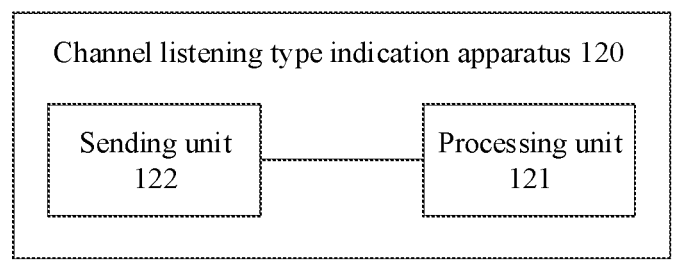
FIG. 12, FIG. 13, FIG. 14, and FIG. 15 are schematic structural diagrams of a channel listening type indication apparatus according to an embodiment of this application.

As shown in FIG. 12, this application further provides a channel listening type indication apparatus 120. The apparatus includes a processing unit 121 and a sending unit 122.

The processing unit 121 is configured to determine, based on a relationship between a first sub-band set and a second sub-band set, a corresponding channel listening type for performing channel listening by a terminal device for the first sub-band set, where the first sub-band set includes at least one sub-band occupied when the processing unit 121 schedules the terminal device to send uplink information, the second sub-band set includes at least one sub-band occupied when the sending unit 122 sends downlink information, and the channel listening type includes a long listening type or a short listening type.

The sending unit 122 is configured to send first indication information to the terminal device, where the first indication information is used to indicate the channel listening type.

For specific implementation processes of the processing unit 121 and the sending unit 122, refer to the foregoing method embodiments. Details are not described herein again.

Figure 13:
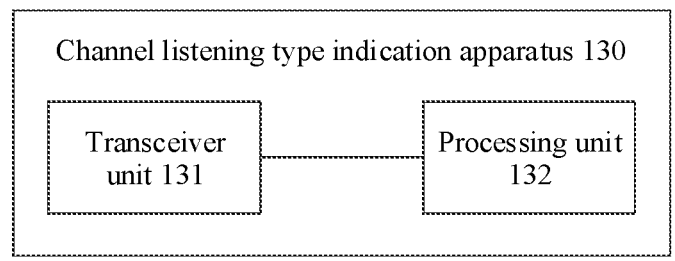

As shown in FIG. 13, this application further provides a channel listening type indication apparatus 130, including a transceiver unit 131 and a processing unit 132.

The transceiver unit 131 is configured to receive first indication information sent by a network device, where the first indication information is used to indicate a corresponding channel listening type for the processing unit 132 to perform channel listening for a first sub-band set, the channel listening type is determined based on a relationship between the first sub-band set and a second sub-band set, the first sub-band set includes at least one sub-band occupied when the network device schedules the transceiver unit 132 to send uplink information, the second sub-band set includes at least one sub-band occupied by the network device to send downlink information, and the channel listening type includes a long listening type or a short listening type.

The processing unit 132 is configured to perform channel listening for the first sub-band set based on the channel listening type.

For specific implementation processes of the transceiver unit 131 and the processing unit 132, refer to the foregoing method embodiments. Details are not described herein again.

Figure 14:
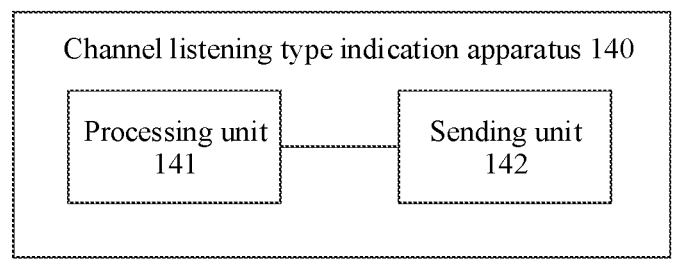

As shown in FIG. 14, this application further provides a channel listening type indication apparatus 140. The apparatus includes a processing unit 141 and a sending unit 142.

The processing unit 141 is configured to generate first indication information, where the first indication information is used to indicate a second sub-band set occupied when the sending unit 142 sends downlink information.

The sending unit 142 is configured to send the listening indication information to a terminal device.

For specific implementation processes of the processing unit 141 and the sending unit 142, refer to the foregoing method embodiments. Details are not described herein again.

Figure 15:
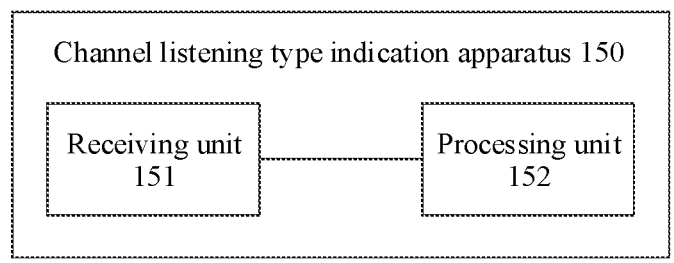

As shown in FIG. 15, this application further provides a channel listening type indication apparatus 150, including a receiving unit 151 and a processing unit 152.

The receiving unit 151 is configured to receive first indication information sent by a network device, where the first indication information is used to indicate a second sub-band set occupied by the network device to send downlink information.

The processing unit 152 is configured to: determine, based on the first indication information, a channel listening type of channel listening performed on a first sub-band; and perform channel listening on the first sub-band based on the channel listening type, where the first sub-band is a sub-band occupied when the network device schedules the receiving unit 151 to send uplink information.

For specific implementation processes of the receiving unit 151 and the processing unit 152, refer to the foregoing method embodiments. Details are not described herein again.

This application further provides a communications apparatus, including a processor and a memory. The memory is configured to store a computer-executable instruction, and the processor is configured to execute the computer-executable instruction stored in the memory, so that the communications apparatus performs any one of the foregoing channel listening type indication methods.

This application further provides a computer readable storage medium. The computer readable storage medium stores an instruction, and when the instruction is run on a computer, the computer is enabled to perform any one of the foregoing channel listening type indication methods.

This application further provides a chip. The chip is connected to a memory, and is configured to read and execute a software program stored in the memory, so as to implement any one of the foregoing channel listening type indication methods.

Figure 16:
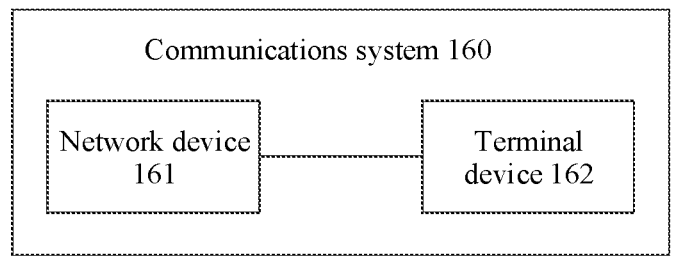
FIG. 16 is a schematic structural diagram of a communications system according to an embodiment of this application.

As shown in FIG. 16, this application further provides a communications system 160. The communications system 160 includes a network device 161 and a terminal device 162. For a working process of the network device 161, refer to the specific descriptions in the foregoing method and apparatus embodiments. For a working process of the terminal device 162, refer to the specific descriptions in the foregoing method and apparatus embodiments. Details are not described herein again.

Method or algorithm steps described in combination with the content disclosed in the present invention may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made within the spirit and principle of the present invention shall fall within the protection scope of the present invention.

What is claimed is:

1. A channel listening type indication method, comprising:
    determining, by a network device based on a relationship between a first sub-band set and a second sub-band set, a corresponding channel listening type for performing channel listening on sub-bands in a first sub-band set by a terminal device, wherein the first sub-band set comprises at least one sub-band occupied by the terminal device to send uplink information, the second sub-band set comprises at least one sub-band occupied by the network device to send downlink information, and the channel-listening type comprises a long listening type or a short listening type; and sending, by the network device, indication information to the terminal device for performing channel listening on the sub-bands in the first sub-band set, wherein the indication information indicates the channel listening type;

wherein the determining, by the network device based on the relationship between the first sub-band set and a second sub-band set, the corresponding channel listening type by the terminal device for the first sub-band set comprises:

when each sub-band in the first sub-band set is comprised in the second sub-band set, determining the channel listening type is the short listening type; or when at least one sub-band in the first sub-band set is not comprised in the second sub-band set, determining that the channel listening type is the long listening type.

2. The method according to claim 1, wherein determining, by the network device based on the relationship between the first sub-band set and a second sub-band set, the corresponding channel listening type by the terminal device for the first sub-band set comprises:

when each sub-band in the first sub-band set is comprised in the second sub-band set, and an uplink burst of the first sub-band set is within a maximum channel occupancy time corresponding to the first sub-band set, the channel listening type is the short listening type, wherein the uplink burst of the first sub-band set is at least one consecutive time unit that the network device schedules the terminal device to occupy in the first sub-band set, and the uplink burst of the first sub-band set comprises a time unit to be occupied when the network device schedules the terminal device to send the uplink information; and the maximum channel occupancy time corresponding to the first sub-band set is a corresponding maximum channel occupancy time in which the network device performs channel listening for the first sub-band set before the network device sends the downlink information; or the maximum channel occupancy time corresponding to the first sub-band set is determined based on a maximum channel occupancy time corresponding to each sub-band in the first sub-band set, and a maximum channel occupancy time corresponding to one sub-band in the first sub-band set is a corresponding maximum channel occupancy time in which the network device performs channel listening on the one sub-band before the network device sends the downlink information.

3. The method according to claim 1, wherein determining, by the network device based on the relationship between the first sub-band set and a second sub-band set, the corresponding channel listening type by the terminal device for the first sub-band set comprises:

when each sub-band in the first sub-band set is comprised in the second sub-band set, and an uplink burst on each sub-band in the first sub-band set is within a maximum channel occupancy time of each sub-band, determining, by the network device, that the channel listening type is the short listening type, wherein for an $i^{th}$ sub-band in the first sub-band set, that an uplink burst on the $i^{th}$ sub-band is within a maximum channel occupancy time of the $i^{th}$ sub-band comprises: the $i^{th}$ uplink burst on the $i^{th}$ sub-band is within the maximum channel occupancy time of the $i^{th}$ sub-band;

the $i^{th}$ uplink burst is at least one consecutive time unit that the network device schedules the terminal device to occupy on the $i^{th}$ sub-band, and the $i^{th}$ uplink burst comprises a time unit occupied when the network device schedules the terminal device to send the uplink information; and the maximum channel occupancy time of the $i^{th}$ sub-band is a corresponding maximum channel occupancy time in which the network device performs channel listening on the $i^{th}$ sub-band before the network device sends the downlink information, wherein i is an integer greater than 0 and less than or equal to N, N is a quantity of sub-bands comprised in the first sub-band set, and N is a positive integer.

4. The method according to claim 1, wherein determining, by the network device based on the relationship between the first sub-band set and a second sub-band set, the corresponding channel listening type by the terminal device for the first sub-band set comprises:

when each sub-band in the first sub-band set is comprised in the second sub-band set, and the uplink burst of the first sub-band set is not within the maximum channel occupancy time corresponding to the first sub-band set, determining, by the network device, that the channel listening type is the long listening type, wherein the uplink burst of the first sub-band set is the at least one consecutive time unit that the network device schedules the terminal device to occupy in the first sub-band set, and the uplink burst of the first sub-band set comprises the time unit to be occupied when the network device schedules the terminal device to send the uplink information; and the maximum channel occupancy time corresponding to the first sub-band set is the corresponding maximum channel occupancy time in which the network device performs channel listening for the first sub-band set before the network device sends the downlink information; or the maximum channel occupancy time corresponding to the first sub-band set is determined based on the maximum channel occupancy time corresponding to each sub-band in the first sub-band set, and the maximum channel occupancy time corresponding to the one sub-band in the first sub-band set is the corresponding maximum channel occupancy time in which the network device performs channel listening on the one sub-band before the network device sends the downlink information.

5. The method according to claim 1, wherein determining, by the network device based on the relationship between the first sub-band set and a second sub-band set, the corresponding channel listening type by the terminal device for the first sub-band set comprises:

when each sub-band in the first sub-band set is comprised in the second sub-band set, and the $i^{th}$ uplink burst on the $i^{th}$ sub-band in the first sub-band set is not within the maximum channel occupancy time of the $i^{th}$ sub-band, determining, by the network device, that the channel listening type is the long listening type, wherein the $i^{th}$ uplink burst is the at least one consecutive time unit that the network device schedules the terminal device to occupy on the $i^{th}$ sub-band, and the $i^{th}$ uplink burst comprises the time unit occupied when the network device schedules the terminal device to send the uplink information; and the maximum channel occupancy time of the $i^{th}$ sub-band is the corresponding maximum channel occupancy time in which the network device performs channel listening on the $i^{th}$ sub-band before the network device sends the downlink information, wherein i is an integer greater than 0 and less than or equal to N, N is the quantity of sub-bands comprised in the first sub-band set, and N is a positive integer.

6. The method according to claim 1, wherein sending, by the network device, the indication information to the terminal device comprises:

sending, by the network device, scheduling signaling to the terminal device, wherein the scheduling signaling carries the indication information, and the scheduling signaling is used to schedule the terminal device to occupy the first sub-band set and a first time unit to send the uplink information.

7. The method according to claim 1, wherein the first sub-band set comprises at least two sub-bands.

8. The method according to claim 1, wherein the long listening type is random backoff clear channel assessment, and the short listening type is single-slot clear channel assessment.

9. A channel listening type indication method, comprising:

receiving, by a terminal device, indication information sent by a network device for performing channel listening on sub-bands in a first sub-band set by the terminal device, wherein the indication information indicates a corresponding channel listening type for performing channel listening by the terminal device, the channel listening type is determined based on a relationship between the first sub-band set and a second sub-band set, the first sub-band set comprises at least one sub-band occupied by the terminal device to send uplink information, the second sub-band set comprises at least one sub-band occupied by the network device to send downlink information, and the channel listening type comprises a long listening type or a short listening type; and performing, by the terminal device, channel listening for the first sub-band set based on the channel listening type;

wherein the determining, by the network device based on the relationship between the first sub-band set and a second sub-band set, the corresponding channel listening type by the terminal device for the first sub-band set comprises:

when each sub-band in the first sub-band set is comprised in the second sub-band set, determining the channel listening type is the short listening type; or when at least one sub-band in the first sub-band set is not comprised in the second sub-band set, determining that the channel listening type is the long listening type.

10. The method according to claim 9, wherein when each sub-band in the first sub-band set is comprised in the second sub-band set, and an uplink burst of the first sub-band set is within a maximum channel occupancy time corresponding to the first sub-band set, the channel listening type is the short listening type, wherein the uplink burst of the first sub-band set is at least one consecutive time unit that the network device schedules the terminal device to occupy in the first sub-band set, and the uplink burst of the first sub-band set comprises a time unit to be occupied when the network device schedules the terminal device to send the uplink information; and the maximum channel occupancy time corresponding to the first sub-band set is a corresponding maximum channel occupancy time in which the network device performs channel listening for the first sub-band set before the network device sends the downlink information; or the maximum channel occupancy time corresponding to the first sub-band set is determined based on a maximum channel occupancy time corresponding to each sub-band in the first sub-band set, and a maximum channel occupancy time corresponding to one sub-band in the first sub-band set is a corresponding maximum channel occupancy time in which the network device performs channel listening on the one sub-band before the network device sends the downlink information.

11. The method according to claim 9, wherein when each sub-band in the first sub-band set is comprised in the second sub-band set, and an uplink burst on each sub-band in the first sub-band set is within a maximum channel occupancy time of each sub-band, the channel listening type is the short listening type, wherein for an $i^{th}$ sub-band in the first sub-band set, that an uplink burst on the $i^{th}$ sub-band is within a maximum channel occupancy time of the $i^{th}$ sub-band comprises: the $i^{th}$ uplink burst on the $i^{th}$ sub-band is within the maximum channel occupancy time of the $i^{th}$ sub-band;

the $i^{th}$ uplink burst is at least one consecutive time unit that the network device schedules the terminal device to occupy on the $i^{th}$ sub-band, and the $i^{th}$ uplink burst comprises a time unit occupied when the network device schedules the terminal device to send the uplink information; and the maximum channel occupancy time of the $i^{th}$ sub-band is a corresponding maximum channel occupancy time in which the network device performs channel listening on the $i^{th}$ sub-band before the network device sends the downlink information, wherein i is an integer greater than 0 and less than or equal to N, N is a quantity of sub-bands comprised in the first sub-band set, and N is a positive integer.

12. The method according to claim 9, wherein when each sub-band in the first sub-band set is comprised in the second sub-band set, and the uplink burst of the first sub-band set is not within the maximum channel occupancy time corresponding to the first sub-band set, the channel listening type is the long listening type, wherein the uplink burst of the first sub-band set is the at least one consecutive time unit that the network device schedules the terminal device to occupy in the first sub-band set, and the uplink burst of the first sub-band set comprises the time unit to be occupied when the network device schedules the terminal device to send the uplink information; and the maximum channel occupancy time corresponding to the first sub-band set is the corresponding maximum channel occupancy time in which the network device performs channel listening for the first sub-band set before the network device sends the downlink information; or the maximum channel occupancy time corresponding to the first sub-band set is determined based on the maximum channel occupancy time corresponding to each sub-band in the first sub-band set, and the maximum channel occupancy time corresponding to the one sub-band in the first sub-band set is the corresponding maximum channel occupancy time in which the network device performs channel listening on the one sub-band before the network device sends the downlink information.

13. The method according to claim 9, wherein when each sub-band in the first sub-band set is comprised in the second sub-band set, and the $i^{th}$ uplink burst on the $i^{th}$ sub-band in the first sub-band set is not within the maximum channel occupancy time of the $i^{th}$ sub-band, the channel listening type is the long listening type, wherein the $i^{th}$ uplink burst is the at least one consecutive time unit that the network device schedules the terminal device to occupy on the $i^{th}$ sub-band, and the $i^{th}$ uplink burst comprises the time unit to be occupied when the network device schedules the terminal device to send the uplink information; and the maximum channel occupancy time of the $i^{th}$ sub-band is the corresponding maximum channel occupancy time in which the network device performs channel listening on the $i^{th}$ sub-band before the network device sends the downlink information, wherein i is an integer greater than 0 and less than or equal to N, N is the quantity of sub-bands comprised in the first sub-band set, and N is a positive integer.

14. The method according to claim 9, wherein the receiving, by a terminal device, first indication information sent by a network device comprises:

receiving, by the terminal device, scheduling signaling sent by the network device, wherein the scheduling signaling carries the first indication information, and the scheduling signaling is used to schedule the terminal device to occupy the first sub-band set and a first time unit to send the uplink information.

15. The method according to claim 9, wherein the first sub-band set comprises at least two sub-bands.

16. The method according to claim 9, wherein the long listening type is random backoff clear channel assessment, and the short listening type is single-slot clear channel assessment.

* * * * *

UNITED STATES PATENT AND TRADEMARK OFFICE
CERTIFICATE OF CORRECTION

PATENT NO. : 11,553,521 B2
APPLICATION NO. : 16/911440
DATED : January 10, 2023
INVENTOR(S) : Yuan Li et al.

It is certified that error appears in the above-identified patent and that said Letters Patent is hereby corrected as shown below:

In the Claims

In Column 58, Line 51, in Claim 4, after "to" delete "the".

In Column 61, Line 5, in Claim 12, after "to" delete "the".

Signed and Sealed this
Fourteenth Day of March, 2023

Katherine Kelly Vidal
Director of the United States Patent and Trademark Office